US007548881B2

(12) United States Patent
Narayan et al.

(10) Patent No.: US 7,548,881 B2

(45) Date of Patent: Jun. 16, 2009

(54) SYSTEMS AND METHODS FOR PRODUCING DOCUMENTARY CREDIT AND CONFORMING SHIPPING DOCUMENTS

(75) Inventors: Manoj Narayan, Foster City, CA (US); Steve M. Viarengo, Danville, CA (US); Allen R. Bornscheuer, Tampa, FL (US)

(73) Assignee: Tradebeam, Inc., San Mateo, CA (US)

( * ) Notice: Subject to any disclaimer, the term of this patent is extended or adjusted under 35 U.S.C. 154(b) by 1177 days.

(21) Appl. No.: 10/287,447

(22) Filed: Nov. 4, 2002

(65) Prior Publication Data

US 2004/0088245 A1 May 6, 2004

(51) Int. Cl.
*G06Q 40/00* (2006.01)

(52) U.S. Cl. .................. 705/36; 705/1; 705/7; 705/24; 705/28; 705/35; 705/38

(58) Field of Classification Search ................. 715/507; 705/38, 1, 7, 24, 28, 35
See application file for complete search history.

(56) References Cited

U.S. PATENT DOCUMENTS

| | | | | |
|---|---|---|---|---|
| 5,704,045 | A | 12/1997 | King et al. | |
| 5,710,889 | A | 1/1998 | Clark et al. | |
| 6,058,378 | A | 5/2000 | Clark et al. | |
| 6,141,653 | A | 10/2000 | Conklin et al. | |
| 6,151,588 | A | 11/2000 | Tozzoli et al. | |
| 6,338,050 | B1 | 1/2002 | Conklin et al. | |
| 6,460,020 | B1 | 10/2002 | Pool et al. | |
| 2002/0013767 | A1 | 1/2002 | Katz | |
| 2002/0038277 | A1 | 3/2002 | Yuan | |
| 2002/0133509 | A1* | 9/2002 | Johnston et al. | 707/203 |
| 2003/0110128 | A1* | 6/2003 | Foth et al. | 705/40 |

OTHER PUBLICATIONS

Bolero.net. “Document Definitions in alphabetical order” Apr. 10, 2001 <http://web.archive.org/web/20010410202536/www.bolero.net/boleroxml/docdef/alphabetical.php.3>.*

Bolero.net. “Core Messaging Platform” Oct. 10, 2000 <http://web.archive.org/web/20001010031022/www.bolero.net/decision/service/index.php3>.*

Bolero.net. “Introduction to Bolero XML” Aug. 31, 2001 <http://web.archive.org/web/20010831065457/www.bolero.net/boleroxml/introduction/index/php3>.*

Bolero.net. “Documentary Credit Application” Apr. 28, 2001 <http://web.archive.org/web/20010428140019/www.bolero.net/boleroxml/docdef/link14.php3>.*

Bolero.net. “Exporters Documentary Credit Presentation Instruction” Apr. 21, 2001 <http://web.archive.org/web/20010421195008/www.bolero.net/boleroxml/docdef/link43.php3>.*

Bolero.net. “Documentary Credit Notification” Apr. 19, 2001 <http://web.archive.org/web/20010419085651/www.bolero.net/boleroxml/docdef/link15/php3>.*

(Continued)

*Primary Examiner*—Kambiz Abdi
*Assistant Examiner*—Shahid R Merchant
(74) *Attorney, Agent, or Firm*—Haynes Beffel & Wolfeld LLP

(57) ABSTRACT

The present invention relates to systems and methods to support import-export transactions. More particularly, it includes methods and systems for generation of bank-required documents that are consistent with a documentary credit instrument and collaborative application for or amendment of the documentary credit instrument. Particular aspects of the present invention are described in the claims, specification and drawings.

18 Claims, 56 Drawing Sheets

OTHER PUBLICATIONS

Bolero.net. "Documentary Credit Acknowledgement" Apr. 21, 2001 <http://web.archive.org/web/20010421193422/www.bolero.net/boleroxml/docdef/link38.php>.*

Bolero.net. "Documentary Credit Amendment" Apr. 21, 2001 <http://web.archive.org/web/20010421194253/www.bolero.net/boleroxml/docdef/link13.php>.*

Bolero.net. "Documentary Credit Amendment Request" Jun. 28, 2001 <http://web.archive.org/web/20010628184424/www.bolero.net/boleroxml/docdef/link42.php3>.*

TradeCard, Inc., "Financial Supply Chain Automation: The Missing Link in Supply Chain Management" White Paper, Jan. 2002.

*Tradecard, Inc.* v. *S1 Corp*., 509 F. Supp. 2d 304 (S.D.N.Y. 2007).

* cited by examiner

INSTRUCTIONS FOR COMPLETION OF

APPLICATION AND AGREEMENT FOR IRREVOCABLE COMMERCIAL LETTER OF CREDIT

To: Prefered Bank ("Bank")

Please TYPE information in the fields below. We reserve the right to return illegible applications for clarification.

| | | |
|---|---|---|
| Date: | (401) | Please issue an Irrevocable Commercial Letter of Credit substantially as set forth below and forward same through a selected correspondent by:<br>☐ Teletransmission ☐ Overnight Carrier<br>☐ Mail ☐ Other If Other, explain ______ (402) |
| L/C #: | **(Bank Use Only)** | Advising Bank Name (optional):<br>_____ (404) |

| | |
|---|---|
| Applicant (Full Name & Address) (405) | Currency and Amount in Figures: (406)<br>Tolerance Amount (if applicable): ___%<br>Currency and Amount in Words: (407) |
| Beneficiary (Full Name & Address) (408) | Expiration Date: (409)<br>Latest Shipment Date: (410) |

Draft Tenor: ☐ Sight; OR _______ Days from ☐ Sight or from ☐ Bill of Lading Date _______; OR ☐ Other ______ (411)

Draft for: ☐ 100% OR ☐ _______% of the invoice value, drawn at the Bank's option, on the Bank or its correspondent. (412)

Charges: Bank's charges are for the: ☐ Applicant ☐ Beneficiary (413)

Discount: Discount charges, if any, are to be paid by the: ☐ Applicant ☐ Beneficiary (414)

| | |
|---|---|
| Shipment From (Port of Loading): (415) | Shipment To (Port of Discharge): (416) |
| Brief Merchandise Description: (417) | |

Terms of Shipment: ☐ FOB ☐ C&F(CFR) ☐ CIF ☐ FAS ☐ Other ______ (418)

Letter of Credit to be: ☐ Transferable ☐ Non-Transferable (419)

Partial Shipments are: ☐ Permitted ☐ Non-Permitted (420)

Transhipments are: ☐ Permitted ☐ Non-Permitted (421)

Figure 4A

1.1 DOCUMENTS REQUIRED

| **Transport Document** (select one) (422) | **Freight** (423) | **Notify Party:** (424) |
| --- | --- | --- |
| ☐ Full Set Clean Multi Modal Transport Bill of Lading<br>☐ Full Set Clean on Board Marine Bill of Lading<br>☐ Air Waybill<br>☐ Other _______ | ☐ Collect<br>☐ Prepaid<br>☐ Issued or endorsed to the order of the issuing Bank. | Company Name:<br>Contact Name:<br>Address:<br>Phone: ( ) -<br>Fax #: ( ) - |

Insurance (select one) (425)

☐ Insurance effected by Applicant. No insurance document is required.

☐ Air or Marine/War Insurance Policy or Certificate Covering "All Risks" for 110% Invoice cost.

Specify other risks as needed: _______

Other Commercial Documents (in duplicate, unless otherwise specified):

☐ Commercial Invoice – _______ ☐ Packing List – _______

☐ Certificate of Origin – _______ ☐ Other Documents, specify: _______ (426)

Special Instructions and/or Conditions (including, if Applicant has a preference, selection of UCP as herein defined as rules governing the Credit): (427)

Documents must be presented to negotiating bank within _______ days of shipment. (If blank, 21 days will apply.) (428)

Please forward documents for customhouse entry to: _______ (429)

Please call: (430) ________________ at ____________ for questions at time of issuance and/or approval of discrepancies.

Documents may be forwarded to Bank by the beneficiary, or the negotiating bank, in one mail. Bank may forward documents to Applicant or its customhouse broker, if specified above, in one mail. Applicant understands and agrees that unless it specifies otherwise in writing prior to issue, at Bank's option this Credit will be subject to the Uniform Customs and Practice of Documentary Credits of the International Chamber of Commerce currently in effect, and in use by Bank ("UCP") or any subsequent revision currently in effect and in use by Bank.

PLEASE DATE AND OFFICIALLY SIGN THIS APPLICATION.

APPLICANT WARRANTS THAT NO SHPMENT INVOLVED IN THIS APPLICATION IS IN VIOLATION OF U.S. TREASURY FOREIGN ASSETS CONTROL REGULATIONS.

Figure 4B

Each Applicant signing below affirms that it has fully read and agrees to this Application and the Continuing Letter of Credit Agreement attached. In consideration of Bank's issuance of the Credit, each Applicant agrees to be bound by the Agreement as set forth in this and in the following pages (even if the following pages are not attached to the Application) delivered to Bank. (Note: If a bank, trust company, or other financial institution signs as Applicant or joint and several Applicant for its customer, or if two Applicants jointly and severally apply, both parties sign below.)

| | |
|---|---|
| Print or type name of Applicant (431) | Print or type name of Co-Applicant (432) |
| Address | Address |
| Authorized Signature (Title) | Authorized Signature (Title) |
| Authorized Signature (Title) | Authorized Signature (Title) |

| | | | |
|---|---|---|---|
| **BANK USE ONLY** (433)<br>**NOTE:** Application will **NOT** be processed if this section is not complete | | | |
| Approved (Authorized Signature): | | Date: | |
| Approved (Print name and title): | | City: | |
| Collateralized: | ☐ Yes ☐ No | Telephone:<br>( ) - | |
| Charge DDA #: | RC#: | CLAS Bank #: | CLAS Obligor #: |

Figure 4C

501 { HOME | DASHBOARD | DOCUMENT VAULT | REPORTS | ADMINISTRATION | HELP | LOGOUT

502 { Welcome John Smith     Multi-National Global Corporation
Portfolio: Inorganic Chemicals Corporation

| Shipment No. | ETD | ETA | From | To | BL/AWB | Vessel/Voyage | 503 | 504 | ⚠ You have 3 Alerts! |
|---|---|---|---|---|---|---|---|---|---|
| 123456789-10 | 01/05/2002 | 01/10/2002 | Singapore | Los Angeles | AVX1735671448 | Victoria Bridge | | | |

LETTER OF CREDIT Preview Doc Send Doc } 521

[Submit] [Cancel]  Add Notes to Page Log — 523   Assign Action — 524   Approval Status — 525
522                                              Tim House              Complete
                                                 Currrent Action:       Current Status:
                                                 Steve Viarengo         In Progress

| Summary | Details | Parties | Terms | Amendments | Page Log | } 526

Letter of Credit Stage Application — 531

Instruction No.                                          Instruction Date
Application No. GMW33622                                 Application Date Mar 26, 2002  — 532
Amendment No.                                            Amendment Date LC Number GMW33622                                   LC Type Documentary - Transferable
       LC Date Mar 27, 2002                              Expiry Date Feb 04, 2004        — 533
    LC Advice No. Mar 27, 2002                              Amount 15,2450.00
  LC Advice Date Feb 04, 2004                             Currency USD From Applicant Global International Inc.              To Issuing Bank ABC International Bank
Request Issue Date Dec 25, 2003                       Request Confirmation Yes           — 534
Request Expiry Date Jun 19, 2001                        Place of Expiry San Jose, CA

ORDER
- Manual Order
- Manual Sales Order
- Compliance Check

511

SHIPMENT-01
- Booking Info
- Exp Shipping Instr
- Export Customs
- Bill of Lading
- Imp Shipping Instr
- Import Customs
- Proof of Delivery

512

SETTLEMENT
- Invoice

513

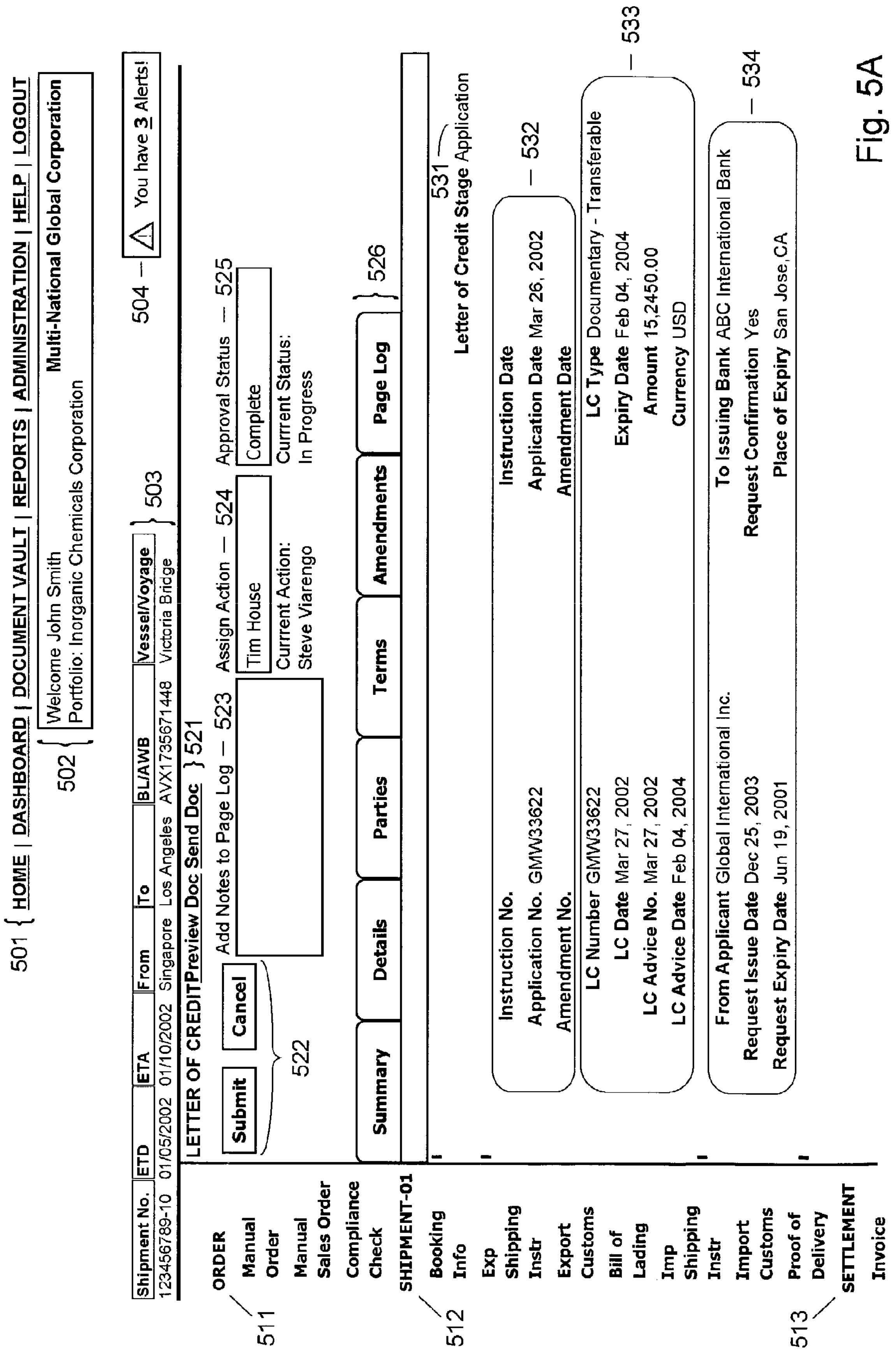

Fig. 5A

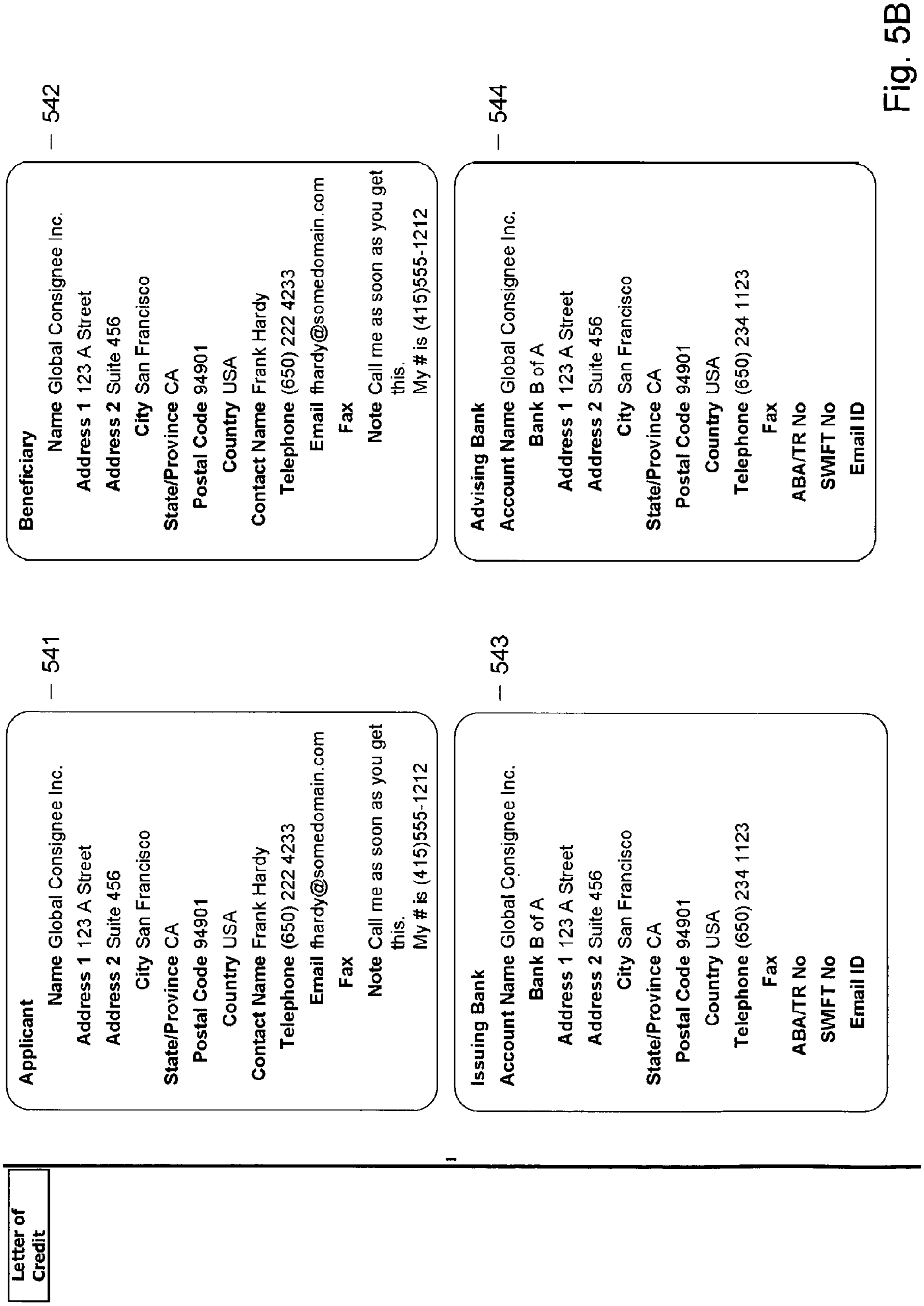

Fig. 5B

Applicant — 541
- Name Global Consignee Inc.
- Address 1 123 A Street
- Address 2 Suite 456
- City San Francisco
- State/Province CA
- Postal Code 94901
- Country USA
- Contact Name Frank Hardy
- Telephone (650) 222 4233
- Email fhardy@somedomain.com
- Fax
- Note Call me as soon as you get this.
  My # is (415)555-1212

Beneficiary — 542
- Name Global Consignee Inc.
- Address 1 123 A Street
- Address 2 Suite 456
- City San Francisco
- State/Province CA
- Postal Code 94901
- Country USA
- Contact Name Frank Hardy
- Telephone (650) 222 4233
- Email fhardy@somedomain.com
- Fax
- Note Call me as soon as you get this.
  My # is (415)555-1212

Issuing Bank — 543
- Account Name Global Consignee Inc.
- Bank B of A
- Address 1 123 A Street
- Address 2 Suite 456
- City San Francisco
- State/Province CA
- Postal Code 94901
- Country USA
- Telephone (650) 234 1123
- Fax
- ABA/TR No
- SWFT No
- Email ID

Advising Bank — 544
- Account Name Global Consignee Inc.
- Bank B of A
- Address 1 123 A Street
- Address 2 Suite 456
- City San Francisco
- State/Province CA
- Postal Code 94901
- Country USA
- Telephone (650) 234 1123
- Fax
- ABA/TR No
- SWFT No
- Email ID Letter of Credit

Note Call me as soon as you get this.
My # is (415)555-1212 — 543

Note Call me as soon as you get this.
My # is (415)555-1212 — 544

Credit Amount-figures 234,500.00  Currency USD
Credit Amount-words Two Hundred Thirty Four Thousand Five Hundred Only
Maximum Credit Amount 02   Credit Tolerance (%) 02 — 545

Delivery Terms CIF   Delivery Terms Place San Jose, CA
Available with/by Something   Presentation Period Something else — 546
Partial Shipments Allowed   Transhipments Not Allowed
Bank Charges Applicant   Freight Charges Applicant
Insurance Applicant   Other Charges Applicant

Tenor Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat. — 547

Drawee Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. — 548

Mixed Payment Details Payment Due   Deferred Payment Details Payment Due — 549

Latest Shipment Date Apr, 16 2002   Ship From Honk Kong   Ship To Oakland, CA   Ship Via Tokyo, Japan — 550
Shipment Period 20 Days

Description of Goods Lorem ipsum dolor sit amet, consectetuer adipiscing elit, sed diam nonummy nibh euismod tincidunt and/orServices ut laoreet dolore magna aliquam erat volutpat. Duis autem vel eum iriure dolor in hendrerit in vulputate velit esse molestie consequat, vel illum dolore eu feugiat nulla facilisis at vero eros et accumsan et iusto. — 551

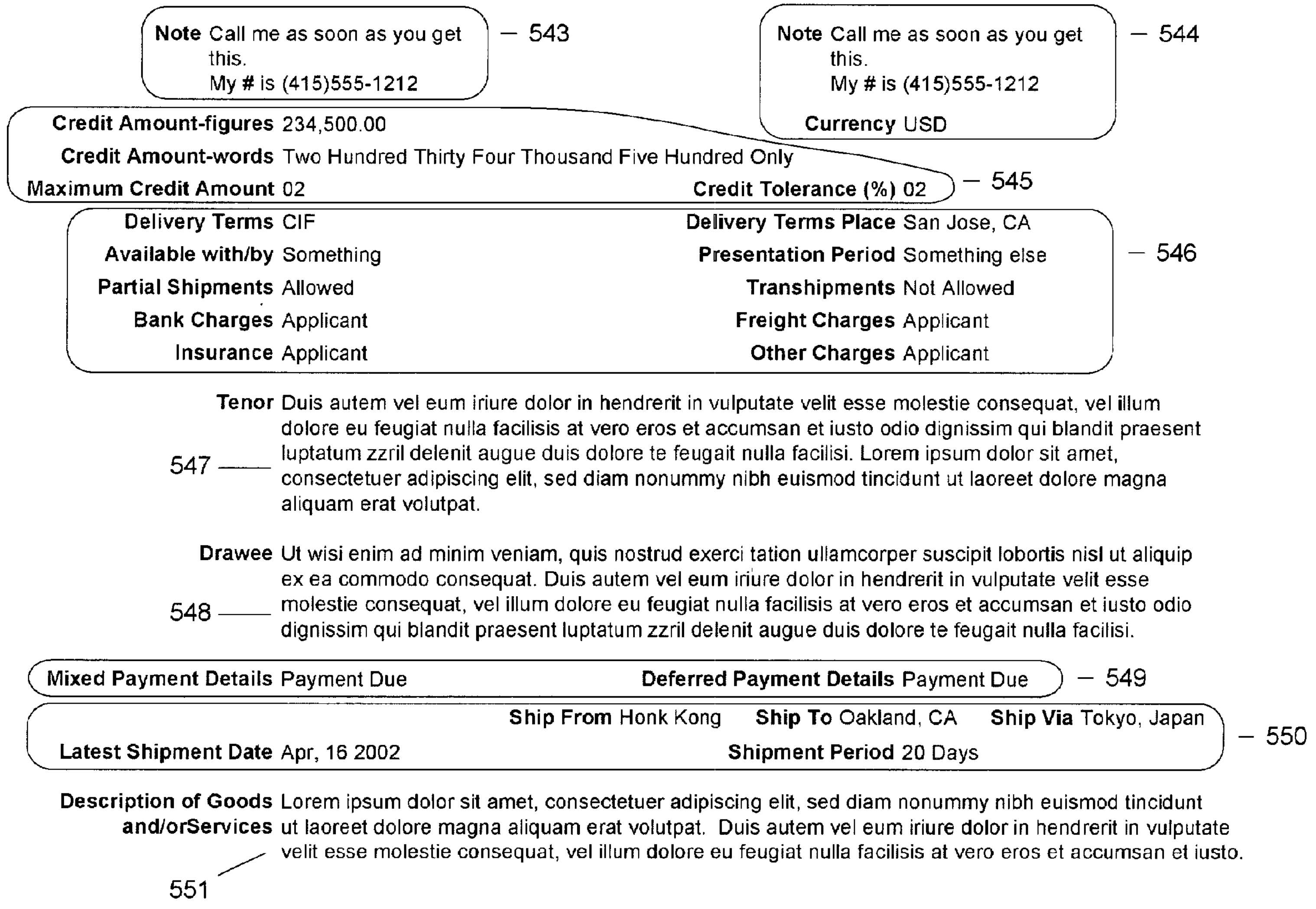

| Required Documents | Orig | Dup | Note |
|---|---|---|---|
| Commercial Invoice | 2 | 1 | Some notes about this document. |
| Packing List | 1 | 2 | Some notes about Packing List. |
| Bill Of Lading | 1 | 2 | Some notes about Bill Of Lading. |
| Bill of Exchange | 4 | 2 | Some notes about Bill Of Lading. |
| Other Documents | 4 | 2 | Other notes |

— 572

Notify
  Name Global Consignee Inc.
  Address 1 123 A Street
  Address 2 Suite 456
    City San Francisco
  State/Province CA
  Postal Code 94901
  Country USA
  Contact Name Frank Hardy
  Telephone (650) 222 4233
  Email fhardy@somedomain.com
  Fax
  Note Call me as soon as you get this.
    My # is (415)555-1212

— 570

Consigned To
  Name Global Consignee Inc.
  Address 1 123 A Street
  Address 2 Suite 456
    City San Francisco
  State/Province CA
  Postal Code 94901
  Country USA
  Contact Name Frank Hardy
  Telephone (650) 222 4233
  Email fhardy@somedomain.com
  Fax
  Note Call me as soon as you get this.
    My # is (415)555-1212

Additional Conditions Please specify the type of Letter of Credit you wish to be issued. If you have received no specific
580 —— to the Credit instructions from the Seller choose 'Documentary' otherwise select as appropriate.
581 —— Instructions Some other remarks.
582 —— Bank Remarks Some other Bank Remarks.

— 590

Increase of Credit Amount $1,000         Decrease of Credit Amount $1,000
New Credit Amount $1,000                 New Date of Expiry Apr, 16 2002

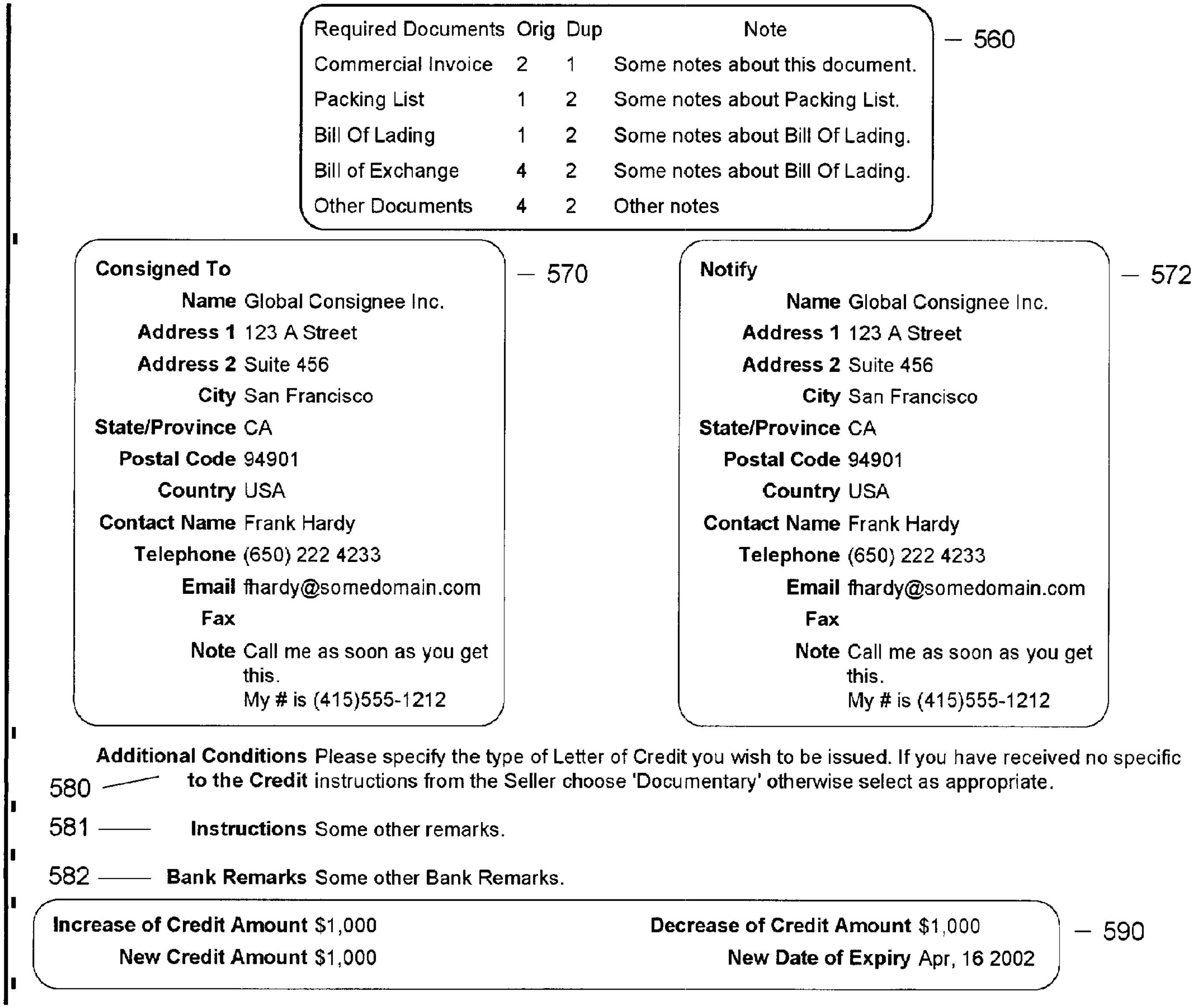

Fig. 5D

591 {
Amendment Clause 1 Requested 2 additional docs

Amendment Clause 2 Nam liber tempor cum soluta nobis eleifend option congue nihil imperdiet doming id quod mazim placerat facer possim assum. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

Amendment Clause 2 Changed the Amount by 15%

©2001-2002 TradeBeam Inc.

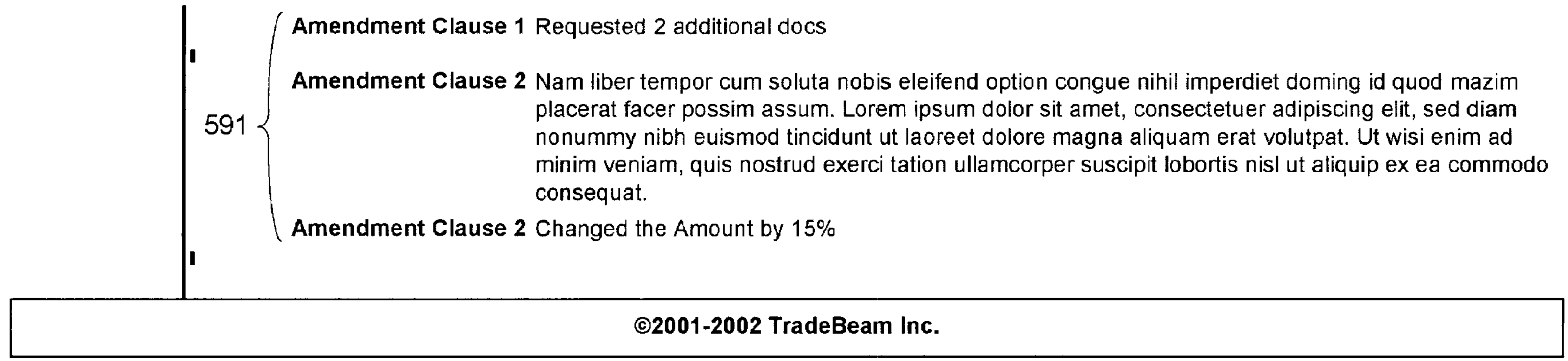

Fig. 5E

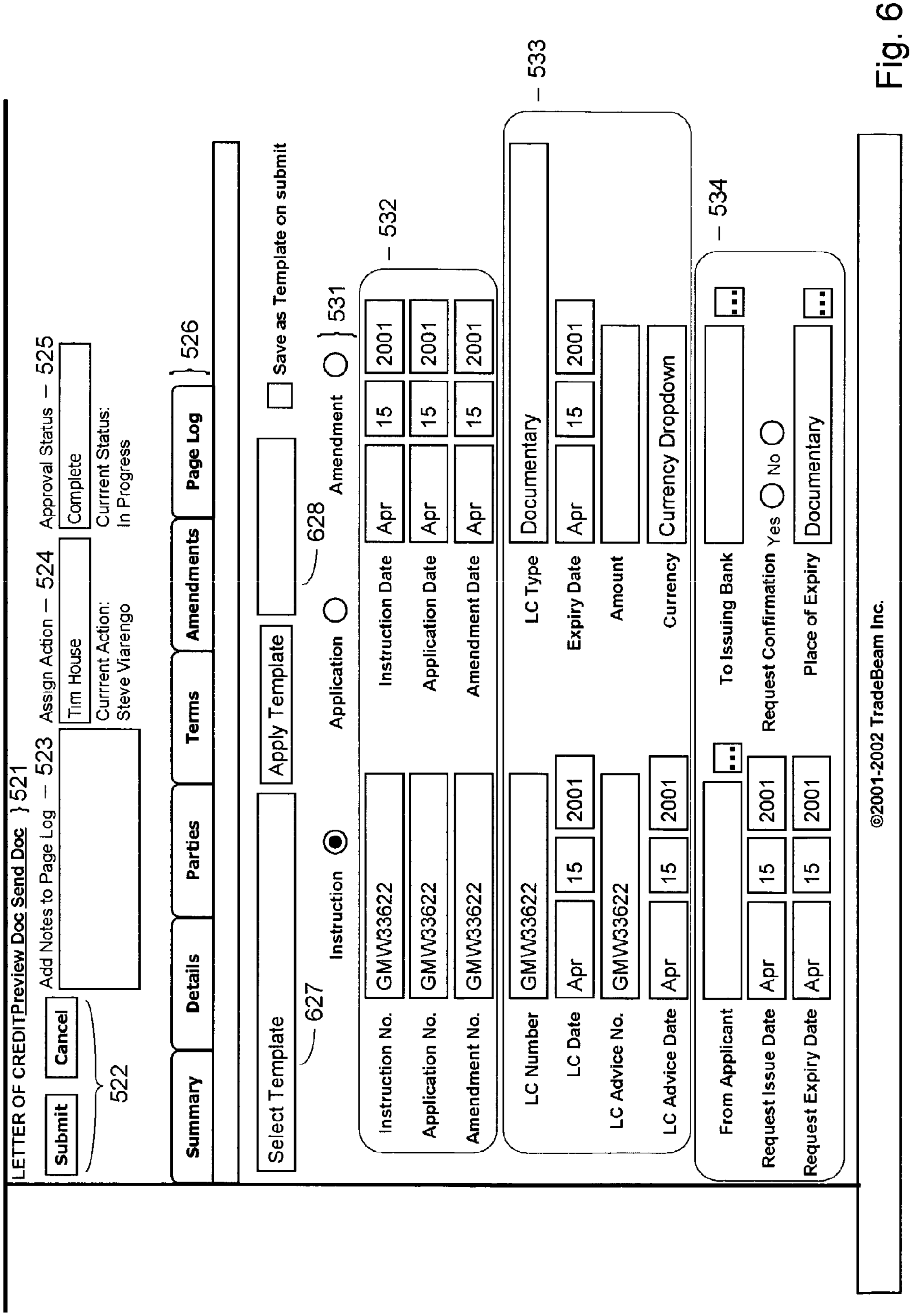

Fig. 6

LETTER OF CREDIT Preview Doc Send Doc } 521

| Submit | Cancel | Add Notes to Page Log — 523 | Assign Action — 524 | Approval Status — 525 |
|---|---|---|---|---|
| } 522 | | | Tim House | Complete |
| | | | Current Action: Steve Viarengo | Current Status: In Progress |

| Summary | Details | Parties | Terms | Amendments | Page Log |

} 526

Select Template [ Apply Template ]   ☐ Save as Template on submit
— 627                               — 628
○ Instruction   ○ Application   ○ Amendment } 531

— 532
| Instruction No. | GMW33622 | Instruction Date | Apr | 15 | 2001 |
| Application No. | GMW33622 | Application Date | Apr | 15 | 2001 |
| Amendment No. | GMW33622 | Amendment Date | Apr | 15 | 2001 |

— 533
| LC Number | GMW33622 | LC Type | Documentary |
| LC Date | Apr | 15 | 2001 | Expiry Date | Apr | 15 | 2001 |
| LC Advice No. | GMW33622 | Amount | |
| LC Advice Date | Apr | 15 | 2001 | Currency | Currency Dropdown |

— 534
| From Applicant | | To Issuing Bank | [..] |
| Request Issue Date | Apr | 15 | 2001 | Request Confirmation Yes ○ No ○ |
| Request Expiry Date | Apr | 15 | 2001 | Place of Expiry | Documentary | [..] |

©2001-2002 TradeBeam Inc.

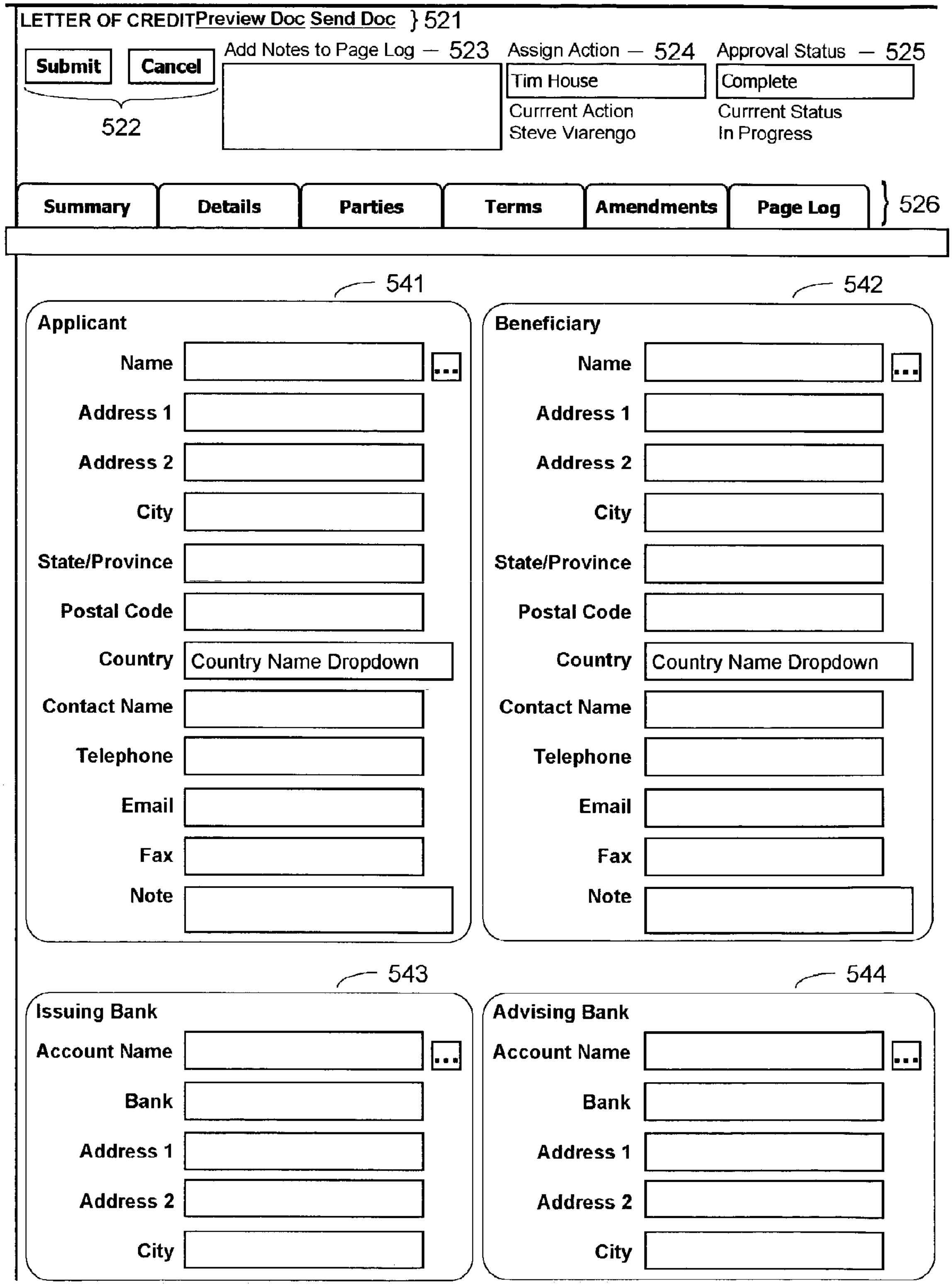

Fig. 7A

| LETTER OF CREDIT Preview Doc Send Doc } 521 | | | |
|---|---|---|---|
| Submit Cancel  522 | Add Notes to Page Log — 523 | Assign Action — 524 Tim House  Currrent Action Steve Viarengo | Approval Status — 525 Complete  Currrent Status In Progress |

| Summary | Details | Parties | Terms | Amendments | Page Log | } 526 |

541
Applicant
- Name
- Address 1
- Address 2
- City
- State/Province
- Postal Code
- Country — Country Name Dropdown
- Contact Name
- Telephone
- Email
- Fax
- Note

542
Beneficiary
- Name
- Address 1
- Address 2
- City
- State/Province
- Postal Code
- Country — Country Name Dropdown
- Contact Name
- Telephone
- Email
- Fax
- Note

543
Issuing Bank
- Account Name
- Bank
- Address 1
- Address 2
- City

544
Advising Bank
- Account Name
- Bank
- Address 1
- Address 2
- City

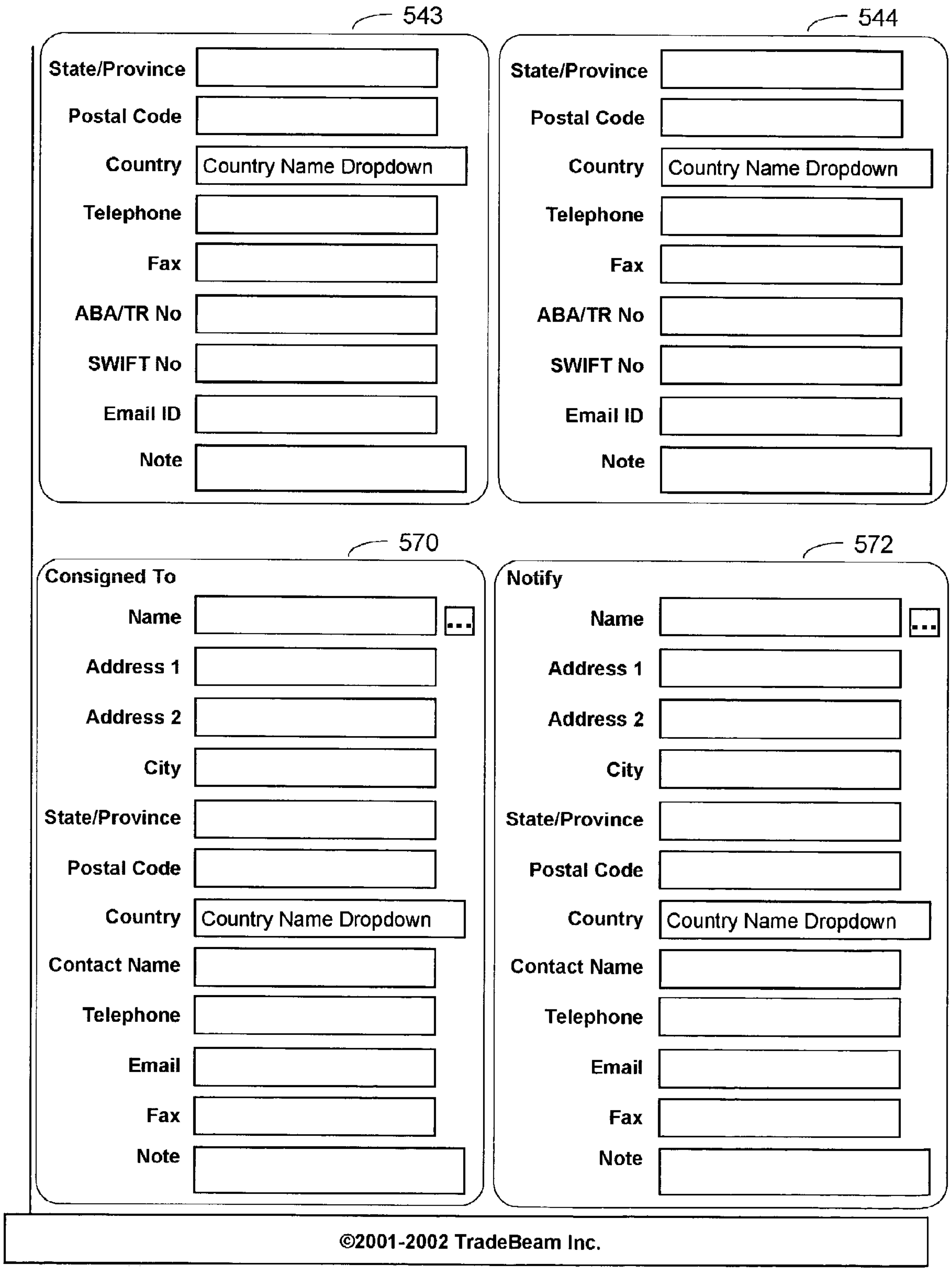

| | |
|---|---|
| State/Province | |
| Postal Code | |
| Country | Country Name Dropdown |
| Telephone | |
| Fax | |
| ABA/TR No | |
| SWIFT No | |
| Email ID | |
| Note | |

544

| | |
|---|---|
| State/Province | |
| Postal Code | |
| Country | Country Name Dropdown |
| Telephone | |
| Fax | |
| ABA/TR No | |
| SWIFT No | |
| Email ID | |
| Note | |

570 Consigned To

| | |
|---|---|
| Name | |
| Address 1 | |
| Address 2 | |
| City | |
| State/Province | |
| Postal Code | |
| Country | Country Name Dropdown |
| Contact Name | |
| Telephone | |
| Email | |
| Fax | |
| Note | |

572 Notify

| | |
|---|---|
| Name | |
| Address 1 | |
| Address 2 | |
| City | |
| State/Province | |
| Postal Code | |
| Country | Country Name Dropdown |
| Contact Name | |
| Telephone | |
| Email | |
| Fax | |
| Note | |

©2001-2002 TradeBeam Inc.

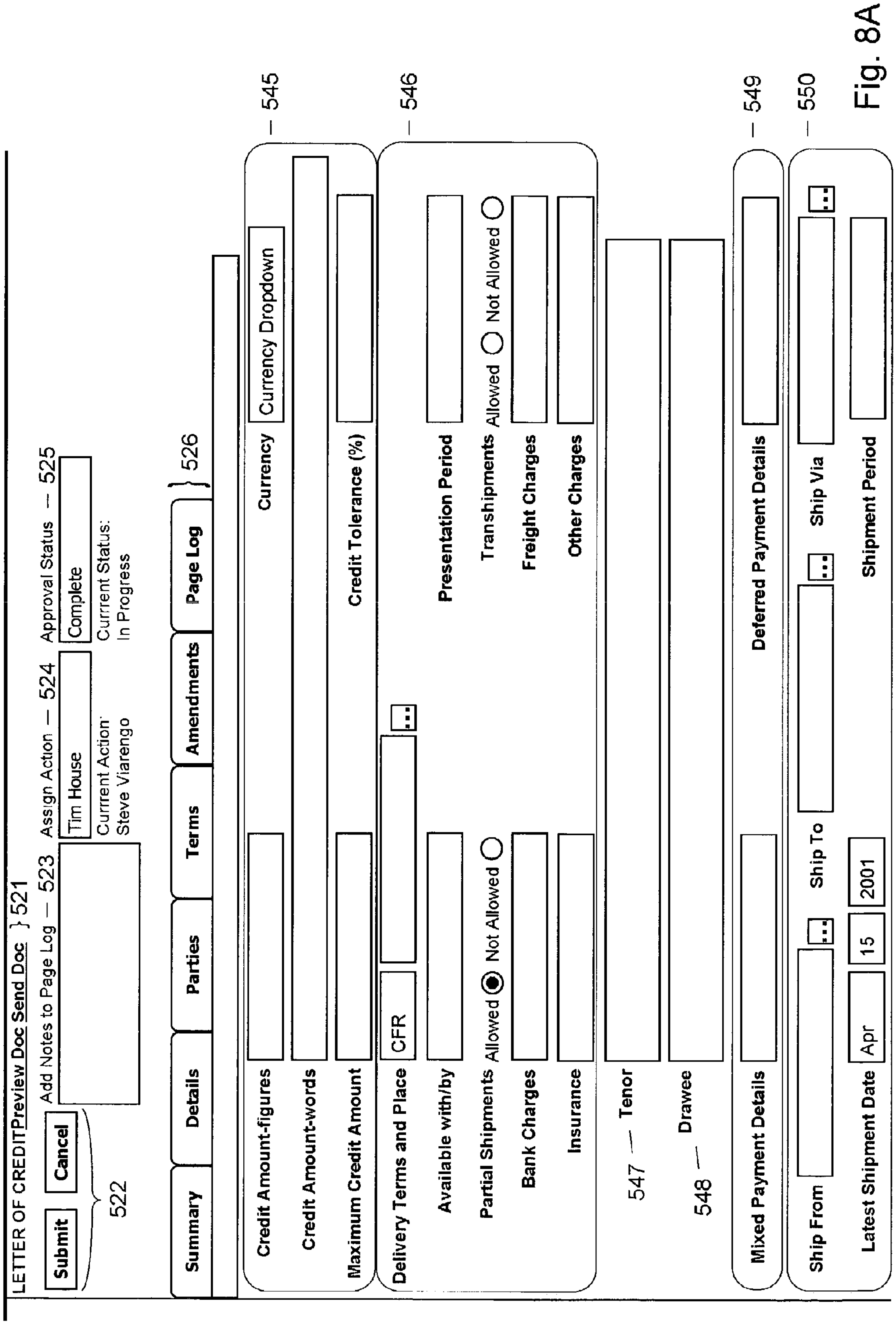

Fig. 8A

LETTER OF CREDIT Preview Doc Send Doc } 521

Submit | Cancel    Add Notes to Page Log — 523    Assign Action — 524    Approval Status — 525
                                                  Tim House                Complete
} 522                                             Current Action:          Current Status:
                                                  Steve Viarengo           In Progress

| Summary | Details | Parties | Terms | Amendments | Page Log |

} 526

— 545
Credit Amount-figures                         Currency | Currency Dropdown |
Credit Amount-words
Maximum Credit Amount                         Credit Tolerance (%)

— 546
Delivery Terms and Place | CFR |              Presentation Period
Available with/by
Partial Shipments Allowed ● Not Allowed ○     Transhipments Allowed ○ Not Allowed ○
Bank Charges                                  Freight Charges
Insurance                                     Other Charges 547 — Tenor
548 — Drawee — 549
Mixed Payment Details                         Deferred Payment Details — 550
Ship From                 | Ship To           | Ship Via
Latest Shipment Date | Apr | 15 | 2001 |      Shipment Period

LETTER OF CREDIT Preview Doc Send Doc  } 521

| Submit | Cancel | Add Notes to Page Log — 523 | Assign Action — 524 | Approval Status — 525 |
|---|---|---|---|---|
| } 522 | | | Tim House | Complete |
| | | | Currrent Action: Steve Viarengo | Current Status: In Progress |

} 526

| Summary | Details | Parties | Terms | Amendments | Page Log |
|---|---|---|---|---|---|

— 590

Increase of Credit Amount [ ]

New Credit Amount [ ]

Decrease of Credit Amount [ ]

New Date of Expiry [ Apr ] [ 15 ] [ 2001 ]

Amendment Clause 1  Requested 2 additional docs

Amendment Clause 2  Nam liber tempor cum soluta nobis eleifend option congue nihil imperdiet doming id quod mazim placerat facer possim assum. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

Amendment Clause 3  Changed the Amount by 15%

591

©2001-2002 TradeBeam Inc.

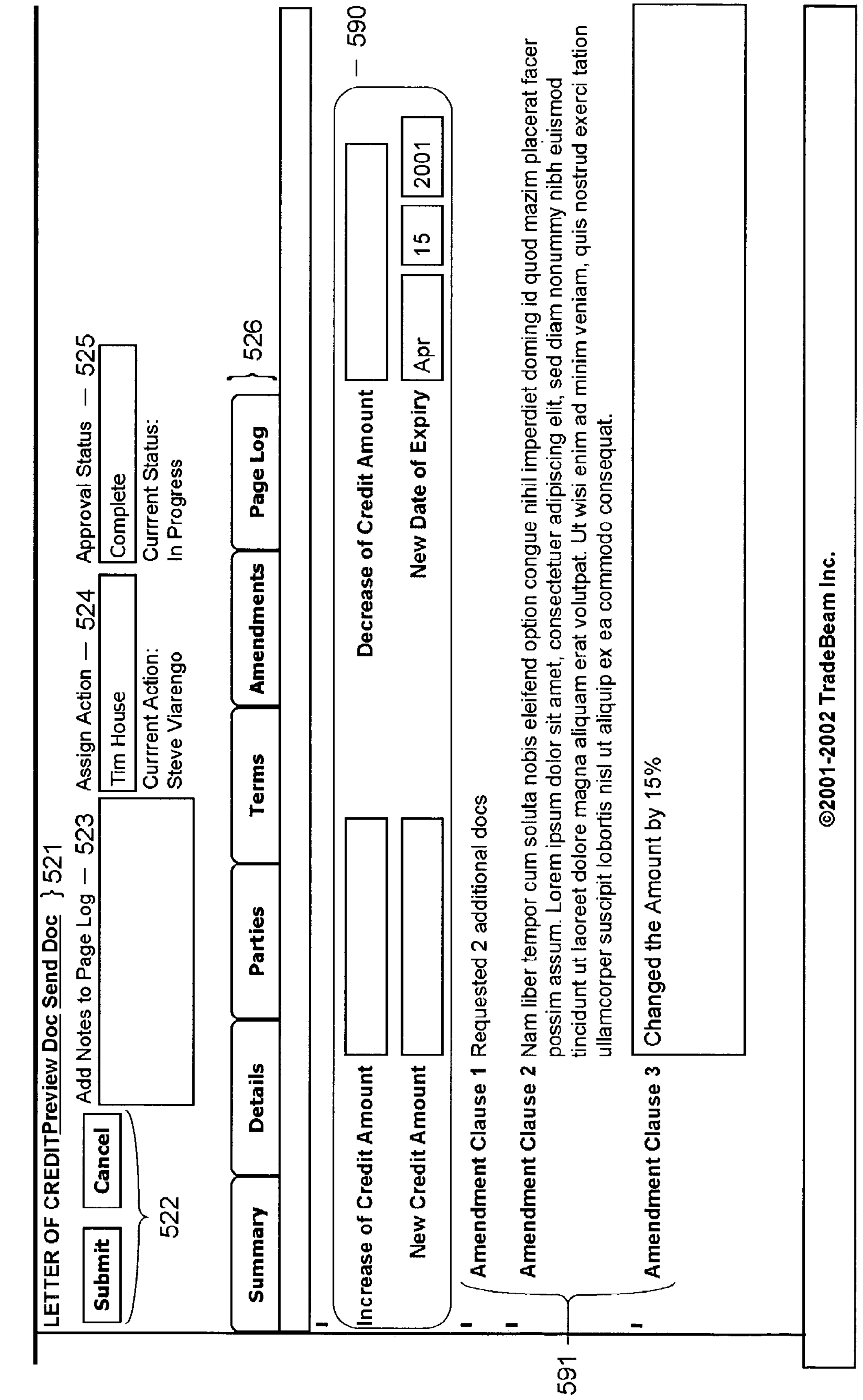

Fig. 9

Select an Export Forwarder: — 1060
GlobalEnterprises, exporter20 Man

Access Rights for this Role:

| | |
|---|---|
| Booking Info | Read Only |
| Exp Shipping Instr | Read Only |
| Invoice | Read Only |
| Packing List | Read Only |
| Export Customs | Read Only |
| Bill Of Lading | Read Only |
| Manage Docs | Read Only |
| Imp Shipping Instr | Read Only |
| POD/Import Status | Read Only |

Select an Import Forwarder: — 1065

Access Rights for this Role:

| | |
|---|---|
| Booking Info | None |
| Exp Shipping Instr | None |
| Invoice | None |
| Packing List | None |
| Export Customs | None |
| Bill Of Lading | None |
| Manage Docs | None |
| Imp Shipping Instr | None |
| POD/Import Status | None |

Select a Customs House Broker: — 1070
QA TESTING/QA Test

Access Rights for this Role:

| | |
|---|---|
| Booking Info | None |
| Exp Shipping Instr | None |
| Invoice | None |
| Packing List | None |
| Export Customs | None |
| Bill Of Lading | None |
| Manage Docs | None |

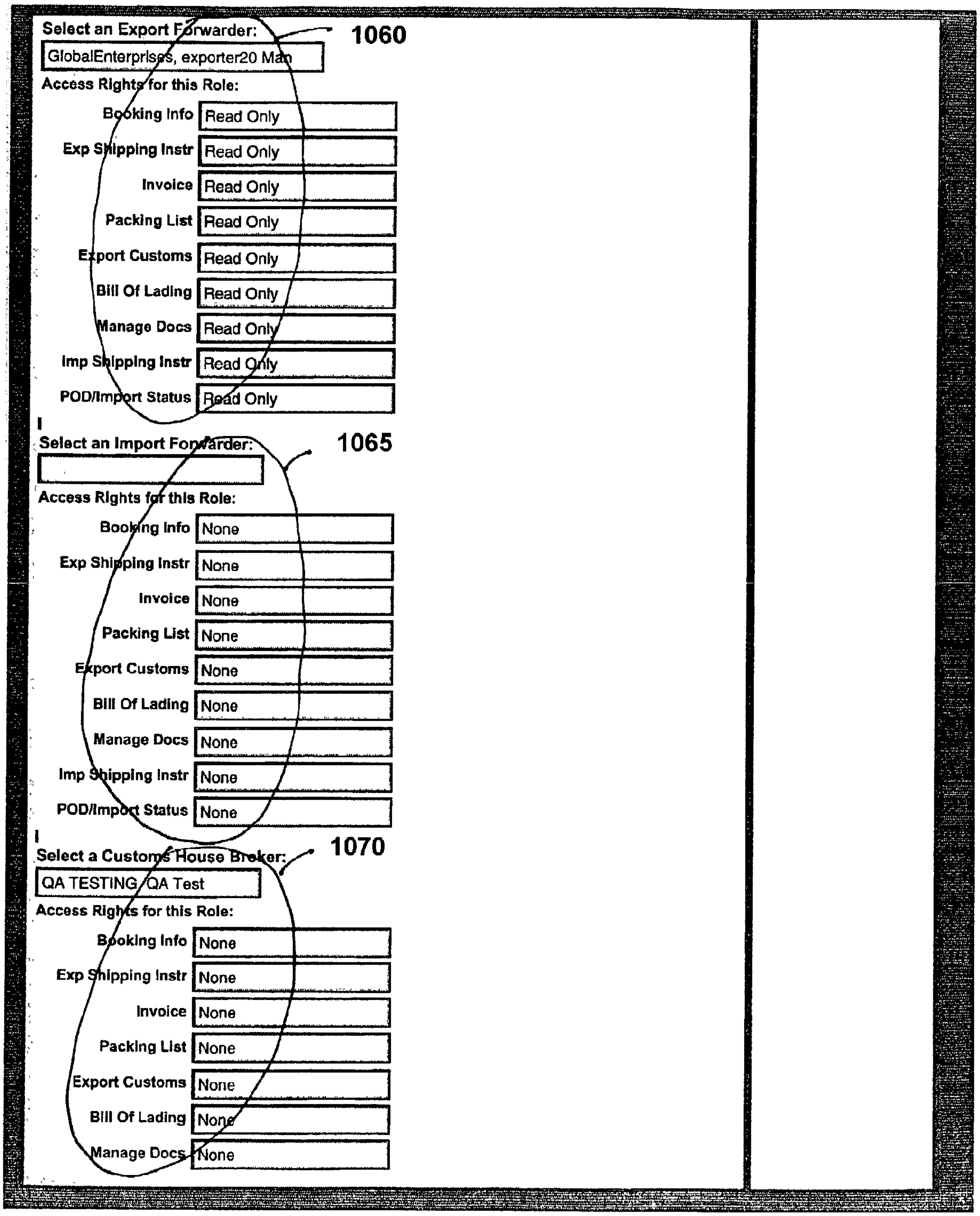

Fig. 10B

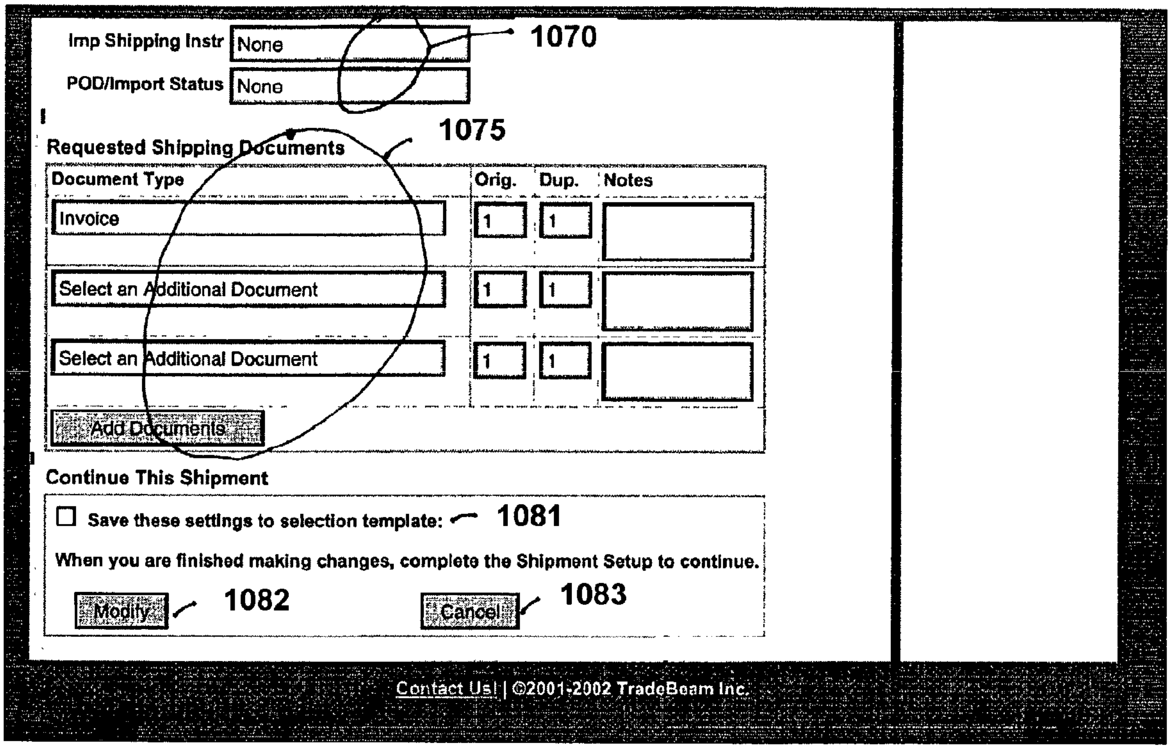

Fig. 10C

| Imp Shipping Instr | None | | | 1070 |
| POD/Import Status | None | | | |

Requested Shipping Documents — 1075

| Document Type | Orig. | Dup. | Notes |
|---|---|---|---|
| Invoice | 1 | 1 | |
| Select an Additional Document | 1 | 1 | |
| Select an Additional Document | 1 | 1 | |

Add Documents

Continue This Shipment

☐ Save these settings to selection template: — 1081

When you are finished making changes, complete the Shipment Setup to continue.

Modify — 1082    Cancel — 1083

Contact Us! | ©2001-2002 TradeBeam Inc.

TRADEBEAM 1120

1110 — DASHBOARD ENTER S.O. ENTER SHIPMENT PRODUCTS ADDRESSES LOGOUT

Welcome, importer20     About TradeBeam | Need Help?

PRODUCT

| SHIPMENT NO. | ETD | ETA | VESSEL/VOYAGE |
|---|---|---|---|
| timtest003 | | | |
| BL/AWB NO. | FROM | TO | FLIGHT/DATE |

1130

EXPORT     IMPORT     ICON KEY

Invoice

Page Log
Aug 20, 2002 6:58p

On 8/20, 6:58p:
Invoice Completed
by exporter20 Man
note: Ernie's
invoice note.

1151 { Buyer Reference No.:
Seller Reference No.:

1140

1152 {
Invoice No.:
Invoice Date: Aug 21 2002
BL/AWB No.:
BL/AWB Date: 0 0 0
Shipping Date: Aug 20 2002
Payment Due Date: 0 0 0
Delivery Date: 0 0 0

Customer:            Payer:

1153 {

Sold To:            Ship To:

1154 — Payment Method: Select Payment Method     Remit to:

Place of Loading:
Place of Discharge:

Vessel Name:
Voyage No.:
Flight No./Date: 0 0 0 0

Products: 1155

| PO No. | Line Item No. | SO No. | Line Item No. | Product ID | Desc. | Qty | Unit Price per | Amount |
|---|---|---|---|---|---|---|---|---|
| 1 | 1 | 1 | 1 | 123 | dsafdfds | 100 bags. | 100/bags | 10000.0 |

GRAND TOTAL: 10,000.00

1156

⦿ FCL    ○ LCL    ○ Mixed    ○ None
Equipment: 3 x 20ft Dry Bulk containers

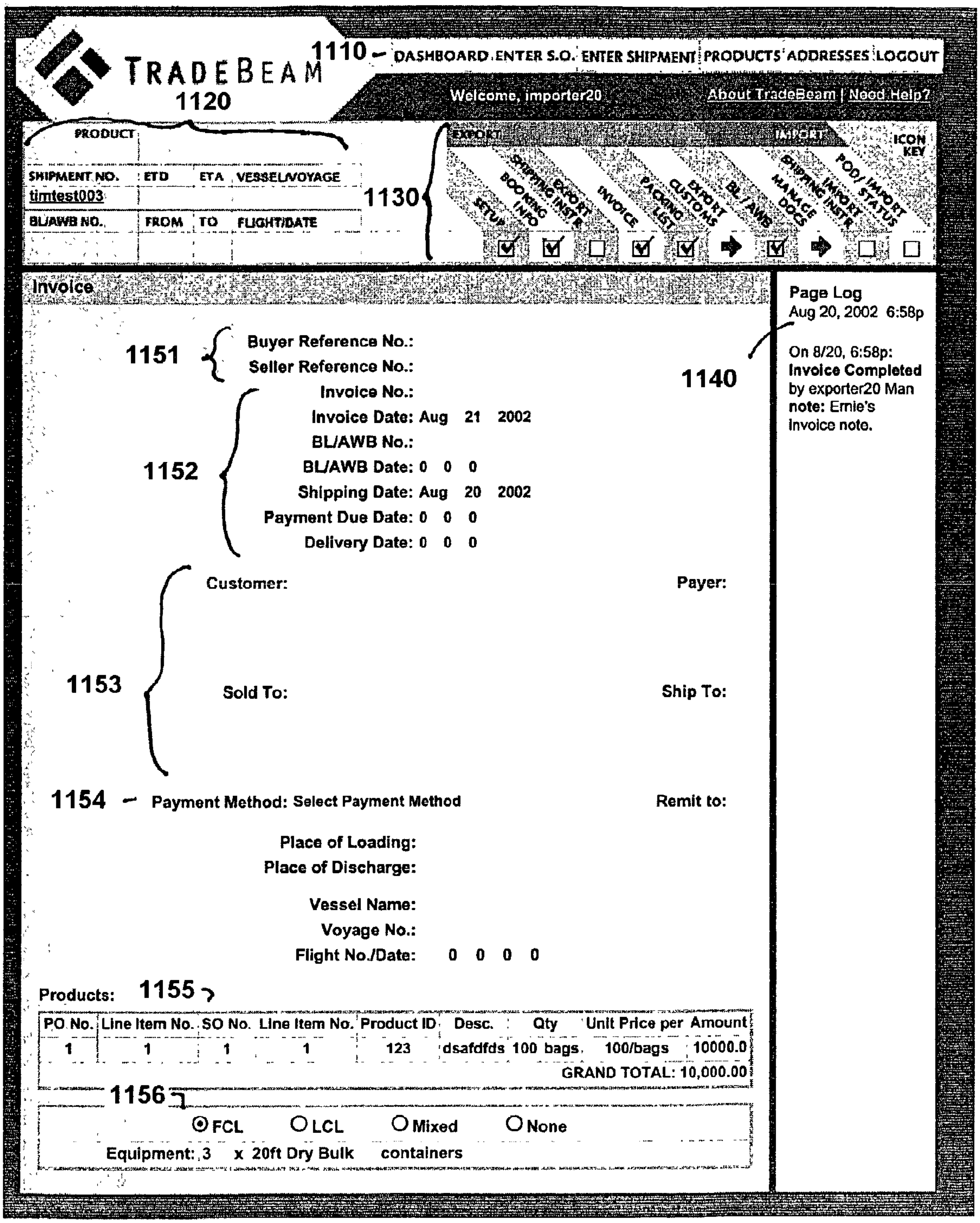

Fig. 11A

1157 — Payment Terms:
1158 — Delivery Terms: FOB
1159 { Letter of Credit No.:
Letter of Credit Remarks:

Customer Note:

Special Instructions:

1160
Continue This Shipment

Shipment participant responsible for completing the next step:

➡ Exporter (GlobalEnterprises exporter20 Man)
Importer (AceImporting importer20 Man)
ExportForwarder (GlobalEnterprises exporter20 Man)
ImportForwarder ()
CustomsHouseBroker ()

CC (Separate recipient email addresses with commas.)

Notes:

(These notes will be visible to any user accessing this document.)

Contact Us! | ©2001-2002 TradeBeam Inc.

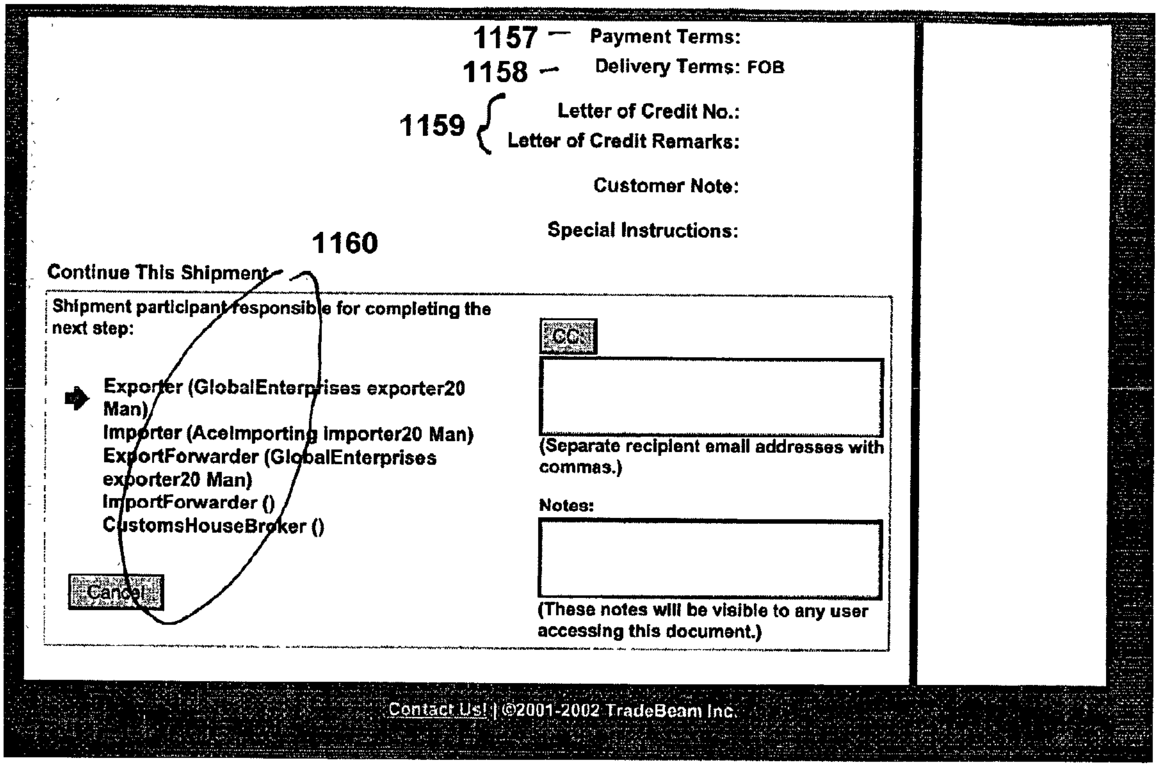

Fig. 11B

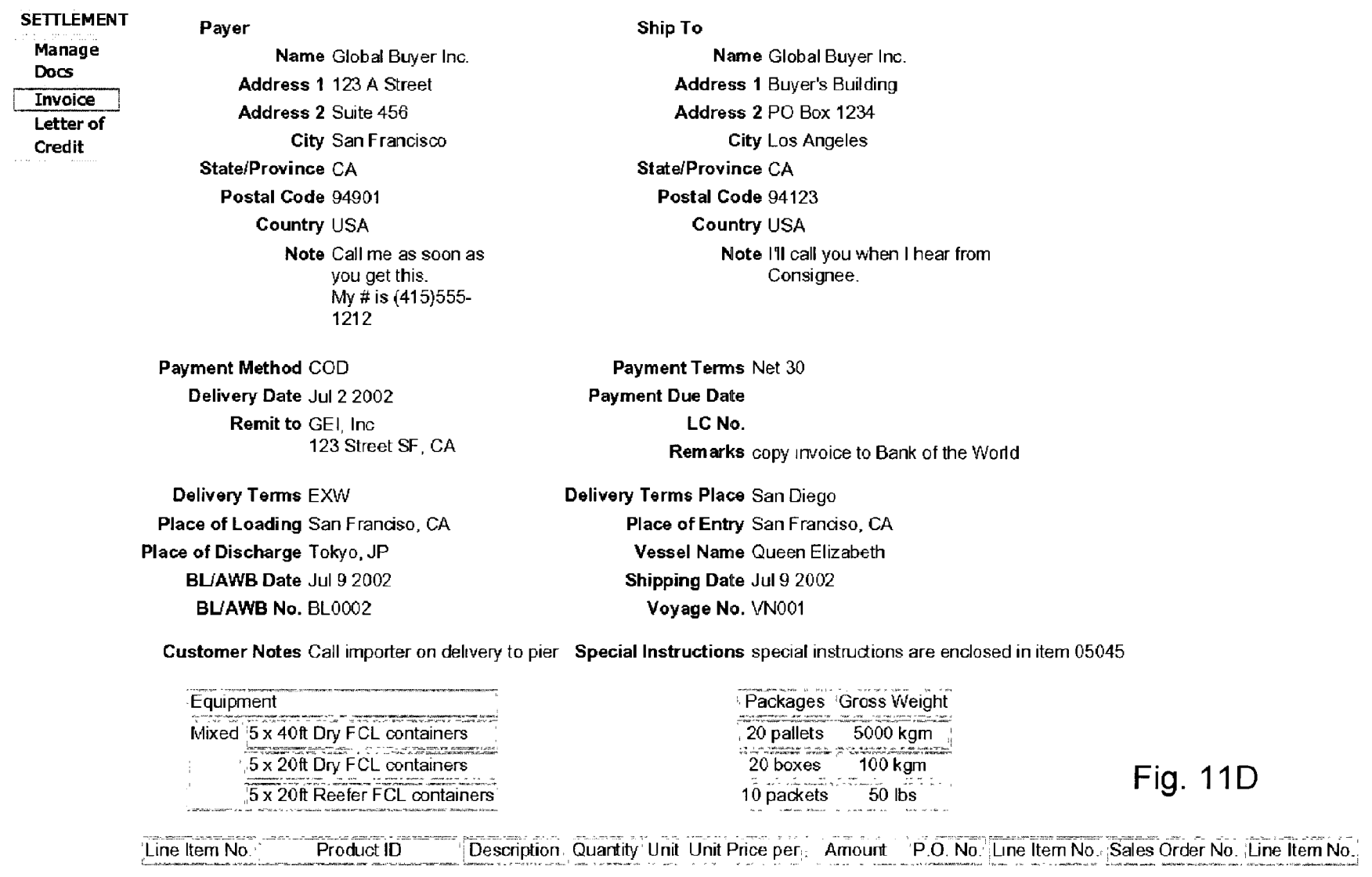

SETTLEMENT
- Manage Docs
- Invoice
- Letter of Credit

| Payer | | Ship To | |
|---|---|---|---|
| **Name** | Global Buyer Inc. | **Name** | Global Buyer Inc. |
| **Address 1** | 123 A Street | **Address 1** | Buyer's Building |
| **Address 2** | Suite 456 | **Address 2** | PO Box 1234 |
| **City** | San Francisco | **City** | Los Angeles |
| **State/Province** | CA | **State/Province** | CA |
| **Postal Code** | 94901 | **Postal Code** | 94123 |
| **Country** | USA | **Country** | USA |
| **Note** | Call me as soon as you get this. My # is (415)555-1212 | **Note** | I'll call you when I hear from Consignee. |

| | | | |
|---|---|---|---|
| **Payment Method** | COD | **Payment Terms** | Net 30 |
| **Delivery Date** | Jul 2 2002 | **Payment Due Date** | |
| **Remit to** | GEI, Inc 123 Street SF, CA | **LC No.** | |
| | | **Remarks** | copy invoice to Bank of the World |
| **Delivery Terms** | EXW | **Delivery Terms Place** | San Diego |
| **Place of Loading** | San Franciso, CA | **Place of Entry** | San Franciso, CA |
| **Place of Discharge** | Tokyo, JP | **Vessel Name** | Queen Elizabeth |
| **BL/AWB Date** | Jul 9 2002 | **Shipping Date** | Jul 9 2002 |
| **BL/AWB No.** | BL0002 | **Voyage No.** | VN001 |
| **Customer Notes** | Call importer on delivery to pier | **Special Instructions** | special instructions are enclosed in item 05045 |

| Equipment | |
|---|---|
| Mixed | 5 x 40ft Dry FCL containers |
| | 5 x 20ft Dry FCL containers |
| | 5 x 20ft Reefer FCL containers |

| Packages | Gross Weight |
|---|---|
| 20 pallets | 5000 kgm |
| 20 boxes | 100 kgm |
| 10 packets | 50 lbs |

Fig. 11D

| Line Item No. | Product ID | Description | Quantity | Unit | Unit Price per | Amount | P.O. No. | Line Item No. | Sales Order No. | Line Item No. |
|---|---|---|---|---|---|---|---|---|---|---|

| | | | | | | | | | | |
|---|---|---|---|---|---|---|---|---|---|---|
| 00001 | PRD-000000003454988 | JinSen 5 yrs, Diet Supplement | 5000 | Box | 2.00 | 1000.00 | PO0002 | LI0002 | SO0002 | LI0003 |
| 00002 | PRD-000000000032545 | Extra Large Frame | 1000 | Car | 2000.00 | 2000000.00 | PO0002 | LI0002 | SO0002 | LI0003 |
| 00003 | PRD-000000000243324 | Extra Large Sheet | 2000 | Box | 2.00 | 4000.00 | PO0002 | LI0002 | SO0002 | LI0003 |
| | | | | | Total | **2005000.00** | | | | |
| | | | | | Freight | 50.00 | | | | |
| | | | | | Insurance | 500.00 | | | | |
| | | | | | | 0.00 | | | | |
| | | | | | | 0.00 | | | | |
| | | | | | | 0.00 | | | | |
| | | | | | Grand Total | **2005550.00** | | | | |

©2001-2002 TradeBeam Inc.

Fig. 11E

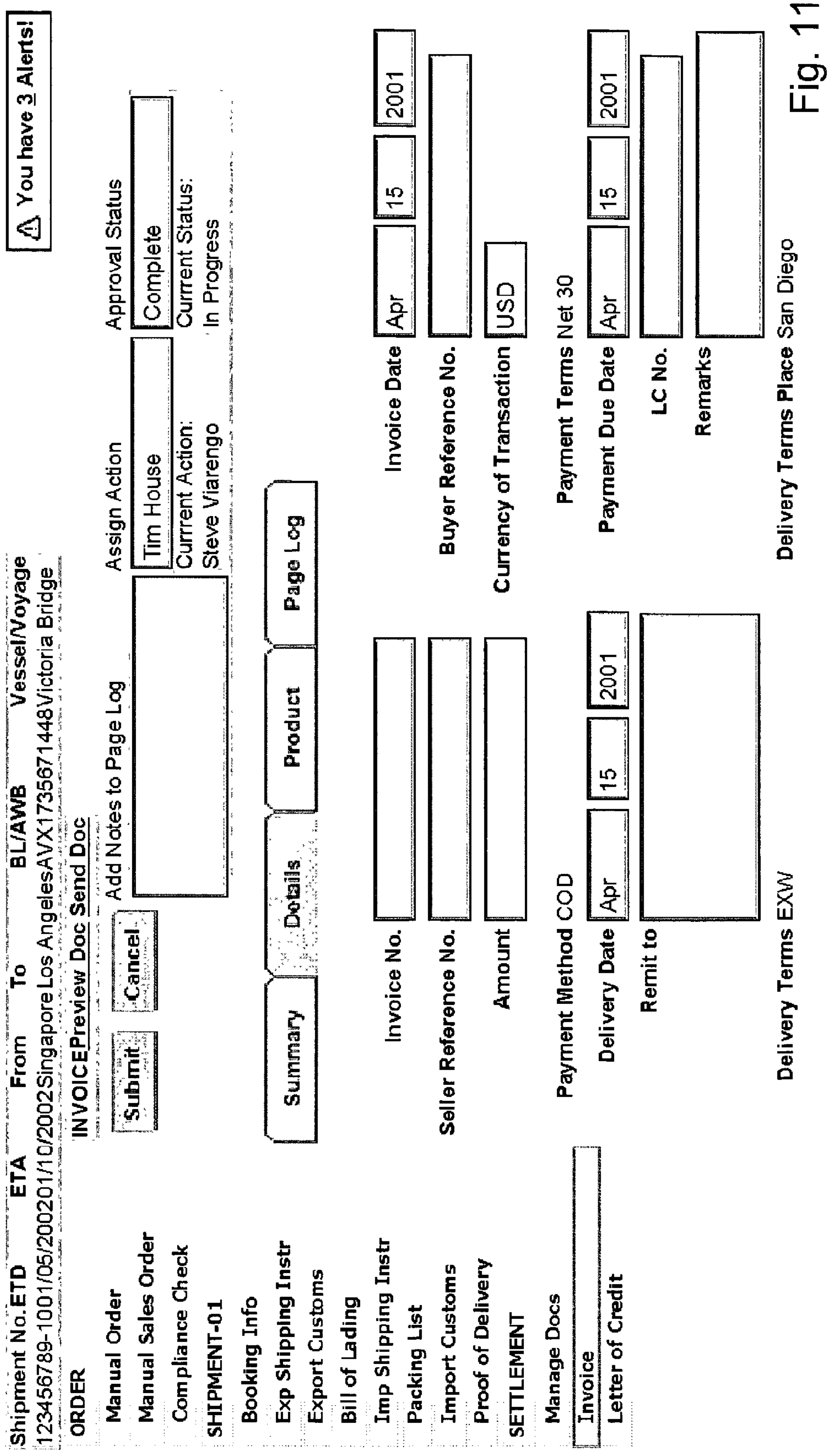

Fig. 11F

HOME | DASHBOARD | DOCUMENT VAULT | REPORTS | ADMINISTRATION | HELP | LOGOUT

Welcome John Smith    Multi-National Global Corporation
Portfolio: Inorganic Chemicals Corporation Shipment No. ETD    ETA    From    To    BL/AWB    Vessel/Voyage
123456789-1001 05/1/2002 01/10/2002 Singapore Los Angeles AVX1735671448 Victoria Bridge

ORDER
- Manual Order
- Manual Sales Order
- Compliance Check

SHIPMENT-01
- Booking Info
- Exp Shipping Instr
- Export Customs
- Bill of Lading
- Imp Shipping Instr
- Packing List
- Import Customs
- Proof of Delivery

SETTLEMENT
- Manage Docs
- Invoice
- Letter of Credit

INVOICE Preview Doc Send Doc

⚠ You have 3 Alerts!

Add Notes to Page Log

[Submit] [Cancel]

Assign Action    Approval Status
Tim House    Complete
Current Action:    Current Status:
Steve Viarengo    In Progress Summary | Details | Product | Page Log Invoice No. [        ]    Invoice Date  Apr  15  2001

Seller Reference No. [        ]    Buyer Reference No. [        ]

Amount [        ]    Currency of Transaction  USD

Payment Method COD                    Payment Terms Net 30

Delivery Date  Apr  15  2001    Payment Due Date  Apr  15  2001

Remit to [        ]    LC No. [        ]

Remarks [        ]

Delivery Terms EXW                    Delivery Terms Place San Diego

Place of Entry
Vessel Name
Shipping Date: Apr 15 2001
Voyage No.
Special Instructions Place of Loading
Place of Discharge
BL/AWB Date: Apr 15 2001
BL/AWB No.
Customer Notes ©2001-2002 TradeBeam Inc.

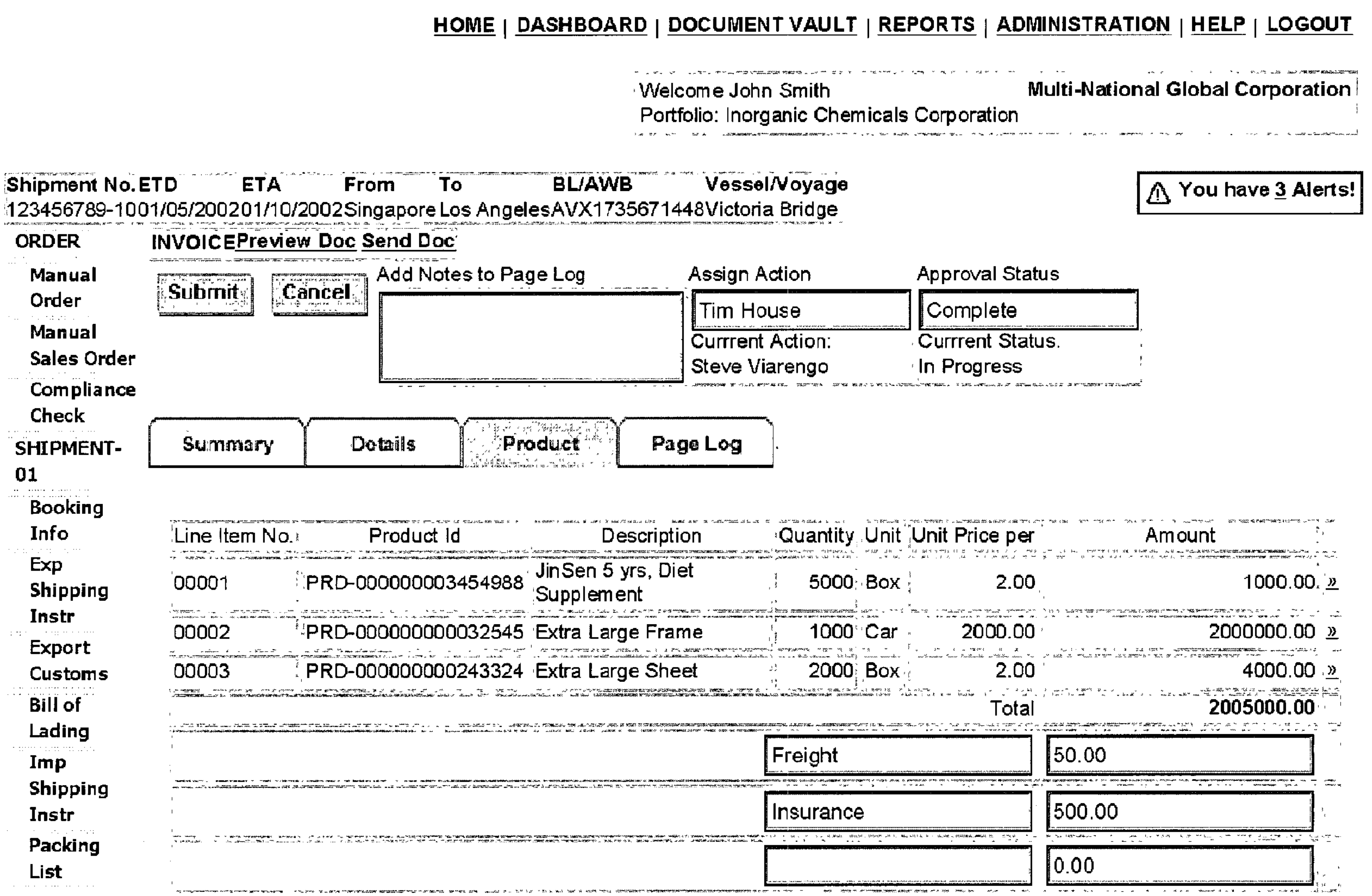

Fig. 11H

HOME | DASHBOARD | DOCUMENT VAULT | REPORTS | ADMINISTRATION | HELP | LOGOUT

Welcome John Smith        Multi-National Global Corporation
Portfolio: Inorganic Chemicals Corporation Shipment No. ETD          ETA          From         To        BL/AWB        Vessel/Voyage
1234567889-1001/05/2002  01/10/2002  Singapore  Los Angeles  AVX1735671448  Victoria Bridge ⚠ You have 3 Alerts!

ORDER  INVOICE Preview Doc Send Doc

Manual Order    [Submit] [Cancel]

Manual Sales Order    Add Notes to Page Log    Assign Action    Approval Status
                                               [Tim House]      [Complete]

Compliance Check                               Currrent Action:  Currrent Status.
                                               Steve Viarengo    In Progress

SHIPMENT-01

Booking Info    [Summary] [Details] [Product] [Page Log]

Exp Shipping Instr

Export Customs

| Line Item No. | Product Id | Description | Quantity | Unit | Unit Price per | Amount |
|---|---|---|---|---|---|---|
| 00001 | PRD-000000003454988 | JinSen 5 yrs, Diet Supplement | 5000 | Box | 2.00 | 1000.00 » |
| 00002 | PRD-000000000032545 | Extra Large Frame | 1000 | Car | 2000.00 | 2000000.00 » |
| 00003 | PRD-000000000243324 | Extra Large Sheet | 2000 | Box | 2.00 | 4000.00 » |
| | | | | | Total | 2005000.00 |

Bill of Lading

Imp Shipping Instr    Freight    50.00

Packing List          Insurance  500.00

0.00

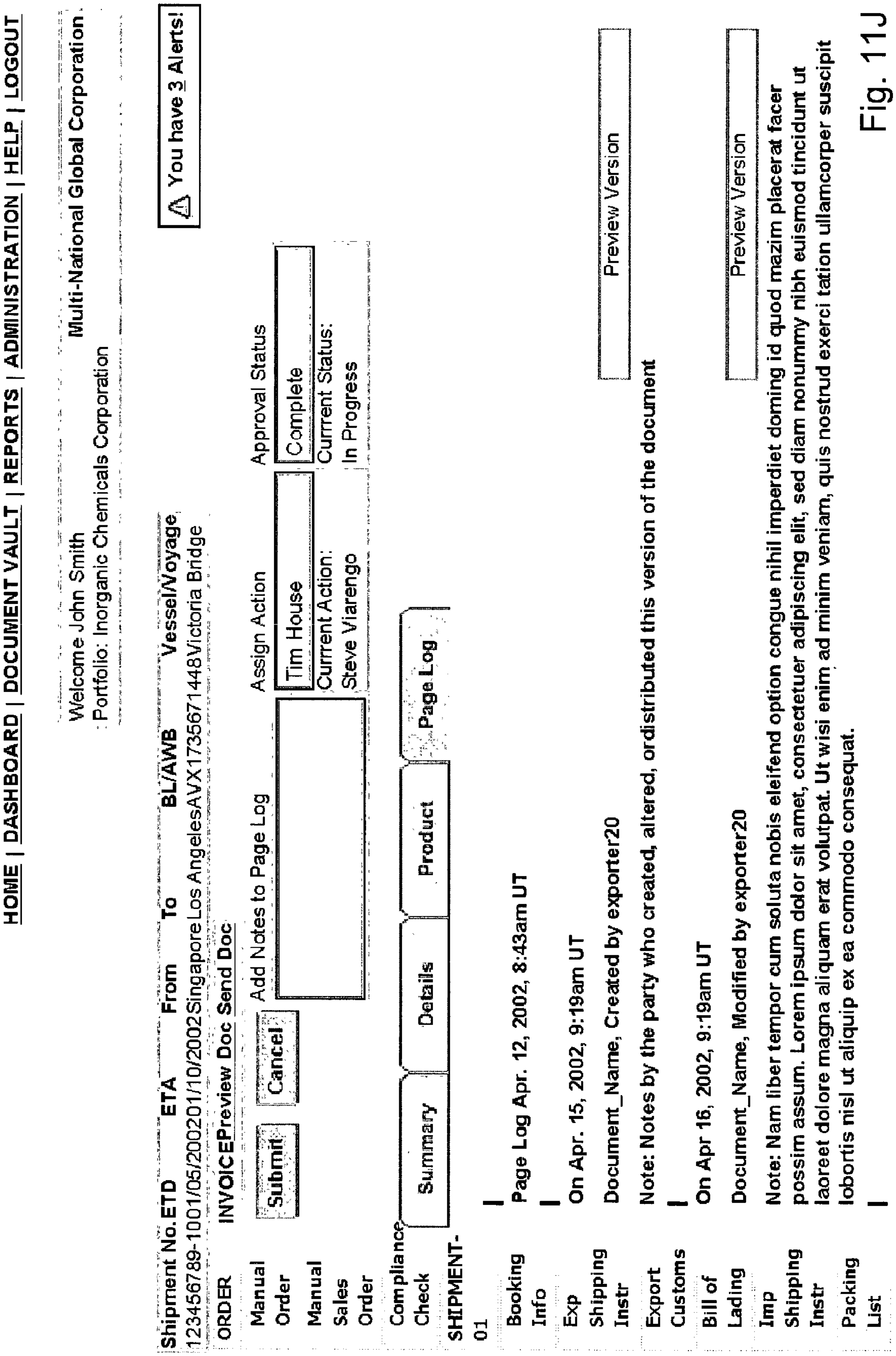

Fig. 11J

HOME | DASHBOARD | DOCUMENT VAULT | REPORTS | ADMINISTRATION | HELP | LOGOUT

Welcome John Smith          Multi-National Global Corporation
Portfolio: Inorganic Chemicals Corporation ⚠ You have 3 Alerts!

Shipment No. ETD          ETA          From          To          BL/AWB          Vessel/Voyage
1234567 89-1001/05/2002 01/10/2002 Singapore Los Angeles AVX1735671448 Victoria Bridge ORDER          INVOICE  Preview Doc  Send Doc Manual Order          [Submit]  [Cancel]          Add Notes to Page Log          Assign Action          Approval Status Manual Sales Order                                                                Tim House              Complete Compliance Check                                                                  Current Action:        Current Status:
                                                                                  Steve Viarengo         In Progress

SHIPMENT-01

| Summary | Details | Product | Page Log |

Booking Info          Page Log Apr. 12, 2002, 8:43am UT

Exp Shipping Instr          On Apr. 15, 2002, 9:19am UT

Export Customs          Document_Name, Created by exporter20

Bill of Lading          Note: Notes by the party who created, altered, or distributed this version of the document    [Preview Version]

Imp Shipping Instr          On Apr. 16, 2002, 9:19am UT

Packing List          Document_Name, Modified by exporter20

Note: Nam liber tempor cum soluta nobis eleifend option congue nihil imperdiet doming id quod mazim placerat facer possim assum. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.          [Preview Version]

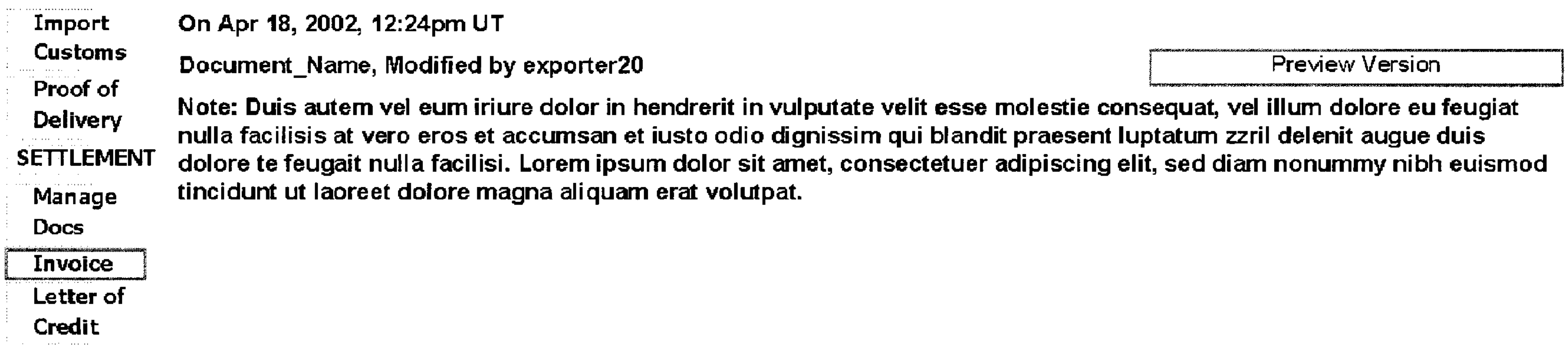

Document_Name, Modified by exporter20

Preview Version

Note: Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat.

Import
Customs
Proof of
Delivery
SETTLEMENT
Manage
Docs
Invoice
Letter of
Credit

TRADEBEAM

1220
PRODUCT

SHIPMENT NO.  ETD  ETA  VESSEL/VOYAGE
timtest003
BL/AWB NO.  FROM  TO  FLIGHT/DATE 1210 — DASHBOARD ENTER S.O. ENTER SHIPMENT PRODUCTS ADDRESSES LOGOUT
Welcome, importer20  About TradeBeam | Need Help?

1230

EXPORT  IMPORT  ICON KEY

Packing List  Page Log

Seller Reference No.:
Invoice No.:    } 1251
BL/AWB No.:

1240

Customer: importer20 Man, — 1252

BL/AWB Date:
Invoice Date: Aug 21 2002  } 1253
Date of Shipment: Aug 20 2002

Place of Loading:
Place of Discharge:
Point of Origin:
Vessel Name:
Voyage No.:
Flight No./Date:    } 1254
Letter of Credit No.:
Letter of Credit Remarks:

Lots: 1255

| Numbers | Prod. SeqNo / Prod. ID | Desc. | Qty. | Package Unit Wt. Net Wt. Gross Wt. Marks and Nos. |
|---|---|---|---|---|
| Container Lot | 123 | | 100 | |
| NONE | | | bags | |
| Seal Pickup | Package ID NONE | | | |

Total Qty: 100

1256

● FCL   LCL   Mixed   None
Equipment: 3 x 20ft Dry Bulk containers

Special Instructions: (These instructions will appear in the final printed document.)

Continue This Shipment

Notify the shipment participant responsible for completing the next step:

1260

➤ Exporter (GlobalEnterprises exporter20 Man)
Importer (AceImporting importer20 Man)
ExportForwarder (GlobalEnterprises exporter20 Man)
ImportForwarder ()
CustomsHouseBroker ()

(Separate recipient email addresses with commas.)

Notes:

(These notes will be visible to any user accessing this document.)

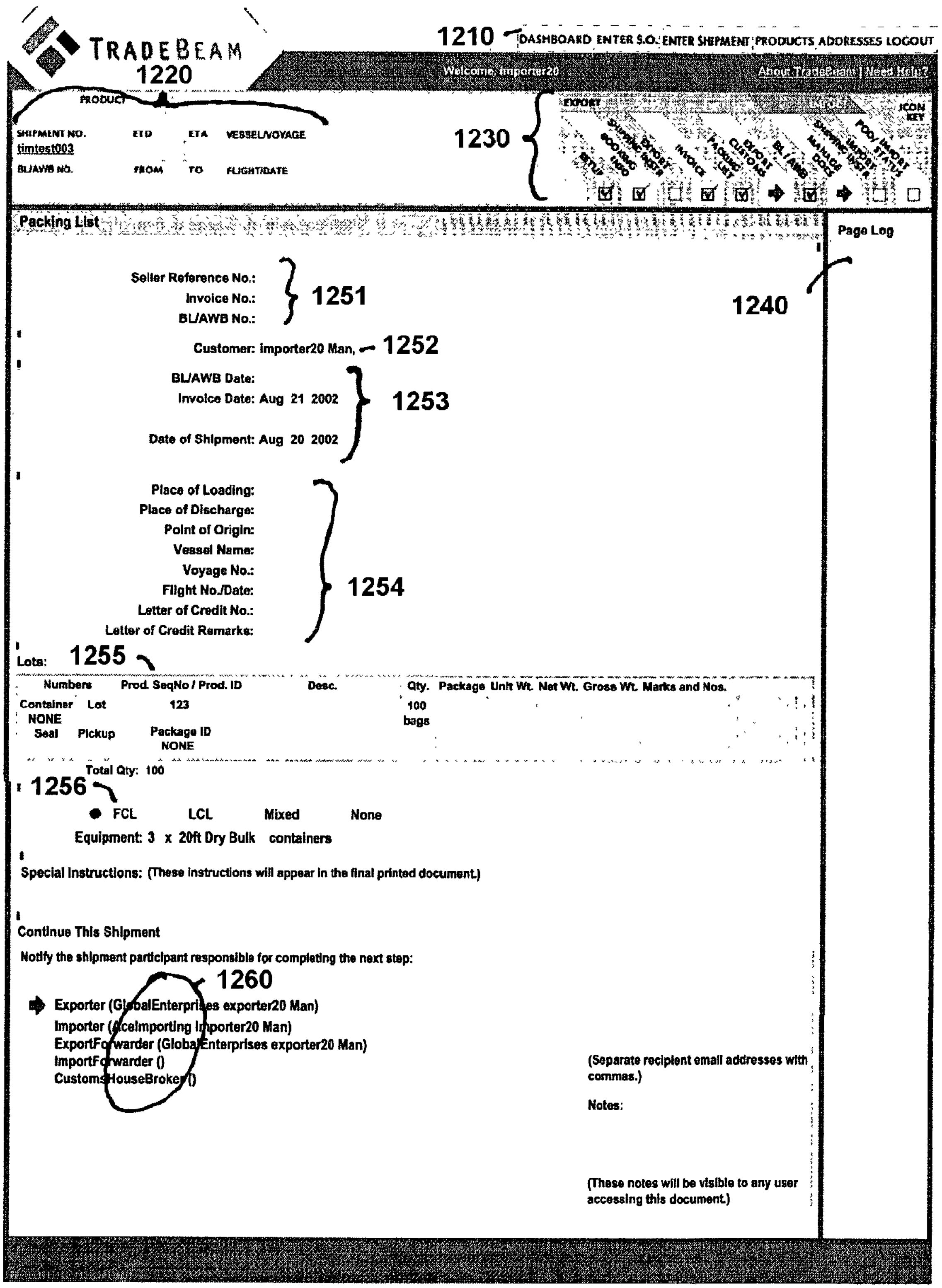

Fig. 12A

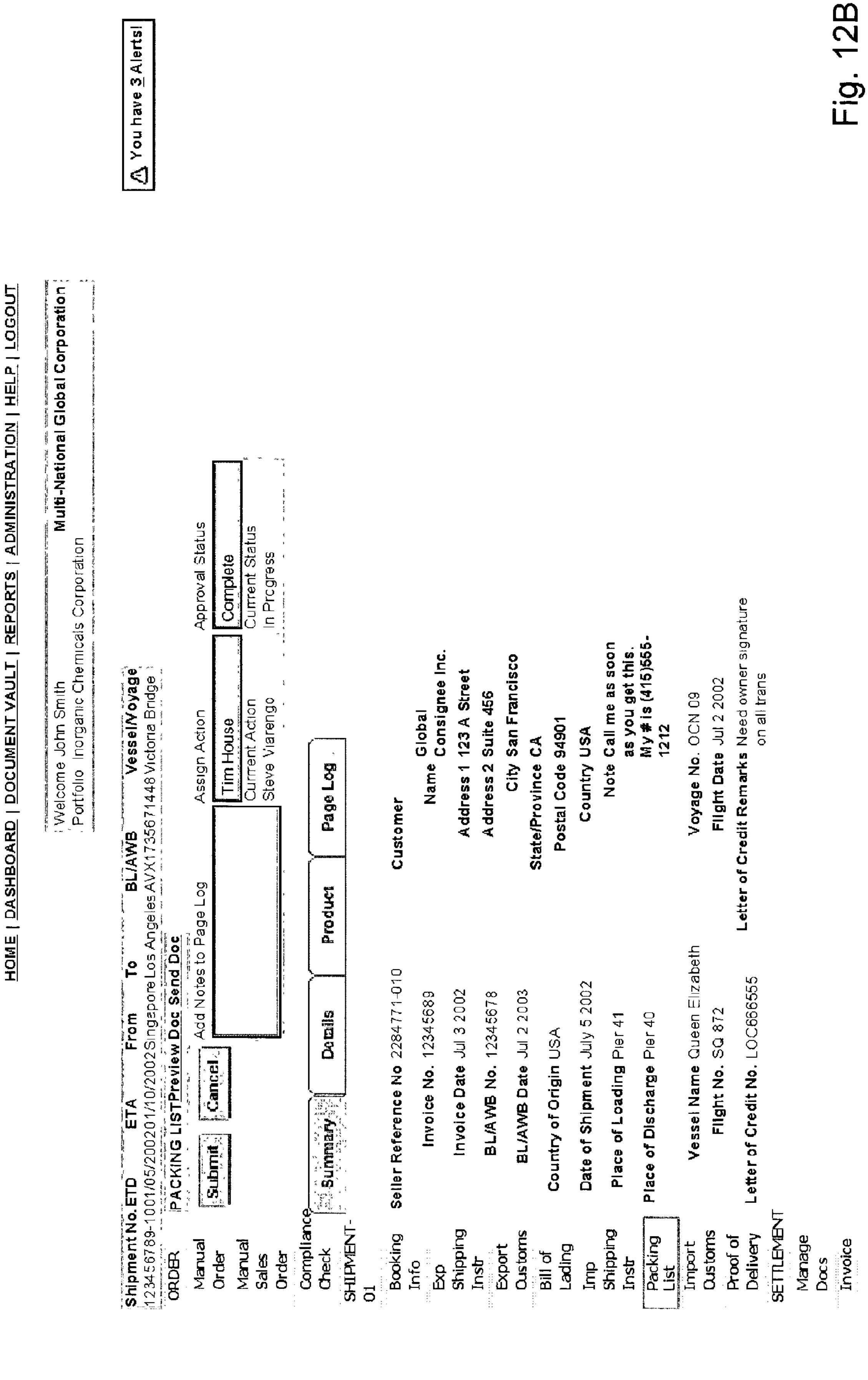

Fig. 12B

HOME | DASHBOARD | DOCUMENT VAULT | REPORTS | ADMINISTRATION | HELP | LOGOUT

Welcome John Smith    Multi-National Global Corporation
Portfolio Inorganic Chemicals Corporation ⚠ You have 3 Alerts!

Shipment No. ETD   ETA   From   To   BL/AWB   Vessel/Voyage
1234567889-1001/05/2002 01/10/2002 Singapore Los Angeles AVX1735671448 Victoria Bridge

ORDER

PACKING LIST Preview Doc Send Doc

Manual Order   [Submit] [Cancel]

Manual Sales Order

Compliance Check

| Summary | Details | Product | Page Log |

| | Add Notes to Page Log | Assign Action | Approval Status |
| | | Tim House | Complete |
| | | Current Action | Current Status |
| | | Steve Viarengo | In Progress |

SHIPMENT-01

Booking Info   Seller Reference No 2284771-010

Exp Shipping Instr   Invoice No. 12345689

Invoice Date Jul 3 2002

Export Customs   BL/AWB No. 12345678

Bill of Lading   BL/AWB Date Jul 2 2003

Country of Origin USA

Imp Shipping Instr   Date of Shipment July 5 2002

Place of Loading Pier 41

Packing List   Place of Discharge Pier 40

Import Customs   Vessel Name Queen Elizabeth

Proof of Delivery   Flight No. SQ 872

Letter of Credit No. LOC666555

SETTLEMENT

Manage Docs

Invoice

Customer

Name   Global Consignee Inc.
Address 1   123 A Street
Address 2   Suite 456
City   San Francisco
State/Province   CA
Postal Code   94901
Country   USA
Note   Call me as soon as you get this. My # is (415)555-1212

Voyage No. OCN 09

Flight Date Jul 2 2002

Letter of Credit Remarks   Need owner signature on all trans

Letter of Credit

| Equipment | | Packages | Gross Weight |
|---|---|---|---|
| Mixed | 5 x 40ft Dry FCL containers | 20 pallets | 5000 kgm |
| | 5 x 20ft Dry FCL containers | 20 boxes | 100 kgm |
| | 5 x 20ft Reefer FCL containers | 10 packets | 50 lbs |

Lots

| Container No | Seal No | Lot No | Pickup No | Product ID | Description | Quantity | Package | Unit Wt | Net Weight | Gross Weight | Marks & Nos |
|---|---|---|---|---|---|---|---|---|---|---|---|
| C1234 | S1234 | Lot#1 | 12376 | PID12098 | Coking Coal | 25000 mtn | | 25 mtn | 25000 00 kgs | 25000 00 kgs | Some marks and numbers |
| CSL1252 | S1234 | Lot#1 | 12376 | PID45095 | High Tensile Steel | 2000 mtn | | 125 mtn | 5000 00 kgs | 2000 00 kgs | Some marks and numbers |
| C340 | S7840 | Lot#3 | 56370 | PID1245208 | Bauxite | 25999 mtn | | 2 mtn | 2006 00 kgs | 2008 00 kgs | Some other marks and numbers |
| CXF1244-01 | S1234 | Lot#1 | 12376 | PID45095-02 | Oil of Vitriol | 22200 gal | | 125 gal | 5000 00 kgs | 2000 00 kgs | |
| Totals | | | | | | | | | | | |
| | | | | | | | | | **37006.00 kgs** | **31008.00 kgs** | |

Fig. 12C

HOME | DASHBOARD | DOCUMENT VAULT | REPORTS | ADMINISTRATION | HELP | LOGOUT

Welcome John Smith    Multi-National Global Corporation
Portfolio: Inorganic Chemicals Corporation ⚠ You have 3 Alerts!

Shipment No. ETD  ETA  From  To  BL/AWB  Vessel/Voyage
1234567-89-1001/05/2002 01/10/2002 Singapore Los Angeles AVX1735671448 Victoria Bridge PACKING LIST  Preview Doc  Send Doc

ORDER
- Manual Order
- Manual Sales Order
- Compliance Check

SHIPMENT-01
- Booking Info
- Exp Shipping Instr
- Export Customs
- Bill of Lading
- Imp Shipping Instr
- Packing List
- Import Customs
- Proof of Delivery

SETTLEMENT
- Manage Docs
- Invoice
- Letter of Credit

[Submit]  [Cancel]

Add Notes to Page Log

Assign Action: Tim House
Current Action: Steve Viarengo

Approval Status: Complete
Current Status: In Progress

[ Summary ]  [ Details ]  [ Product ]  [ Page Log ]

Seller Reference No 2284771-010

Invoice No. [           ]
BL/AWB No. [           ]
BL/AWB Date [Apr] [15] [2001]
Invoice Date [Apr] [15] [2001]
Date of Shipment [Apr] [15] [2001]
Country [Country Name DropDown]
Place of Loading [           ]

Customer
  Name Global Consignee Inc.
  Address 1 123 A Street
  Address 2 Suite 456
  City San Francisco
  State/Province CA
  Postal Code 94901
  Country USA
  Note Call me as soon as you get this.
  My # is (415)555-1212

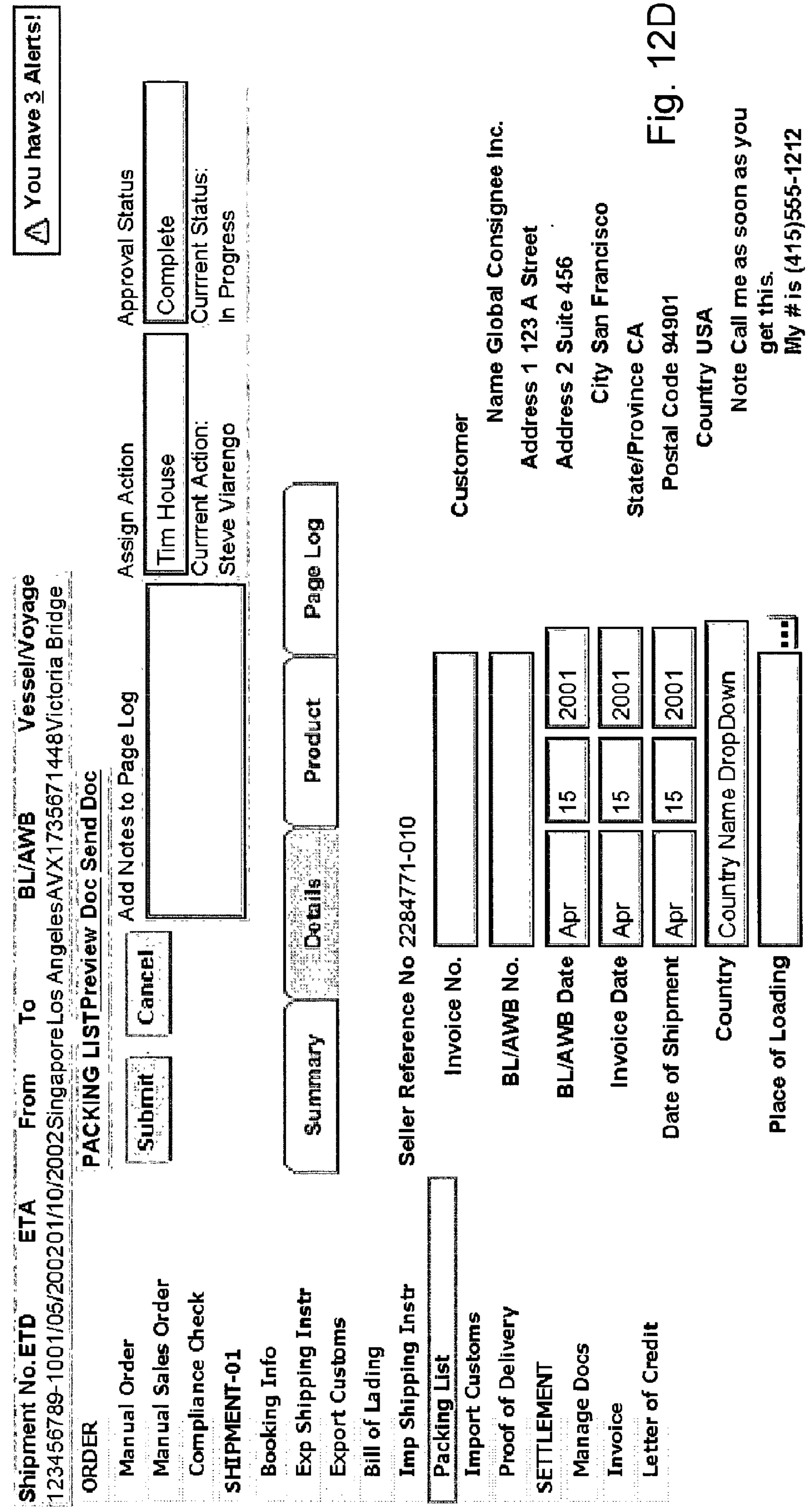

Fig. 12D

HOME | DASHBOARD | DOCUMENT VAULT | REPORTS | ADMINISTRATION | HELP | LOGOUT

Welcome John Smith                Multi-National Global Corporation
Portfolio: Inorganic Chemicals Corporation ⚠ You have 3 Alerts!

Shipment No. ETD       ETA        From        To         BL/AWB        Vessel/Voyage
1234567891-1001/05/200201/10/2002Singapore Los AngelesAVX173567144 8Victoria Bridge ORDER
 PACKING LIST Preview Doc Send Doc Manual       Add Notes to Page Log       Assign Action       Approval Status
Order
                                         ┌──────────┐        ┌──────────┐
Manual       ┌────────┐  ┌────────┐      │Tim House │        │Complete  │
Sales        │ Submit │  │ Cancel │      └──────────┘        └──────────┘
Order        └────────┘  └────────┘      Current Action:     Current Status:
                                         Steve Viarengo      In Progress
Compliance
Check
                  ┌───────┐ ┌───────┐ ┌──────────┐ ┌────────┐
SHIPMENT-         │Summary│ │Details│ │Page Log  │ │Product │
01                └───────┘ └───────┘ └──────────┘ └────────┘

Booking      Page Log Apr. 12, 2002, 8:43am UT
Info
             On Apr. 15, 2002, 9:19am UT                              ┌─────────────────┐
Exp                                                                   │ Preview Version │
Shipping     Document_Name, Created by exporter20                     └─────────────────┘
Instr
             Note: Notes by the party who created, altered, or distributed this version of the document
Export
Customs      On Apr 16, 2002, 9:19am UT                               ┌─────────────────┐
                                                                      │ Preview Version │
Bill of      Document_Name, Modified by exporter20                    └─────────────────┘
Lading
             Note: Nam liber tempor cum soluta nobis eleifend option congue nihil imperdiet doming id quod mazim placerat facer
Imp          possim assum. Lorem ipsum dolor sit amet, consectetuer adipiscing elit, sed diam nonummy nibh euismod tincidunt ut
Shipping     laoreet dolore magna aliquam erat volutpat. Ut wisi enim ad minim veniam, quis nostrud exerci tation ullamcorper suscipit
Instr        lobortis nisl ut aliquip ex ea commodo consequat.

Packing
List

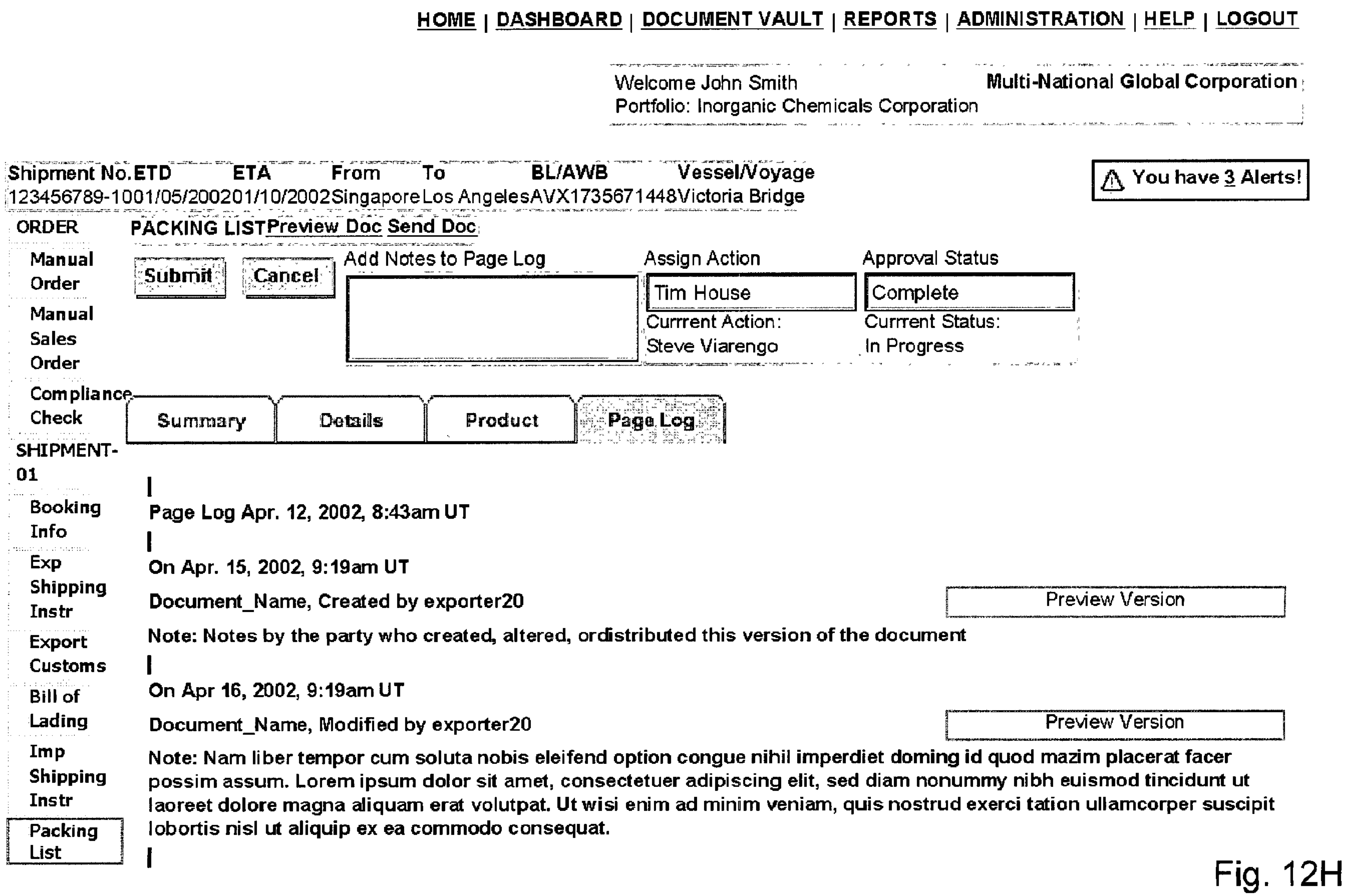

Fig. 12H

TRADEBEAM

1310 — DASHBOARD ENTER S.O. ENTER SHIPMENT PRODUCTS ADDRESSES LOGOUT

Welcome, importer20    About TradeBeam | Need Help?

1320

PRODUCT

| SHIPMENT NO. | ETD | ETA | VESSEL/VOYAGE |
|---|---|---|---|
| timtest003 | | | |
| BL/AWB NO. | FROM | TO | FLIGHT/DATE |

1330 — EXPORT / IMPORT / ICON KEY (SETUP, SHIPPING INSTR, BOOKING INFO, EXPORT INSTR, INVOICE, PACKING LIST, EXPORT CUSTOMS, BL/AWB, SHIPPING INSTR MANCL DOCS, POD/IMPORT STATUS)

Bill of Lading

Status

| Document | Download | Upload |
|---|---|---|
| ☐ Proof Bill of Lading | Waiting for file...... | |
| ☐ Final Bill of Lading | Waiting for file...... | |

1351

Select a Carrier:
None Required

BLNo.: 1352

Shipper:
GlobalEnterprises, Man exporter20
1234 Main St.
San Diego, USA
1-650-653-4801(Fax)

Booking No.:

Export References: 1353

Consignee:

importer20 Man
San Diego
USA

Forwarding Agent:
GlobalEnterprises, Man exporter20
1234 Main St.
San Diego, USA
1-650-653-4801(Fax) 1354

Point/Country of Origin: — 1355

Notify Party:

importer20 Man
San Diego
USA

Domestic Routing / Export Instructions: 1356

AES XTN No.: — 1357

Loading Pier Terminal:

Type of Move: 1358

Freight Terms: — 1359

Page Log 1340

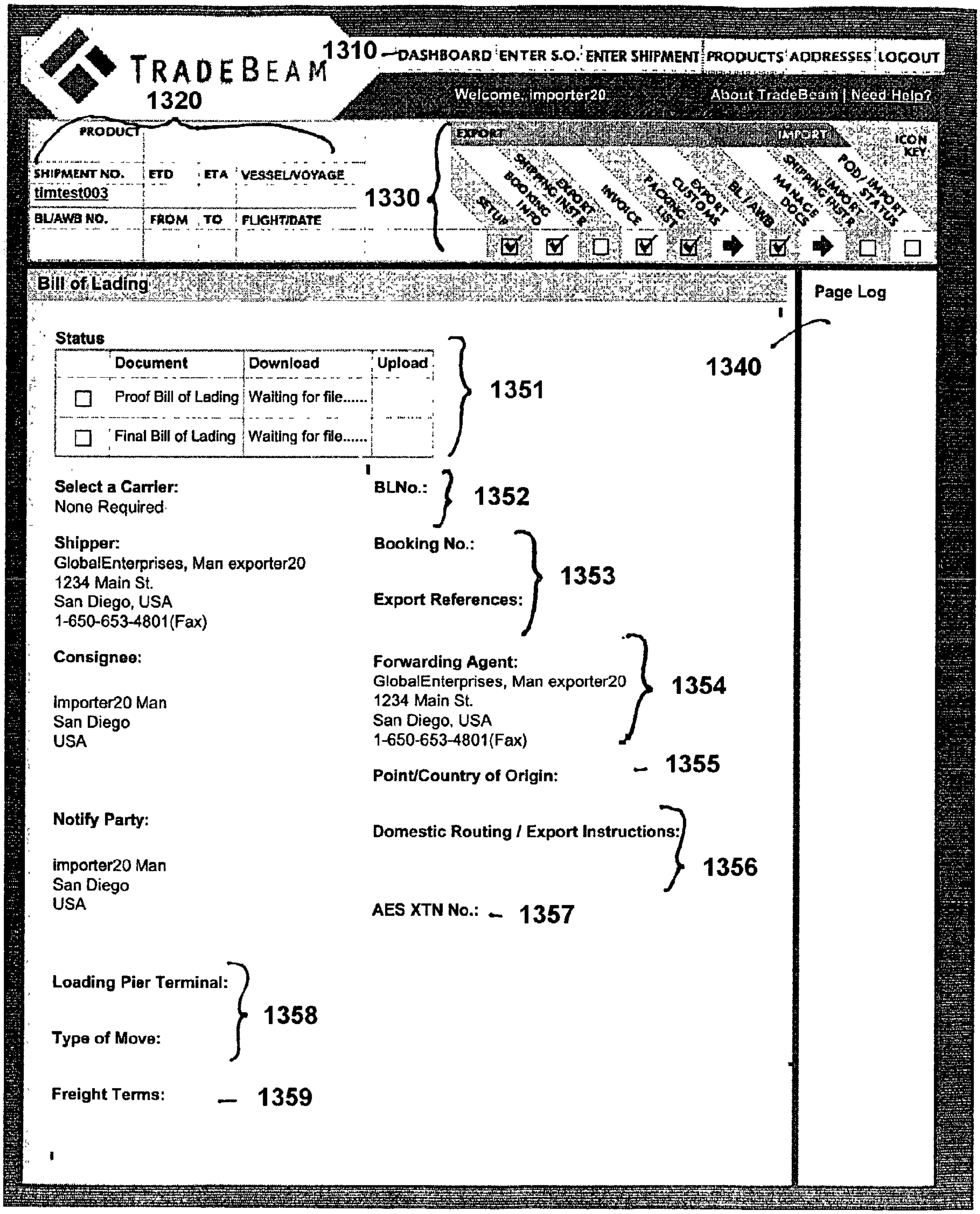

Fig. 13A

| Pre-Carriage: | Place of Receipt: | Port of Discharge: | 1360 |
| Vessel/Voyage No.: | | Port of Loading: | |
| | Place of Delivery: | | |
| | Bogota | 1361 | |

1362

- ⦿ FCL   ○ LCL   ○ Mixed   ○ None
- Equipment: 3  x  20ft Dry Bulk  containers

Special Instructions: (These instructions will appear in the final printed document.)

Continue This Shipment   1370

➡ Exporter (GlobalEnterprises exporter20 Man)
Importer (AceImporting importer20 Man)
ExportForwarder (GlobalEnterprises exporter20 Man)
ImportForwarder ()
CustomsHouseBroker ()

[Cancel]

CC:

(Separate recipient email addresses with commas.)

Notes:

(These notes will be visible to any user accessing this document.)

Contact Us! | ©2001-2002 TradeBeam Inc.

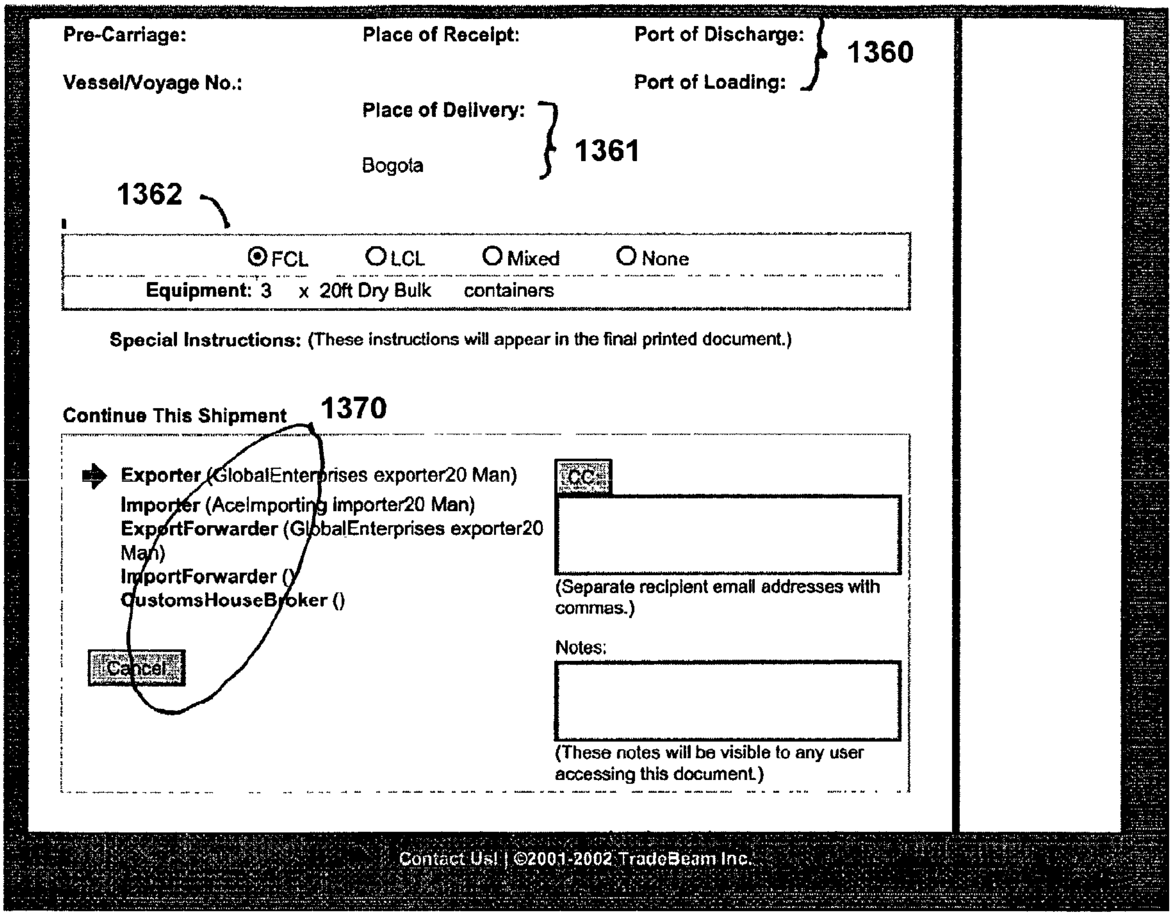

Fig. 13B

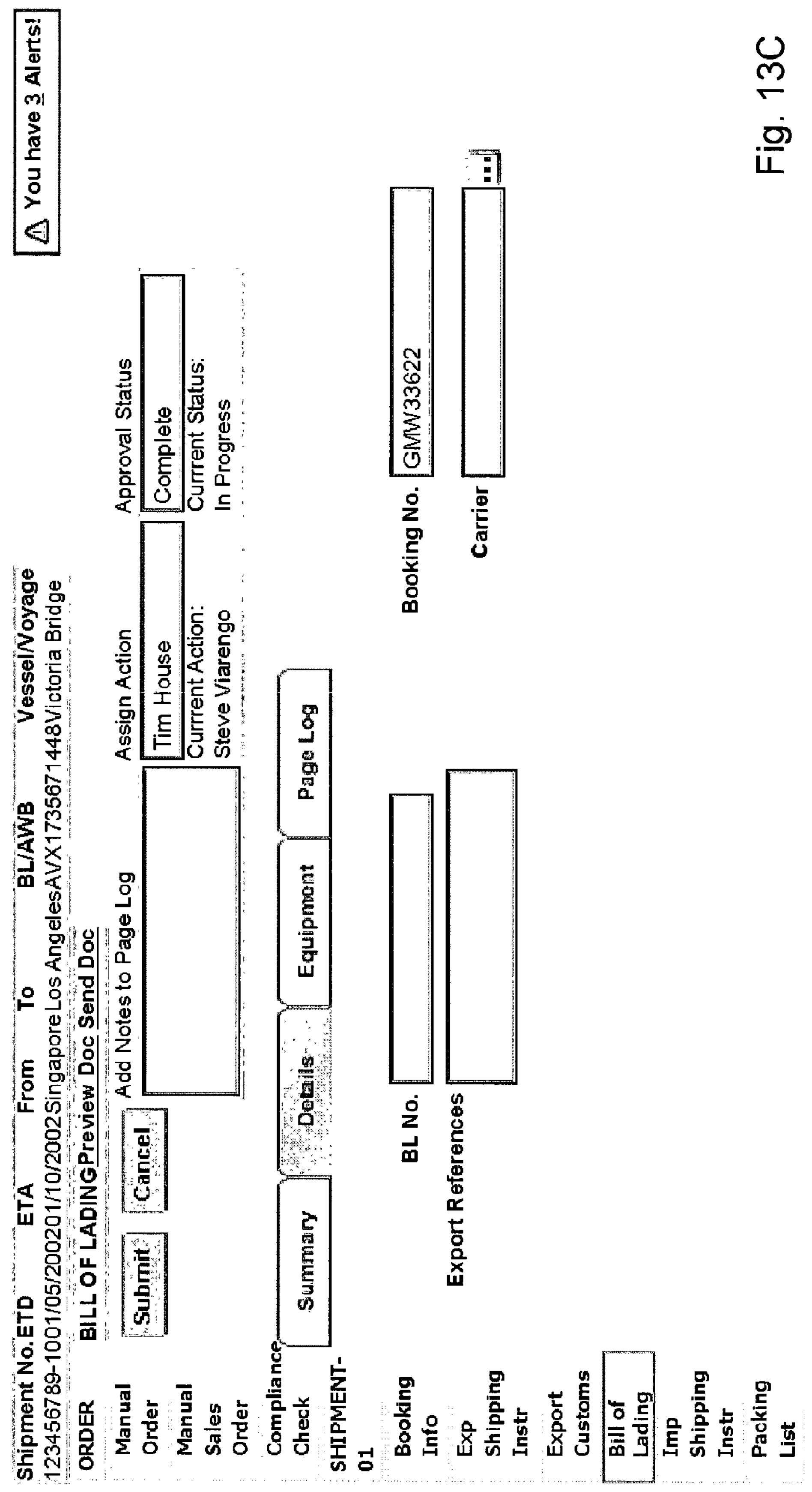

Fig. 13C

HOME | DASHBOARD | DOCUMENT VAULT | REPORTS | ADMINISTRATION | HELP | LOGOUT

Welcome John Smith        Multi-National Global Corporation
Portfolio: Inorganic Chemicals Corporation ⚠ You have 3 Alerts!

Shipment No. ETD          From    To    BL/AWB    Vessel/Voyage
12345678 9-1001/05/200201/10/2002 Singapore Los Angeles AVX17356714 48 Victoria Bridge ORDER      BILL OF LADING Preview Doc Send Doc Manual Order     [Submit] [Cancel]           Add Notes to Page Log    Assign Action        Approval Status
Manual Sales Order                                                    [Tim House]          [Complete]
                                                                      Currrent Action:     Currrent Status:
Compliance Check                                                      Steve Viarengo       In Progress SHIPMENT-01   [Summary]  [Details]  [Equipment]  [Page Log]

Booking Info      BL No. [           ]                    Booking No. [GMW33622]
Exp Shipping Instr
Export Customs    Export References [        ]            Carrier [         ⋯]
Bill of Lading
Imp Shipping Instr
Packing List

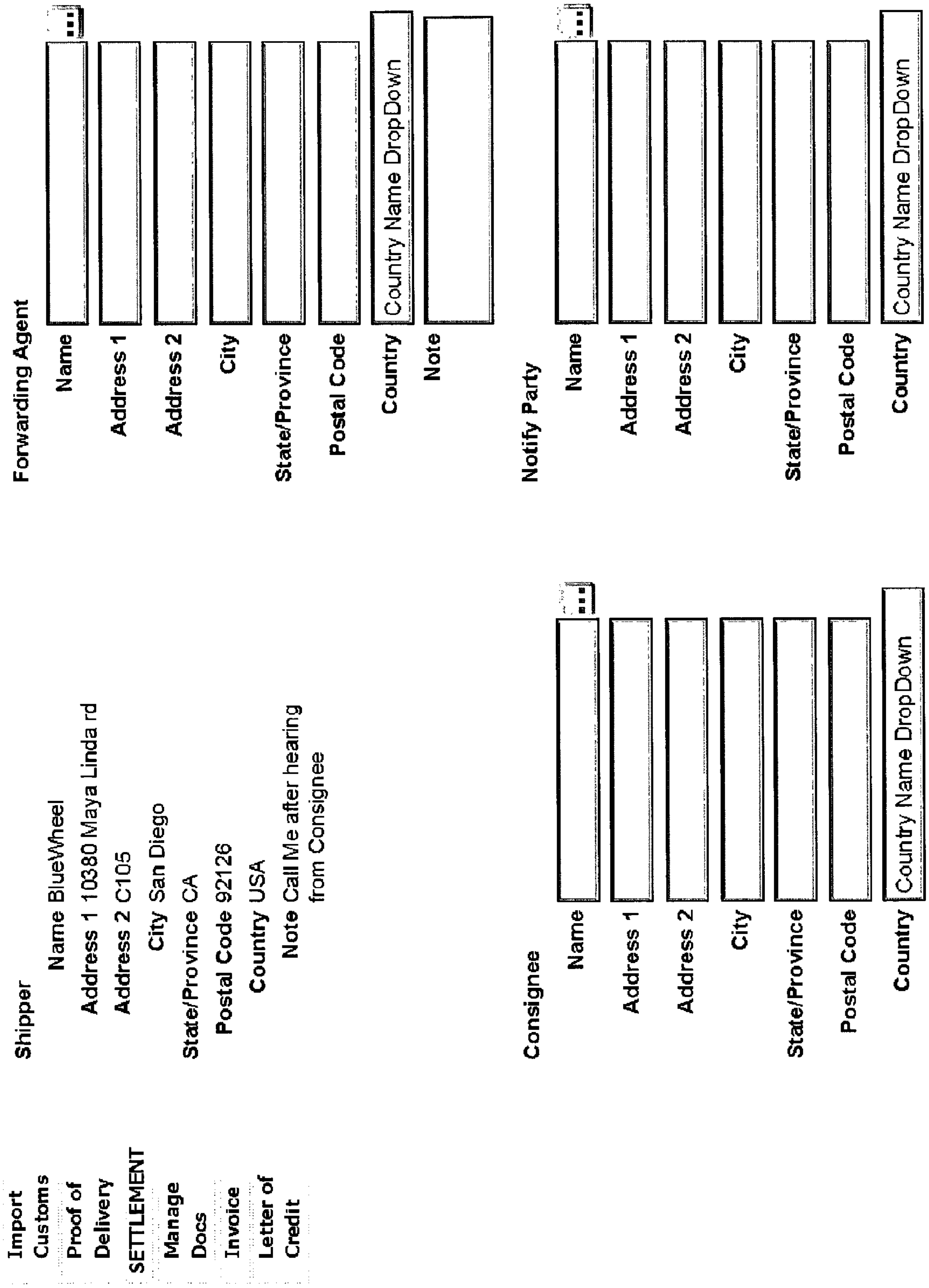

Fig. 13D

Forwarding Agent
- Name
- Address 1
- Address 2
- City
- State/Province
- Postal Code
- Country [Country Name DropDown]
- Note

Notify Party
- Name
- Address 1
- Address 2
- City
- State/Province
- Postal Code
- Country [Country Name DropDown]

Shipper
- Name BlueWheel
- Address 1 10380 Maya Linda rd
- Address 2 C105
- City San Diego
- State/Province CA
- Postal Code 92126
- Country USA
- Note Call Me after hearing from Consignee

Consignee
- Name
- Address 1
- Address 2
- City
- State/Province
- Postal Code
- Country [Country Name DropDown]

Import Customs
Proof of Delivery
SETTLEMENT
Manage Docs
Invoice
Letter of Credit

HOME | DASHBOARD | DOCUMENT VAULT | REPORTS | ADMINISTRATION | HELP | LOGOUT

Welcome John Smith      Multi-National Global Corporation
Portfolio: Inorganic Chemicals Corporation ⚠ You have 3 Alerts!

Shipment No. ETD        ETA         From        To          BL/AWB          Vessel/Voyage
123456789-1001/05/2002 01/10/2002 Singapore Los Angeles AVX1735671448 Victoria Bridge ORDER       BILL OF LADING  Preview Doc  Send Doc Manual Order        [Submit]  [Cancel]        Add Notes to Page Log       Assign Action           Approval Status Manual Sales Order                                                        [Tim House]             [Complete]

Compliance Check    [Summary]                                             Current Action:         Current Status:
                                                                          Steve Viarengo          In Progress SHIPMENT- 01        [Details]   [Equipment]   [Page Log]

Booking Info        BL No. BL 1234                          Booking No. GMW33622

Exp Shipping Instr  Export References Ref#1234              Carrier Meridian Lines, Nathan Retsin Export Customs

[Bill of Lading]

Imp Shipping Instr

Packing List

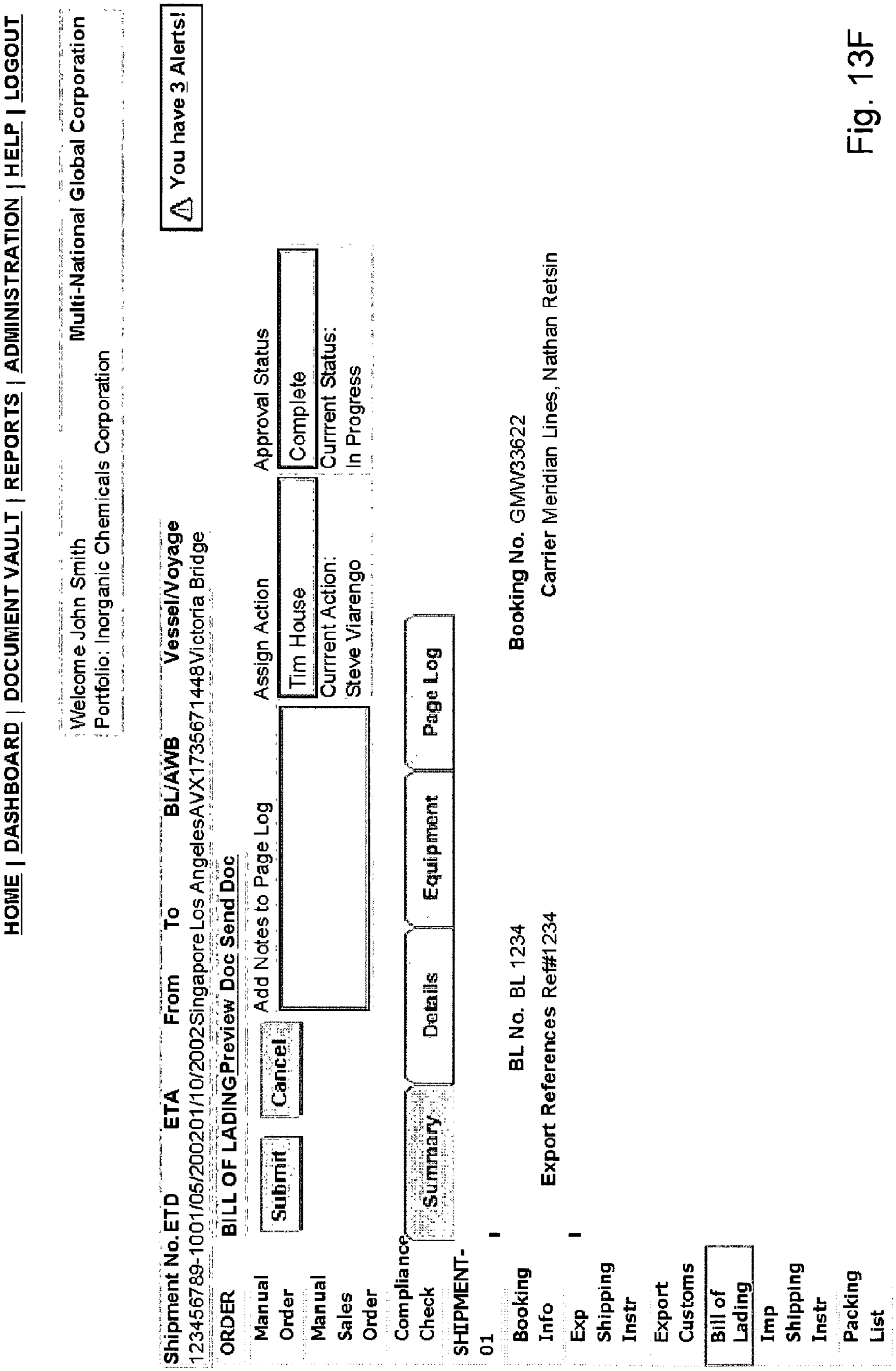

Fig. 13F

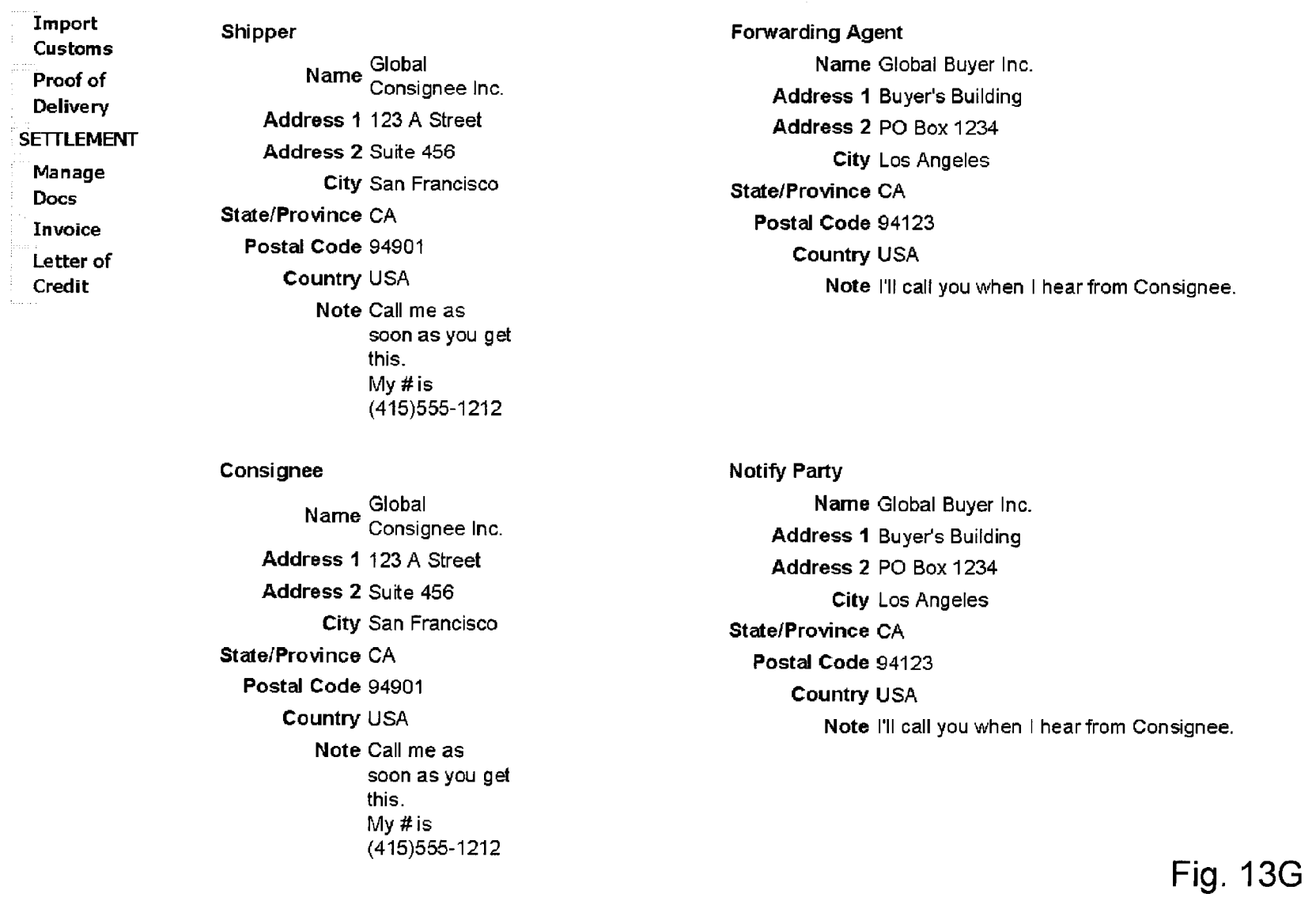

Import Customs
Proof of Delivery
SETTLEMENT
Manage Docs
Invoice
Letter of Credit

Shipper

| | |
|---|---|
| **Name** | Global Consignee Inc. |
| **Address 1** | 123 A Street |
| **Address 2** | Suite 456 |
| **City** | San Francisco |
| **State/Province** | CA |
| **Postal Code** | 94901 |
| **Country** | USA |
| **Note** | Call me as soon as you get this. My # is (415)555-1212 |

Forwarding Agent

| | |
|---|---|
| **Name** | Global Buyer Inc. |
| **Address 1** | Buyer's Building |
| **Address 2** | PO Box 1234 |
| **City** | Los Angeles |
| **State/Province** | CA |
| **Postal Code** | 94123 |
| **Country** | USA |
| **Note** | I'll call you when I hear from Consignee. |

Consignee

| | |
|---|---|
| **Name** | Global Consignee Inc. |
| **Address 1** | 123 A Street |
| **Address 2** | Suite 456 |
| **City** | San Francisco |
| **State/Province** | CA |
| **Postal Code** | 94901 |
| **Country** | USA |
| **Note** | Call me as soon as you get this. My # is (415)555-1212 |

Notify Party

| | |
|---|---|
| **Name** | Global Buyer Inc. |
| **Address 1** | Buyer's Building |
| **Address 2** | PO Box 1234 |
| **City** | Los Angeles |
| **State/Province** | CA |
| **Postal Code** | 94123 |
| **Country** | USA |
| **Note** | I'll call you when I hear from Consignee. |

Fig. 13G

Point/Country of Origin Hong Kong

Pre Carriage by Smith Logistics

Type of Move By Truck

Port of Loading Hong Kong

Place of Carrier Receipt Tokyo

Vessel/Voyage Plotznik/VN 334455

Special Instructions COD

Domestic Routing/Export Instructions Duis autem vel eum iriure dolor in hendrerit in vulputate velit esse molestie consequat, vel illum dolore eu feugiat nulla facilisis.

Loading Pier Pier#1

Freight Terms CIF

Port of Discharge Tokyo

Place of Carrier Delivery Tokyo

Intl. Freight Charges 120 USD

| Equipment | | Packages | Gross Weight |
|---|---|---|---|
| Mixed | 5 x 40ft Dry FCL containers | 20 pallets | 5000 kgm |
| | 5 x 20ft Dry FCL containers | 20 boxes | 100 kgm |
| | 5 x 20ft Reefer FCL containers | 10 packets | 50 lbs |

| Container No. | Seal No. | Lot No. | Quantity | Unit | Net Weight | Gross Weight |
|---|---|---|---|---|---|---|
| C1234 | S1234 | Lot#1 | 100 | bag | 100 | 100 |
| C1235 | S1235 | Lot#2 | 100 | bag | 100 | 100 |
| Totals | | | | | | |
| | | | 200.0 | | | |

Fig. 13H

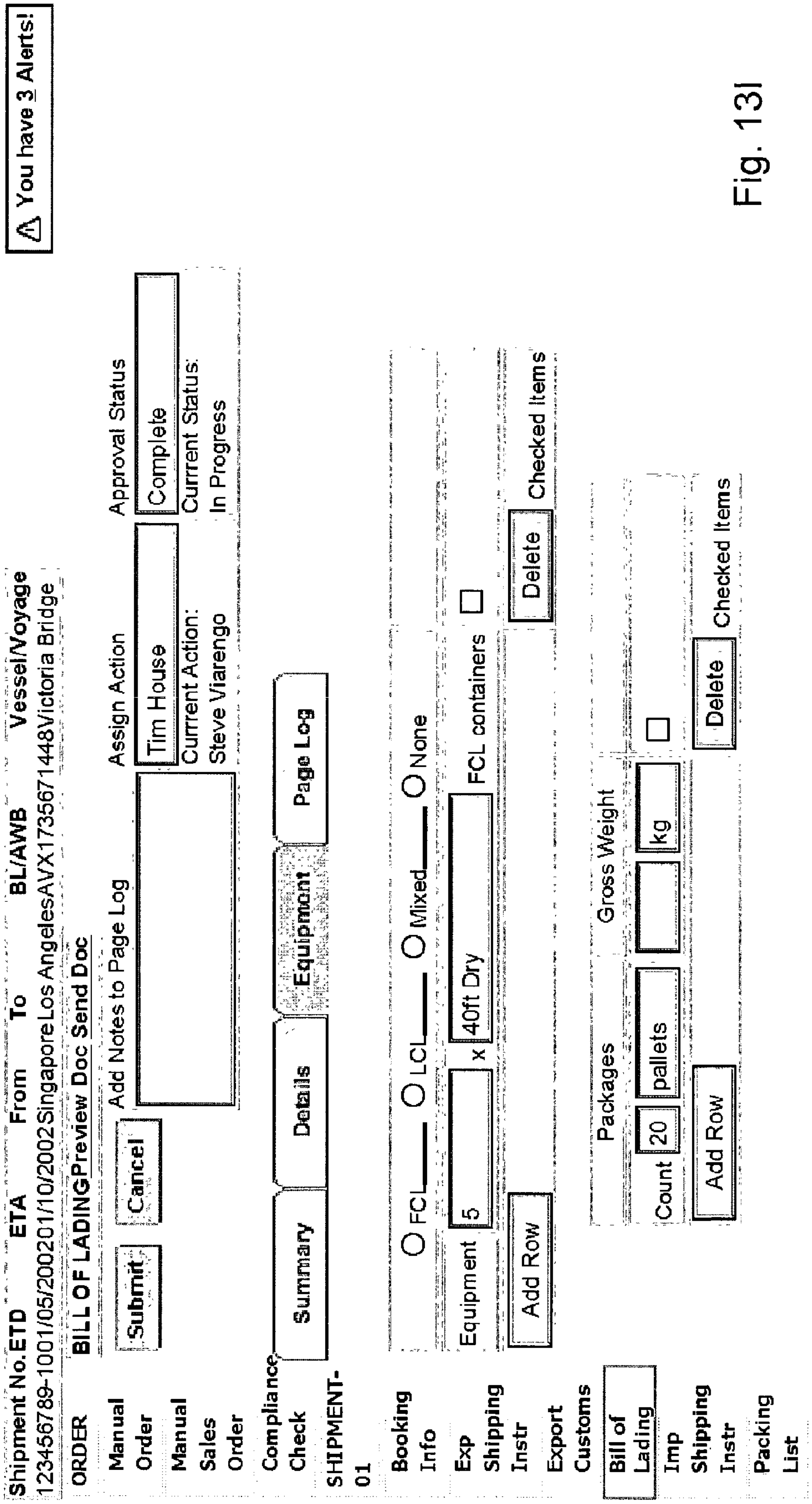

Fig. 13I

HOME | DASHBOARD | DOCUMENT VAULT | REPORTS | ADMINISTRATION | HELP | LOGOUT

Welcome John Smith          Multi-National Global Corporation
Portfolio: Inorganic Chemicals Corporation ⚠ You have 3 Alerts!

Shipment No. ETD          From         To        BL/AWB           Vessel/Voyage
1234567890-1001 01/05/2002 01/10/2002 Singapore Los Angeles AVX17356711448 Victoria Bridge

ORDER

BILL OF LADING Preview Doc  Send Doc

| Manual Order | [Submit] [Cancel] |
| Manual Sales Order | |

Add Notes to Page Log          Assign Action          Approval Status

[                    ]          [Tim House     ]      [Complete       ]

Current Action:       Current Status:
                                Steve Viarengo        In Progress

Compliance Check

[Summary]  [Details]  [Equipment]  [Page Log]

SHIPMENT-01

Booking Info

Exp Shipping Instr        ○ FCL   ○ LCL   ○ Mixed   ○ None

Export Customs            Equipment [5] x [40ft Dry]   FCL containers  ☐   [Delete] Checked Items Bill of Lading            [Add Row]

Imp Shipping Instr        Packages                Gross Weight

Packing List              Count [20] [pallets]    [    ] [kg]  ☐   [Delete] Checked Items

[Add Row]

Import
Customs
Proof of
Delivery
SETTLEMENT
Manage
Docs
Invoice
Letter of
Credit

Fig. 13J

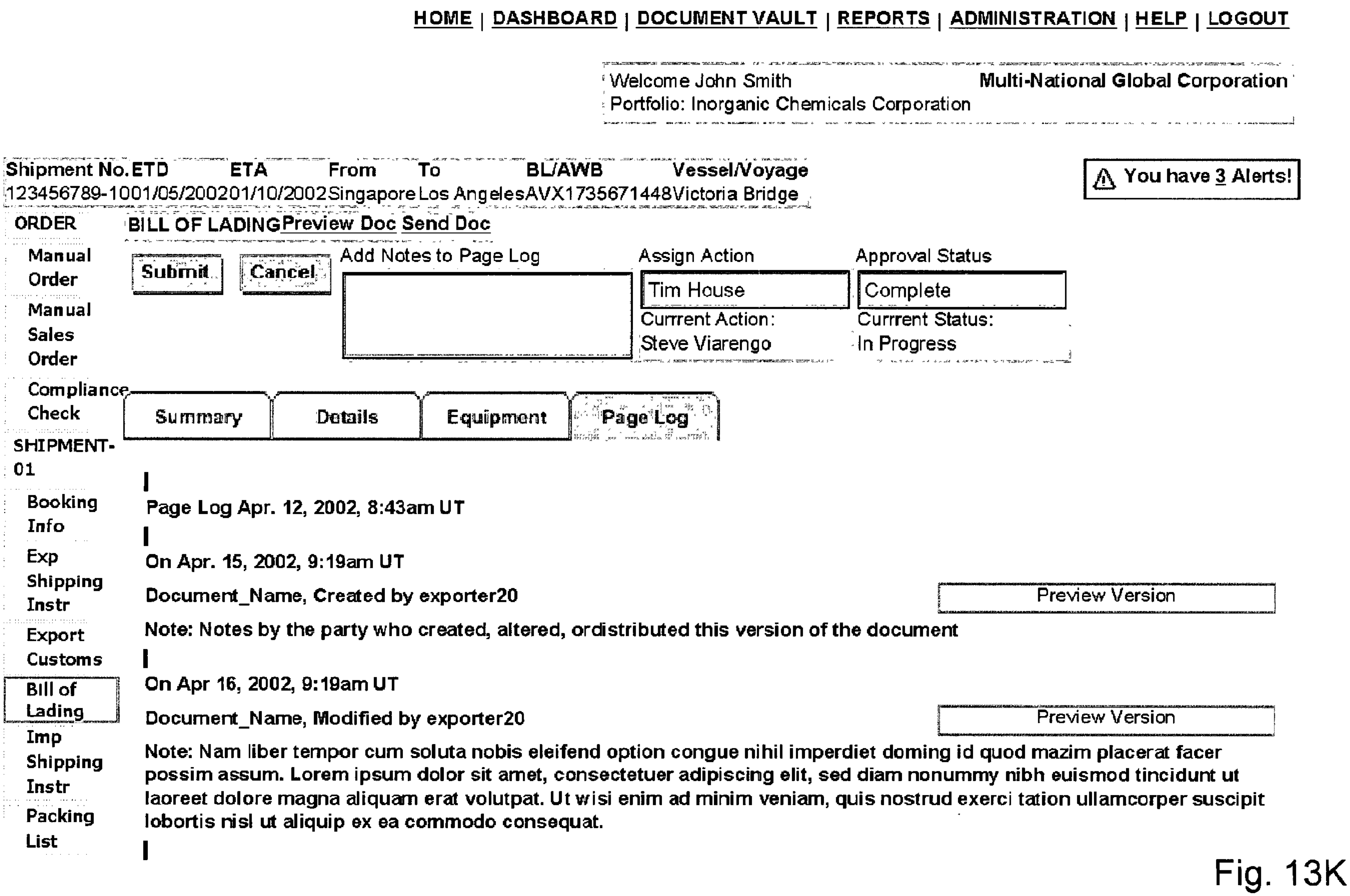

Fig. 13K

HOME | DASHBOARD | DOCUMENT VAULT | REPORTS | ADMINISTRATION | HELP | LOGOUT

Welcome John Smith          Multi-National Global Corporation
Portfolio: Inorganic Chemicals Corporation ⚠ You have 3 Alerts!

Shipment No. ETD         ETA         From         To         BL/AWB         Vessel/Voyage
1234567789-1001/05/200201/10/2002Singapore Los AngelesAVX1735671448Victoria Bridge

ORDER

BILL OF LADING Preview Doc Send Doc

Manual Order

Manual Sales Order

Compliance Check

SHIPMENT-01

Booking Info

Exp Shipping Instr

Export Customs

Bill of Lading

Imp Shipping Instr

Packing List

[Submit]  [Cancel]

Add Notes to Page Log

Assign Action          Approval Status

Tim House              Complete
Currrent Action:       Currrent Status:
Steve Viarengo         In Progress Summary | Details | Equipment | Page Log Page Log Apr. 12, 2002, 8:43am UT On Apr. 15, 2002, 9:19am UT
Document_Name, Created by exporter20
Note: Notes by the party who created, altered, or distributed this version of the document          [Preview Version]

On Apr 16, 2002, 9:19am UT
Document_Name, Modified by exporter20
Note: Nam liber tempor cum soluta nobis eleifend option congue nihil imperdiet doming id quod mazim placerat facer possim assum. Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.          [Preview Version]

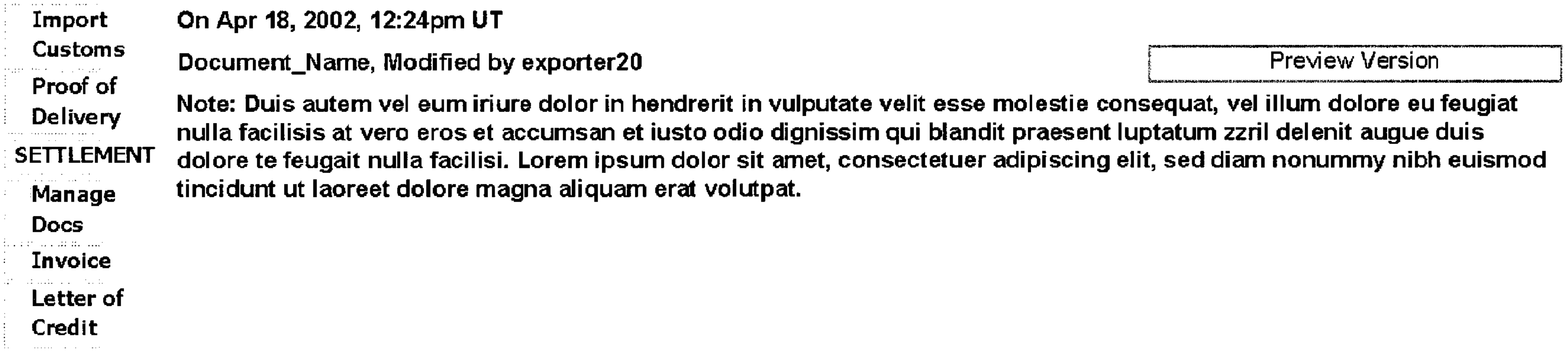

Fig. 13L

Import Customs
Proof of Delivery
SETTLEMENT
Manage Docs
Invoice
Letter of Credit On Apr 18, 2002, 12:24pm UT
Document_Name, Modified by exporter20

Note: Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Lorem ipsum dolor sit amet, consectetuer adipiscing elit, sed diam nonummy nibh euismod tincidunt ut laoreet dolore magna aliquam erat volutpat.

Preview Version

| Source Doc Field | Source Doc Type | Source State | Destination Doc Type | Destination Doc Field | Dest State | Update Scope | Pre-condition |
|---|---|---|---|---|---|---|---|
| applicant-address1 | loc.settlement.trade | 4 | invoice.settlement.trade | customer-address1 | 2 | 3 | |
| applicant-address2 | loc.settlement.trade | 9 | invoice.settlement.trade | sold-to-address2 | 1 | 3 | |
| applicant-city | loc.settlement.trade | 9 | invoice.settlement.trade | sold-to-city | 1 | 3 | |
| applicant-country | loc.settlement.trade | 4 | invoice.settlement.trade | customer-country | 2 | 3 | |
| applicant-name | loc.settlement.trade | 9 | invoice.settlement.trade | sold-to-name | 1 | 3 | |
| applicant-state | loc.settlement.trade | 9 | invoice.settlement.trade | sold-to-state | 1 | 3 | |
| beneficiary-address1 | loc.settlement.trade | 9 | pl.logistics.trade | buyer-address1 | 1 | 3 | |
| beneficiary-city | loc.settlement.trade | 9 | pl.logistics.trade | buyer-city | 1 | 3 | |
| beneficiary-country | loc.settlement.trade | 4 | bol.logistics.trade | shipper-country | 2 | 3 | |
| beneficiary-name | loc.settlement.trade | 9 | pl.logistics.trade | buyer-name | 1 | 3 | |
| beneficiary-notes | loc.settlement.trade | 4 | bol.logistics.trade | shipper-notes | 2 | 3 | |
| beneficiary-zip | loc.settlement.trade | 4 | bol.logistics.trade | shipper-zip | 2 | 3 | |
| consignee-address1 | loc.settlement.trade | 3 | bolgtn.logistics.trade | consignee-address1 | 1 | 3 | LOCTradeExists |
| consignee-city | loc.settlement.trade | 9 | esi.logistics.trade | consignee-city | 1 | 3 | |
| consignee-name | loc.settlement.trade | 3 | bolgtn.logistics.trade | consignee-name | 2 | 3 | LOCTradeExists |
| consignee-state | loc.settlement.trade | 4 | bol.logistics.trade | consignee-state | 2 | 3 | |
| country-of-origin | loc.settlement.trade | 4 | bol.logistics.trade | country-of-origin | 2 | 3 | |
| delivery-terms | loc.settlement.trade | 9 | invoice.settlement.trade | delivery-terms | 1 | 3 | |
| detailed-description-of-goods | loc.settlement.trade | 9 | pl.logistics.trade | detailed-description-of-goods | 1 | 3 | |
| freight-charges | loc.settlement.trade | 4 | bol.logistics.trade | intl-freight-charges | 2 | 3 | |
| lc-date | loc.settlement.trade | 9 | pl.logistics.trade | lc-date | 1 | 3 | |
| lc-no | loc.settlement.trade | 4 | bol.logistics.trade | lc-no | 2 | 3 | |
| letter-of-credit-remarks-bol | loc.settlement.trade | 4 | bol.logistics.trade | letter-of-credit-remarks-bol | 1 | 3 | |
| letter-of-credit-remarks-invoice | loc.settlement.trade | 9 | invoice.settlement.trade | letter-of-credit-remarks | 1 | 3 | |
| notify-party-address1 | loc.settlement.trade | 4 | bol.logistics.trade | notify-party-address1 | 2 | 3 | |
| notify-party-country | loc.settlement.trade | 9 | esi.logistics.trade | notify-party-country | 1 | 3 | |
| notify-party-name | loc.settlement.trade | 4 | bol.logistics.trade | notify-party-name | 2 | 3 | |
| notify-party-state | loc.settlement.trade | 3 | bolgtn.logistics.trade | notify-party-state | 2 | 3 | LOCTradeExists |
| notify-party-zip | loc.settlement.trade | 9 | esi.logistics.trade | notify-party-zip | 1 | 3 | |
| ship-from | loc.settlement.trade | 4 | bol.logistics.trade | port-of-loading | 2 | 3 | |
| ship-to | loc.settlement.trade | 9 | pl.logistics.trade | place-of-discharge | 1 | 3 | |

Fig. 14

<TradeBeam Logo>

<System Date>

TradeBeam Letter of Credit Presentation

To :
<loc.settlement.tradeadvising-bank-name>
<loc.settlement.tradeadvising-bank-address1>
<loc.settlement.tradeadvising-bank-address2>
<loc.settlement.tradeadvising-bank-city>
<loc.settlement.tradeadvising-bank-state>
<loc.settlement.tradeadvising-bank-zip>
<loc.settlement.tradeadvising-bank-country>

Attn : Letter of Credit Dept

Re : Your Advice No. <loc.settlement.tradelc-advice-no>
Letter of Credit No. <loc.settlement.tradelc-no>

This is a TradeBeam Letter of Credit Presentation. When communicating with us, always refer to our Draft No. <System No. for LC>. We shall trace this negotiation with you 48 hours after your receipt of documents.

We enclose a full set of copies for your files as well as the following document for payment under the above referenced Letter of Credit:

| B/L | AWB | Comm.Inv | InsCert | CertOrig |
|---|---|---|---|---|
| < loc.settlement.tradereq-ship-docs-bol-org>/ < loc.settlement.tradereq-ship-docs-bol-dup> | < loc.settlement.tradereq-ship-docs-awb-org>/ <loc.settlement.tradereq-ship-docs-awb-dup> | < loc.settlement.tradereq-ship-docs-invoice-org>/ < loc.settlement.tradereq-ship-docs-invoice-dup> | < loc.settlement.tradereq-ship-docs-ia-org>/ < loc.settlement.tradereq-ship-docs-ia-dup> | < loc.settlement.tradereq-ship-docs-co-org>/ < loc.settlement.tradereq-ship-docs-co-dup> |

Fig. 15A

| PackingList | WgtList | Letter/Fax | Bene'sCert |
|---|---|---|---|
| < loc.settlement.tradereq-ship-docs-pl-org>/ < loc.settlement.tradereq-ship-docs-pl-dup> | < loc.settlement.tradereq-ship-docs-wl-org>/ < loc.settlement.tradereq-ship-docs-wl-dup> | < loc.settlement.tradereq-ship-docs-blf-org>/ < loc.settlement.tradereq-ship-docs-blf-dup> | < loc.settlement.tradereq-ship-docs-bc-prg>/ < loc.settlement.tradereq-ship-docs-bc-dup> |

Please call 1-650-XXX-XXXX with details of payment or reasons for non-payment.

Remittance Instructions:
Please wire Transfer Proceeds to:
<Account Name><ABA/TR No.>

| | |
|---|---|
| For credit to: | <Party Name> |
| Account No: | <Note> |
| Quoting their ref. no: | <invoice.settlement.tradeinvoice-no> |
| Under phone advice to: | 1-650-XXX-XXXX |

Thank you for your help with this negotiation

Fig. 15B

SYSTEMS AND METHODS FOR PRODUCING DOCUMENTARY CREDIT AND CONFORMING SHIPPING DOCUMENTS

RELATED APPLICATIONS

This application is related to the commonly owned U.S. patent application Ser. No. 10/228,158, entitled "Systems and Methods to Support Import-Export Transactions" by inventors Timothy House, Suvikas Bhandari, Betsy Beaumon, Boris Veksler, Jason Dao, Joe Loera, and Graham Napier, filed on 26 Aug. 2002 and incorporated herein by reference. In addition, this application is related to incorporates by reference the co-pending U.S. application Ser. No. 10/776,079, filed 11 Feb. 2004, entitled "Negotiation and Fulfullment of Insurance Conditions and Release of Goods for Export" and U.S. application Ser. No. 10/776,587 filed 11 Feb. 2004 entitled "Systems and Methods to Support Approval to Settle an International Trade from a Credit Facility Such as a Line of Credit or a Demand Deposit Account".

COPYRIGHT NOTICE

A portion of the disclosure of this patent document contains material, including user interface screens, that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTING APPENDIX

A computer program listing appendix comprising duplicate copies of a compact disc, named "TRDB1005-1," accompanies this application and is incorporated by reference. The computer program listing appendix includes the file "FIG. 14 Supp.txt", which is 36,864 bytes on disk and was created on 1 Nov. 2002 at 11:48:49, containing synchronization rules.

BACKGROUND OF THE INVENTION

The present invention relates to systems and methods to support import-export transactions. More particularly, it includes methods and systems for generation of bank-required documents that are consistent with a documentary credit (DC) instrument and collaborative application for or amendment of the DC instrument.

DC instruments, including letters of credit (LC), have long been used to assure payment to sellers or suppliers, especially when the buyer is remote (international transactions) or lacks an ongoing relationship with the seller. Typically, a buyer solicits issuance of a DC instrument from an issuing bank with which the buyer has a banking relationship, sometimes using an application such as depicted in FIGS. 4A-D. The buyer and seller negotiate the terms of the DC instrument, often before the buyer solicits issuance. The issuing bank sends the operative LC instrument to an advising bank. The seller ships goods, in reliance on and in accordance with the DC. If amendments are needed, they may also negotiate the terms of the amendment to the DC instrument.

It has long been recognized that processes of DC issuance and redemption are fraught with opportunities for error and resulting frustration. For instance, Tozzoli et al. in U.S. Pat. No. 6,151,588 comment in column 3 on how an issuing bank requires that all of the documents called for in a LC exactly correspond with the terms of the LC, and withholds payment to the seller even due to typographical errors and minor misspellings, with resulting frustration to sellers seeking payment. Tradecard, Inc., the assignee of the '588 patent, responded to this and other long-identified problems with DCs by creating an alternative funding mechanism, which is described in the '588 patent and their "Financial Supply Chain Automation: The Missing Link in Supply Chain Management White Paper" (PDF file created 29 Apr. 2002) available from their web site www.Tradecard.com. Tradecard sidestepped the DC problems, instead of solving them.

Accordingly, an opportunity arises to devise methods and systems that reduce errors in application for, issuance and redemption of DC instruments. Such methods and systems may generate documents required for a bank to redeem a DC instrument using data mapped from a DC template. Such methods and systems may encourage buyer and seller to collaboratively prepare a DC application and to electronically present applications for issuance and for redemption of a DC instrument. Such methods and systems may encourage buyer and seller to collaboratively prepare requests for amendment of a DC instrument.

SUMMARY OF THE INVENTION

The present invention relates to systems and methods to support import-export transactions. More particularly, it includes methods and systems for generation of bank-required documents that are consistent with a DC instrument and collaborative application for or amendment of the DC instrument. Particular aspects of the present invention are described in the claims, specification and drawings.

BRIEF DESCRIPTION OF THE DRAWINGS

FIGS. 4A-C are a sample LC application, manually prepared without applying the present invention.

FIGS. 5A-E depict a summary of entered DC information, including a system environment in which the present invention may be practiced.

FIGS. 6 through 9 illustrate portions of an interface for entry of DC information.

FIG. 10 illustrates a setup user interface. FIGS. 10A-C are a first embodiment of a user interface.

FIG. 14 is a part of a set of synchronization rules for one embodiment of the present invention.

FIG. 15 is a sample merge format for system generated letters using data collected by a system.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

An environment in which a DC process is well incorporated is described in the related application that has been incorporated by reference. The incorporated application describes methods and devices that are useful to exporters and importers, to track goods from the order through the settlement stage. DC can be categorized as part of settlement, but it is arranged before any transfer of goods begins. It is useful to generate documents during the transfer of goods that use language that precisely matches the negotiated DC, as described below.

Figure 1:
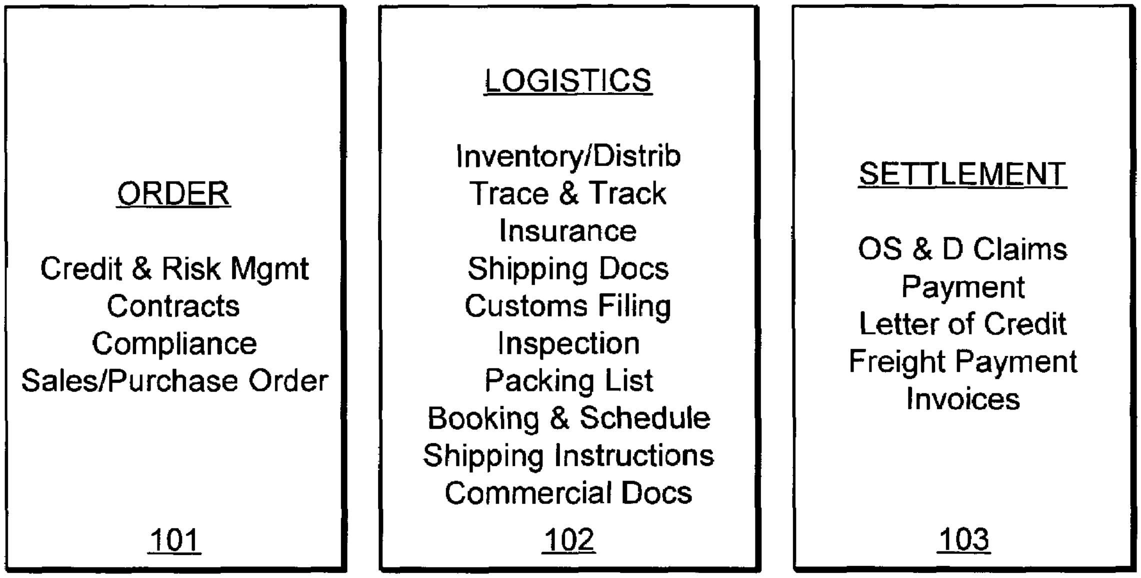
FIG. 1 is a high level block diagram of an environment in which the present invention may be practiced.
Figure 2:
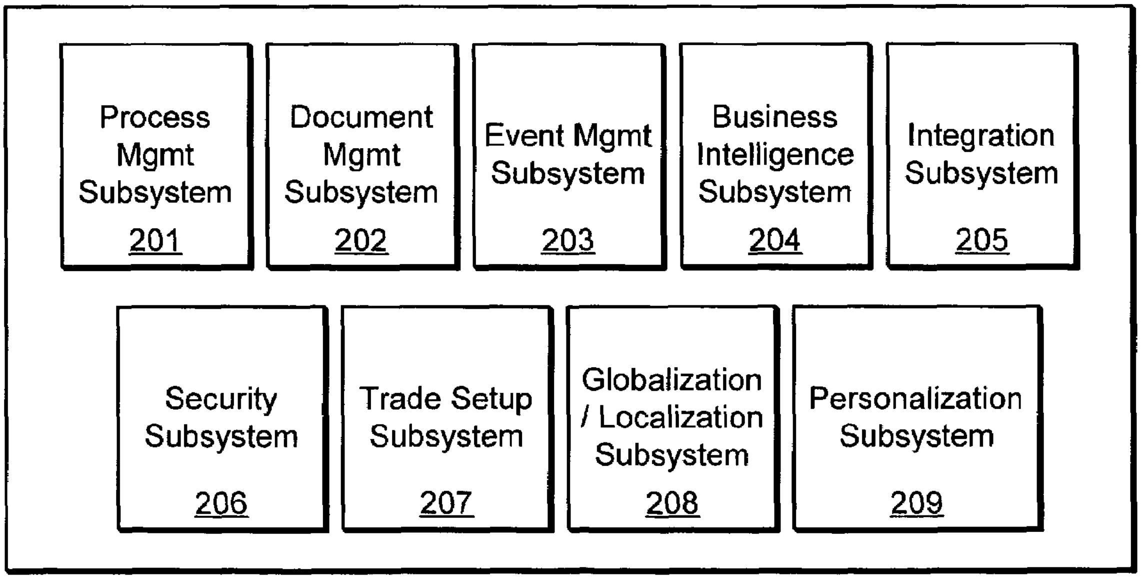
FIG. 2 is a high level block diagram of a subsystem architecture environment in which the present invention may be practiced.

FIGS. 1-2 depict Tradebeam's environment, in which a documentary credit process is incorporated. FIG. 1 is a high level block diagram of the order, logistics and settlement aspects of Tradebeam's product. The order module 101 supports credit and risk management, contract negotiation and execution, compliance with import/export regulations, and processing of sales and purchase orders. The logistics module 102 supports a wide range of activities. Supported activities include inventory control and distribution, tracing and tracking shipments, and insurance specification, procurement and certification. Supported activities that relate to aspects of the present invention include shipping document creation and tracking, inspection, packing list generation, shipping instructions and commercial documents. Other logistics activities include preparation and generation of customs filings, and booking and scheduling of transportation. The settlement module 103 supports over, short and damaged claims (OS&D), payment processing, freight payments, and invoice processing. In addition, it supports documentary credit or letters of credit, which are the present.

FIG. 2 depicts organization of Tradebeam's environment into subsystems. The subsystems include a process management subsystem 201, a document management subsystem 202, an event management subsystem 203, a business intelligence subsystem 204, an integration subsystem 205, a security subsystem 206, a trade setup subsystem 207, a globalization/localization subsystem 208 and a personalization subsystem 209. These subsystems and infrastructure components can be use to support DC activities.

Certain international standards for DCs may be relied upon. DC instruments for import/export should conform to the Uniform Custom and Practice for Documentary Credits (1993 Revision, Publication No. 500 of the International Chamber of Commerce, Paris, France), as amended from time to time. The International Chamber of Commerce (ICC) publishes internationally agreed-upon rules, definitions and practices governing LC, called "Uniform Customs and Practice for Documentary Credits" (UCP). The UCP facilitates standardization of letters of credit and other DC instruments amongst all banks in the world that subscribe to it. These rules are updated from time to time; the last revision became effective Jan. 1, 1994, and is referred to as the UCP 500. It also is desirable to map a DC/LC system to standard fields used by the banking institutions' SWIFT standard. The applicable SWIFT standards for mapping may include MT 700 and MT 707. The fields depicted in these entry screens can readily be mapped to these standards.

DC is a term used to cover several related types of financial instruments. The ICC and the banking organizations' SWIFT standards consistently use the term DC instead of LC. Many banks and businesses in the U.S. commonly refer to them as LC. Using the internationally accepted term, a DC is a financial instrument, generally issued by a bank, in which the issuer undertakes to effect payment against the presentation of documents that conform to the terms and conditions stipulated in the credit document. There are two types of DC, commercial LCs (i.e., import or export LCs) and standby LCs. A DC constitutes a commitment by a bank on behalf of the buyer (importer) to pay the seller (exporter) of goods or services a specified amount immediately (sight) or at a later date (forward) subject to the presentation of stipulated documents within a prescribed period of time. A sight DC is a type of DC calling for a sight draft, which means the exporter is entitled to receive payment on sight, i.e. upon presenting the draft to the bank. A term DC may allow for payments to be made over terms of 30, 60, or 90 days, or at some specified future date. Either a sight or term DC may require presentation of documents complying with the terms of the credit within a set time limit, in order to redeem the credit. So-called Professional International Banks handle some of the less frequently used kinds of DC, such as transferable letters of credit, revolving letters of credit, back-to-back letters of credit and red clause LCs.

The DC allows the buyer and seller to contract a trusted intermediary (a bank) that will guarantee full payment to the seller provided that he has shipped the goods and can provide documentary proof of compliance with the terms of the agreed-upon Letter. This instrument, although inherently simple, can have many variations. The DC distributes risk between buyer and seller, by assuring the seller when the conditions of the DC are met and by reasonably assuring the buyer of receiving the goods ordered. A DC is a common instrument for payment, especially when the contracting parties are unfamiliar with each other. Although this instrument provides excellent assurances to both parties, it can be confusing and restrictive. It can also be expensive, ranging from several hundred U.S. dollars up to 5 percent of the total value.

DCs are typically irrevocable, which means that once the DC is established it cannot be changed without the consent of the buyer, the seller, the issuing bank and the advising bank. Therefore, the seller, especially when inexperienced, ought to present the agreement for a DC to an experienced bank, a trusted broker, and its freight forwarder so that they can help to determine if the DC is legitimate and if all the terms can be reasonably met. A trusted bank, other than the issuing or buyer's bank can guarantee the authenticity of the document for a fee. A LC issued in favor of a beneficiary in a country other than that of the issuing bank, must be advised through an advising bank in the country of the beneficiary. It is the main task of the advising bank to authenticate the LC and forward its details to the beneficiary.

DC's can be quite flexible in the design, to meet specific purposes. For example, a Back to Back LC allows a seller to use the LC received from his buyer as collateral with the bank to open his own LC, so that he can purchase the inputs or supplies necessary to fill his buyer's order. Because of the dependency on other parties and extra steps to fulfill the original transaction, the risk is increased and some banks may therefore be reluctant to open a Back to Back LC. Since LCs are financial contracts, they can vary enormously. Some LC variations include Revolving, Freely Negotiable, Red Clause, Transferable, Revocable and Restricted. Perhaps the safest and most desirable LC, at least from the seller's point of view, is the Standby LC. The standby LC is unlike commercial letters of credit, as it is more of a bank or performance guarantee. It is not the primary payment method but rather a fail-safe method or guarantee often for longer-term projects. This LC promises payment only should the buyer fail to make an arranged payment or otherwise fail to meet pre-determined terms and conditions. Otherwise, the buyer pays on receipt of goods or according to the credit terms arranged with the seller. Should the buyer default, the seller must then draw against the Standby LC for payment, supplying documentation and certifications as may required by the terms of the Standby LC. Typical Standby LC are simpler for the seller or beneficiary to comply with than other LC. Thus, use of a standby LC favors the seller. Since a standby LC can remain valid for years (Evergreen Clause), it eliminates the complexity of separate LC for each transaction with a repeat client. Accordingly, more than one transaction may be associated with a single LC.

Use of an LC or DC has certain disadvantages. If even the smallest discrepancies exist in the timing, documents or other requirements of the DC the buyer can reject the shipment. A rejected shipment means that the seller must quickly find a new buyer, usually at a lower price, or pay for the shipment to be returned or disposed. In addition to being costly, DC take time to draw up and usually tie up the buyer's working capital or credit line from the date it is issued until final redemption or payment, rejection for noncompliance, expiration or cancellation (typically cancellation requires the approval of both parties.)

The terms of a DC are very specific and binding. Many traders, even experienced ones, encounter significant difficulties because of their failure to understand or comply with the terms. Some statistics show that approximately 50 percent of submissions for DC payment are rejected for failure to comply with terms. For example, if the terms require the delivery of four specific documents and one of them is incomplete or merely delivered late, then payment will be withheld regardless of whether every other condition was fulfilled and the shipment was received in perfect order. The banks, whose job it is to ensure a safe payment transaction, will insist that the terms be a fulfilled exactly as written. The buyer can sometimes approve the release of payment if a condition is not fulfilled. But amending or changing terms of the DC can be costly, time consuming and sometimes impossible.

Figure 3:
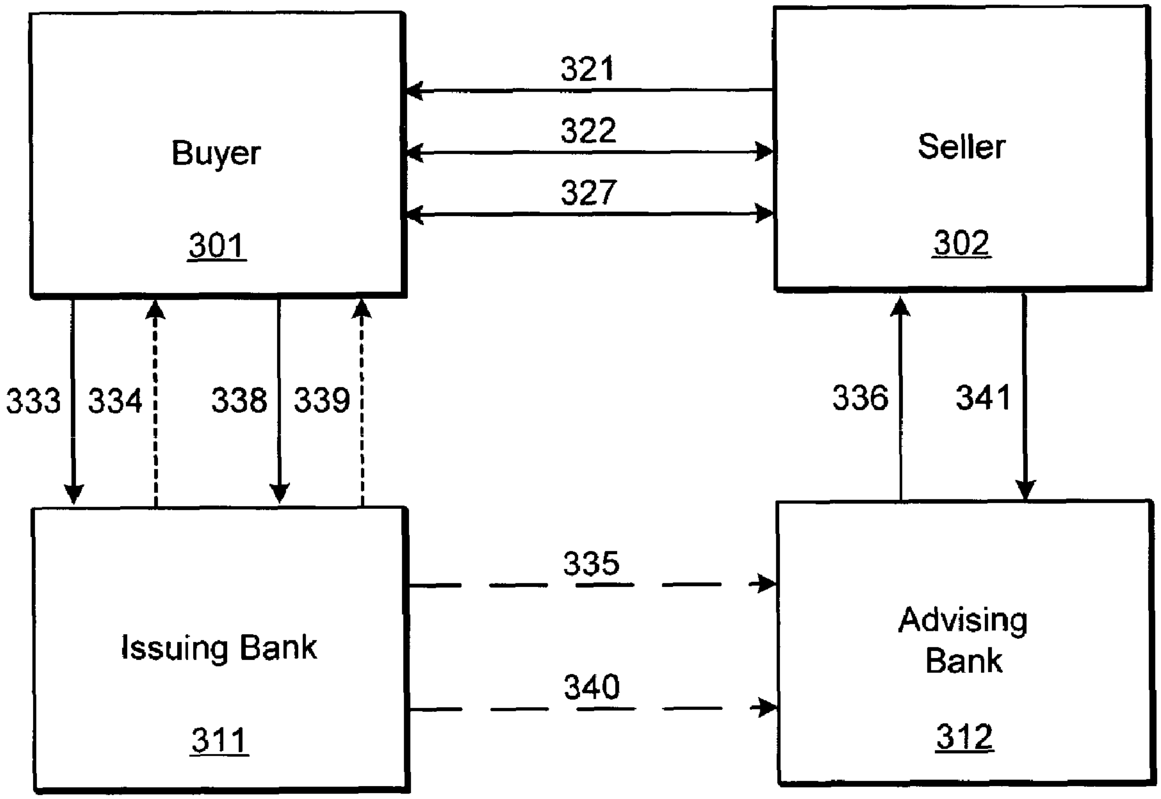
FIG. 3 depicts participants in a DC process.

The basic mechanism of a DC involves at least four parties: a) buyer or applicant; b) issuing bank or applicant's bank; c) beneficiary's bank or advising bank; d) seller or beneficiary. FIG. 3 depicts a buyer 301, seller 302, buyer's bank 311 and seller's bank 312. This figure can be used to illustrate the traditional, manual processing of a DC. Traditionally, the buyer or applicant 301 applies to his bank for the issuance of a DC. If the applicant does not have a credit arrangement with this issuing bank, then the applicant must secure the DC with cash or some other negotiable security. The issuing or applicant's bank 311 issues the DC in favor of the beneficiary and routes the document to a correspondent bank. The applicant's bank later also verifies that all of the terms, conditions, and documents comply with the DC, and pays the seller through his bank. The correspondent bank 312 verifies that the DC is authentic and notifies (or advises) the beneficiary 302. The advising bank 312 is used as a trusted bridge between the applicant's bank 311 and the beneficiary 302. It may also forward the beneficiary's documentary proof of performance back to the issuing bank. However, the advising bank has no liability for payment of the DC unless it adds its own confirmation. The beneficiary can require the applicant and his bank to request that the advising bank confirm the DC. This means that the confirming bank also promises to ensure that the beneficiary is paid when he is in compliance with the terms and conditions of the DC. The confirming bank charges a substantial fee for this service. This is most useful when the issuing bank and its credibility is not familiar to either the beneficiary or his bank, or if the issuing bank (even a well-established one) is in a high-risk country. The beneficiary may also present his LC complying documents through a trusted bank if he is unfamiliar with the advising/confirming bank. However, they may add additional fees. The beneficiary or seller 302 must ensure that the goods ordered are prepared according to specifications and shipped on time. The seller must also gather and present the full set of accurate documents, as required by the DC, to the bank.

The DC process and information required for compliance can be further understood by looking at a form application for DC. FIG. 4 is a typical form used for a manual application. On the page depicted by FIG. 4A, the applicant is instructed to complete this form by entering in field 401 the application date. In box 402, the method of delivery of the completed LC to the beneficiary is indicated. A checkbox or specification of another method delivery may be used. The name of an advising bank may optionally be nominated in field 404. Typically, the beneficiary's choice of an advising bank is entered by name and address. If no advising bank is designated, the issuing bank may choose a bank familiar to it. If the advising bank is not a correspondent of the issuing bank, a correspondent in the same country as the advising bank may serve as an intermediary. The applicant's complete company name and address are entered in 405. The numerical value and tolerance percentage of the LC are entered 406. If the words about or approximately are used with the dollar amount than a tolerance of 10 percent applies, or a predetermined percentage may be supplied by the issuing bank. The value of the LC is also entered in words 407. The beneficiary or seller's complete company name and address are entered 408. The expiration date of the LC is specified 409. The last date on which the beneficiary can place the required goods on transport is specified 410. In the case that multiple dates for shipment are allowed, according to specific shipment schedule, the merchandise description field 417 or special instructions field 427 can be used. The payment terms or draft tenor are indicated 411. A sight draft is paid upon presentation of credit conforming documents. Payment may be delayed a specific number of days, such as 60 days from a bill of lading date or 90 days from sight. A fixed maturity date or other payment terms also may be specified. The amount payable upon redemption of the LC may be 100 percent of an invoice value or another specified amount 412. The party responsible for the bank's charges is specified (applicant or beneficiary) 413. Typically, the trading partners pay the fees of their respective banks. As indicated above, a draft payable at a specific time may be redeemed early, at a discount. The party who will pay discount charges is indicated 414. Typically, the beneficiary incurs the discount cost, in exchange for receiving early payment. The ports of loading and discharge where goods began transportation and are ultimately delivered are entered 415, 416. An actual description of the goods to be shipped is recorded 417. This actual description must appear on the commercial invoice and should be brief. This is one of the places that a minor discrepancy may delay redemption of the DC. The terms of shipment are indicated 418. Standard terms of shipment may be selected by check boxes or other terms of shipment may be specified. Standard terms include "F.O.B.", which stands for free on board, "C & F" or "CFR", which stands for cost and freight, "CIF", which stands for cost, insurance and freight, and "FAS", which stands for free alongside ship. Thirteen terms (INCO terms) recognized by the International Chamber of Commerce (ICC) may be supported by the system, or at least the applicable and frequently used terms. The 1990 standard list of terms included: LXW, Lx Work (Named Place); FCA, Free Carrier (Named Place); FAS, Free Alongside Ship (Named Port Of Shipment); FOB, Free On Board (Named Port Of Shipment); CFR, Cost And Freight (Named Port Of Destination); CIF, Cost Insurance And Freight( Named Port Of Destination); CPT, Carrier Paid To (Named Point Of Destination); CIP, Carriage And Insurance Paid To (Named Point Of Destination); DAF, Delivered At Frontier (Named Point); DES, Delivered Ex Ship (Named Port Of Destination); DEQ, Delivered Ex Quay Duty Paid (Named Port Of Destination); DDU, Delivered Duty Unpaid( Named Point Of Destination); and DDP, Delivered Duty Paid (Named Point). Other standard terms also may be used, or may be specified as other terms. The applicant selects whether a LC is transferable or nontransferable 419, whether partial shipments are permitted or not permitted 420, and whether transshipments are permitted or not permitted 421.

On the page depicted by FIG. 4B, the applicant specifies documents required from the seller in order to redeem the DC. This form calls for at least one transport document 422 to be selected, from among a full set clean on board inter modal transport bill of lading documents, a full set clean on board marine bill of lading documents, an air waybill, or other specified transport documents. One or more freight documents 423 may be selected, which may be marked collect, prepaid, issued or endorsed to the order of the issuing bank. A party to notify is specified 424, including the company name, and address and often contact name and phone numbers. Insurance conditions are selected 425, such as insurance effected by applicant, so that no insurance document is required, specific insurance effected by the seller, or other insurance described in the application. Other commercial documents may be required to be delivered to the bank 426, such as one or more copies or originals the commercial invoice, packing list, certificate of origin. Special instructions and/or conditions, such as subject to UCP, are specified 427. The time in which documents must be presented to the negotiating bank, relative to shipment, is given 428. A default value may be used by the issuing bank, such as 21 days, if no other time is specified. The time for presentation of documents typically corresponds to the number of days between the latest shipment date 410 and in the expiration date 409 of the DC. Additional information can be provided for internal use, which might not be included in the terms of the DC. For instance, freight forwarder or customhouse broker may be specified by name and address 429. A full set of documents related to DC may be sent to the broker/forwarder for customs clearance, as a bank service. Contact information at the applicant's company also may be provided 430, including the name and telephone number of a person who can respond to questions regarding issuance of the DC or waiver of discrepancies when the DC is redeemed. On the page identified as FIG. 4C, one or more co-applicants may be identified 431, 432. A co-applicant may be identified by name, address and one or more signatures. Additional information blocks may be provided by the issuing bank 433 for bank use only.

The communications required and the modes of communication among the parties in a DC transaction, practicing aspects of the present invention, can be understood by reference back to FIG. 3. The parties, again, typically include the buyer of goods or applicant for DC, the seller or beneficiary, the issuing or buyer's bank and the advising or seller's bank. Many possible combinations of the following steps may practice aspects of the present invention: In step 321, the seller 302 creates a LC instruction (LCI) and sends it electronically to the buyer 301. The seller may use a user interface such as depicted in FIGS. 6-9 to create the LCI. The LC instructions are the terms and conditions that the seller requests the buyer to put into a LC application, which becomes a LC instrument. The LC instructions specify the amount required in a credit to support the planned purchases of the buyer. The amount of money requested in the LC instructions is the amount estimated in a pro forma invoice, including costs above the cost of goods that the seller wants to recover. The LC instructions may provide detailed terms and conditions for a credit. These terms and conditions are, of course, subject to negotiation and agreement between the buyer and seller.

In step 322, the buyer creates the LC application (LCApp) and sends it electronically to the seller for modification/changes if any to the terms and conditions. The commercial LCApp is prepared by the buyer and given to his bank for the application and subsequent issuance of a LC. A collaborative system such as described in the application incorporated by reference may conveniently be used for messaging, display, editing and generating an audit trail of interactions. The buyer and seller collaborate and decide on the LC terms and conditions. Drafts of the LCI and/or LCApp may be exchanged multiple times between the buyer and seller, as they seek to agree on the terms. The LCI, LCApp or terms of the actually issued LC are preferably associated with other details of one or more transactions that are tracked by an overall import-export tracking system, such as illustrated in the incorporated application.

In step 323, the buyer sends the LC application to the issuing bank 311 with a final copy of at least the terms relevant to redemption to the seller 302. Transmission to the issuing bank preferably is electronic. In step 324, the LC application is processed and accepted by the issuing bank. The issuing bank acknowledges the application and the acknowledgement is stored in the system. In case the bank generates a PDF file, the PDF is uploaded. In the case of a fax from the bank, the fax can be scanned into PDF format or captured electronically and converted into a PDF by using a software module such as the Easy Link Fax integration. Alternatives to PDF format abound, including any graphic file format such as TIF or JPEG formats and any web compatible format, such as WordPerfect's Trellix format, or other document wrapper format. Preferably, the issuing bank generates both a facsimile of the DC instrument and a machine readable version, such as an XML, EDI, csv or other interchange formatted file, which can be upload into the system. Generation of a machine readable version of the DC can reduce the chance of typographical errors in recording the DC terms, for later generation of consistent, so-called synchronized documents. If no machine readable version is generated by the issuing bank, someone manually enters the details of the bank's message in the system. Independent of communications through a system implementing the present invention, in step 325, the issuing bank advises the advising bank that it has issued the LC. One banking system used for this type of advice is known as SWIFT. In step 326, the advising bank sends the LC to the seller. The authenticated LC received by the seller may be used to update the system by a PDF uploaded, in the case of a PDF from the advising bank, a converted version of a fax message, in the case of a fax from the advising bank and an XML, EDT, csv or other interchange format file upload, in the case of an electronic file transmitted by the advising bank.

Often, amendment of the LC is required, as covered in steps 427-440. In step 427, when a LC amendment (LCAmd) is required, the seller will notify the buyer of a problem or issue (or vice-a-versa) and the buyer and seller again collaborate and decide on the changes to the terms. There may be exchanges of messages and revisions to draft text one or more times, until the buyer and seller agree on the changed terms. In step 428, the buyer presents the LC amendment to the issuing bank with a final copy to the seller, preferably electronically. The issuing bank, in step 429, confirms the LC amendment, for instance by a PDF or fax acknowledgment which is uploaded into the system as described above. Preferably, the issuing bank also generates an electronic, machine readable acknowledgement, such as an XML, EDI or csv file which can be used directly to reflect the updated terms of the LC. If no machine readable acknowledgement is generated, the amended terms are manually entered from the bank's message. In step 340, the issuing bank transmits the amended LC to the advising bank. This step typically will be performed using secure banking channels, such as SWIFT. In step 341, the seller matches or reconciles the LC (including amendments) with the invoice, the bill of lading or airway bill, the packing list and other documents required to be presented to the bank for settlement. Preferably, the present system is used to generate at least one and more preferably a plurality of the bank required documents, using the same data that was used to generate the LC instruction or application, reconciled as appropriate to reflect the terms of the LC as issued and amended. The seller and presents the original LC and all required documents to the bank for settlement.

A system, such as described in the incorporated application, supports use of DC by providing various combinations of document management, alerts to and communication among relevant parties, activity tracking and visibility, linking of trade documents to LC terms, and flexible setup and coordination. The visibility of the documentation process tends to counteract the factors that can delay actual payment, in redemption of a LC, for months after shipment of goods. The factors that favor delay include number of documents required to complete a transaction, the number of parties involved to complete the process, and the strict document compliance required to release payment. These factors are exacerbated by the advantage in the process to the banks that hold the funds, as the banks receive substantial administrative and credit fees. Improved facilities for pulling together the documentation complaint with the DC terms, and for managing the visibility to the completion of that documentation, the length of the cash cycle can be reduced.

One aspect of a DC management system is general user management. The key actors in a DC transaction that are entered into and made available in the system may go beyond the four listed above, to include the buyer or applicant, the issuing bank or applicant's bank, the beneficiary's bank or advising bank, the seller or beneficiary, and one or more freight forwarders. Preferably, actors are entered into a system and reused, from transaction to transaction.

The electronic process described with reference to FIG. 3 can be supported by workflow structures, alerts and notifications. One scenario for interaction among these actors follows: 1. A LC is set up by the importer. 2. uploaded from a bank by either the importer or exporter. 3. The importer or exporter associates the LC to a trade or transaction. 4. Transport documentary information (B/L, AWB, etc.) is entered by the freight forwarder. 5. An invoice and packing list is created by the exporter. 6. The exporter approves all documents to match LC terms by following correct LC business rules. 7. The exporter completes assembly of the bank-required documents for redemption of the LC and sends them to Bank for settlement. Set up of the actors in the system supports their functioning according to this and similar scenarios.

A trade, with which a DC or LC may be associated may be set up in the following general manner: A trade is initiated. Participants are associated with the trade. A DC or LC may be associated with the trade. As one LC can support many trades, a user is allowed to select among existing LCs to apply to the trade based on the LCs available in the system, or generate a new LC. While use of a DC or is optional for a given trade, when selected, it impacts business rules downstream, as the terms of the DC govern the information used to generate certain bank-required and shipping-related documents. Notification rules are set up, as further described in the incorporated application.

The workflow, alerts and notifications may be as follows: The seller prepares the LCI and sends it to the buyer. The buyer is notified by the system of the arrival of the LCI and alerted of his role in advancing the transaction. The buyer prepares an LCApp and sends it to the seller. The buyer and seller collaborate on the LCApp (or the LCI) and reach an agreed draft. On behalf of the buyer, a user may send a negotiated LCApp to a manager for approval. The buyer's manager may send the LCApp to an issuing bank. A send document function may be configured to send documents between buyer and seller and additionally may be configured to send documents between buyer and seller and their respective banks. Buyer and seller are notified that the LCApp has been completed and transmitted to the issuing bank. This notification may be linked to the send document function. The send document function may send a document to a printer, with manual delivery, to an e-mail, electronic document interchange or other electronic transmission system, with system-to-system delivery, to a facsimile generation and transmission system, with a system to person delivery such as a fax or PDF attachment to an electronic document, or to a combination of destinations.

For a LC amendment, the buyer may prepare a proposed amendment and send it to the seller (or vice-a-versa). The buyer and seller collaborate on the LC amendment and reach an agreed draft. On behalf of the buyer, a user may send a negotiated amendment to a manager for approval. The buyer's manager may send the amendment to the issuing bank.

A user interface summarizing information that may be collected for a LCI, LCApp, LC or LC amendment is depicted in FIG. 5. In the top frame, the navigation bar 501 provides direct access to interface pages that are part of an environment in which the LC system is useful. Navigation bar links include home, a dashboard that displays summary shipment status, a document vault that stores the LCs, reports, administration, help and logout. The context block 502 identifies the user, the user's company association and a particular portfolio in which the user is working. The shipment description information 503 includes shipment number, expected departure, expected arrival, origin, destination, bill of lading or airway bill number, and vessel/voyage or flight/date, if applicable. The alerts display 504 report the number of pending alerts to the user, which may result from actions taken by others, failure of actions taken by the user, passage of milestone or alert dates, or other events or conditions. The alerts display reminds the user of priority issues to be resolved, without requiring the user to directly access a list of issues to be resolved. This frame and the left list frame can be adapted to a wide range of user interfaces for an export-import system, to present a consistent user interface.

The list in the left frame, corresponds to the order, logistics and settlement aspects of TradeBeam's product, referred to in discussion of FIG. 1. The order function list 101, 511 in this embodiment supports functions such as manual order entry, manual sales order entry and checks on compliance with import / export regulations. The shipment or logistics function list 102, 512 supports functions such as booking and scheduling of transportation, preparation of export shipping instructions, processing through export customs, preparation of import shipping instructions, processing through import customs, and proof of delivery. Supported documents that relate to aspects of the present invention include shipping document creation and tracking, inspection, packing list generation, shipping instructions and commercial documents. The settlement function list 103, 513 supports functions such as invoice processing and LC processing. Again, this left list frame and the upper most frame can be adapted to a wide range of user interfaces.

The second upper frame is adapted to document generation, to a DC or LC in this instance. Control links 521 allow a user to preview a facsimile of a document being generated or to send a document. Submit and cancel controls 522 allow a user to decide whether to persist or save edits made to the present interface. The add notes to page log panel 523 allows a user to annotate an audit trail that is compiled as users work on parts of a shipment. The assign action panel and current action identifier 524 identifies the actor currently responsible for taking the next step in the present, LC process, and allows the user to reassign the current action or to assign the next action required. The approval status panel and current status identifier 525 identify the current status of the present process and allow the user to update the status, according to the user's approval authorities. The tabs 526 allow direct access to user interfaces related to the LC process including summary, details, parties, terms, amendments and a page log. The page log displays the audit trail mentioned above, for the LC process. The remaining tabs are further described below.

The main body of the LC interface spans FIGS. 5A-E. The latest of LC document in preparation is indicated 531. This may be instructions, application, or amendment, or it may be the LC itself. The instruction/application/amendment number and date are displayed 532. The LC and LC Advice number and date, along with summary information including the LC type, expiration, amount and currency type are listed 533. For an application, the applicant and issuing bank are identified, together with request issue and expiration dates, place of expiry and whether a request confirmation is required 534. On the interface section depicted in FIG. 5B, further information is provided regarding the parties to the LC arrangement, including the applicant 541, beneficiary 542, issuing bank 543 and advising bank 544. In practice, these four parties would be distinct parties; no two would be "Global Consignee Inc." On the interface section depicted in FIG. 5C, information is completed for the banks 543, 544 and terms of the LC are summarized 545-551. One group of terms 545 is the credit amount in figures and words, credit tolerance in percent and maximum credit amount. A second group of terms 546 includes delivery terms (e.g., INCO terms,) delivery terms place, available with and by negotiation, presentation period, whether partial shipments are allowed, whether transshipments are allowed, who pays bank charges, who pays freight charges, who pays insurance and who pays other charges. To the extent that charges are paid by applicant, they may not appear as terms of the LC, because they do impose conditions for the beneficiary with which to comply. The tenor 547 and drawee of the LC are identified. Special terms for mixed payment or deferred payment may be specified 549. A group of shipment details 550 includes origin, via and destination locations, latest shipment date and shipment period. A description of goods and/or services 511 is specified, which carries over to other bank-required documents. On the interface section depicted in FIG. 5D, the bank-required documents are specified 560. In this example, two original commercial invoices and one duplicate are required. One original packing list and two duplicates are required, along with additional copies of a bill of lading, bill of exchange and other documents. For general information, and not necessarily as terms of the LC, a consignee and a party to notify are identified 570, 572. Additional conditions to the credit 580, special instructions 581 and bank remarks 582 can be entered and recorded. A group of summary amendment information 590 includes an increase or decrease of credit amount and a resulting new credit amount, plus a new date of expiry. In practice, either an increase or decrease of credit amount would result from amendments. The new credit amount 590 would track the LC amount 533 together with the increase or decrease amount 590. On the interface section depicted in FIG. 5E, the text of amendments or descriptions of amendments to the LC are displayed.

Figure 8B:
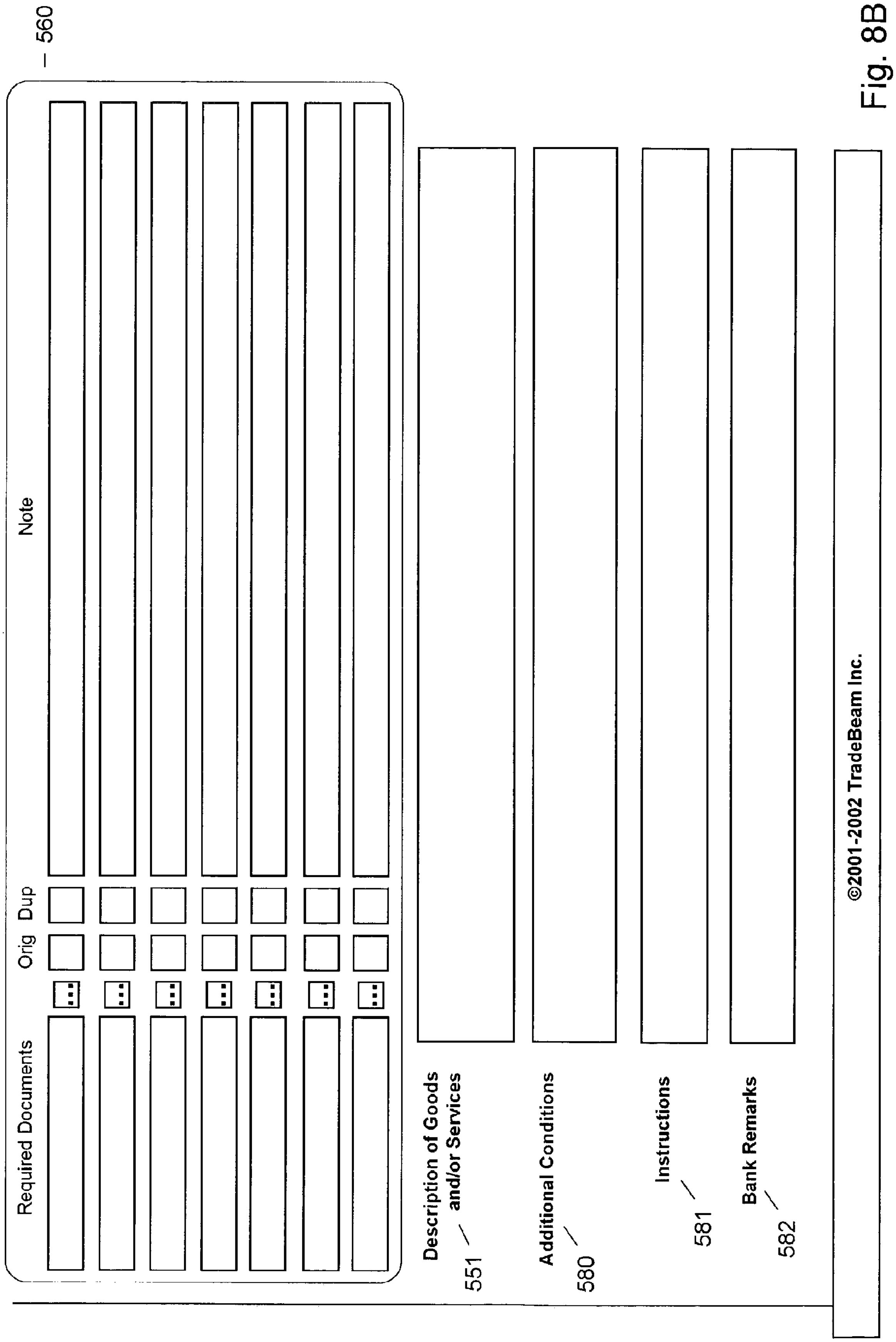

FIGS. 6-9 provide data entry fields corresponding to the data summarized in FIGS. 5A-E. In these figures, data is conveniently and logically grouped. In FIG. 6, support for templates is provided 627, 628, which was not apparent from FIG. 5. An existing template can be selected 627 or a new template created 628. The new template can be created when the data entry has been completed and submitted 522. In FIG. 6, the user selects whether to create an instruction, application or amendment. The user also may be allowed to select manual entry from a bank-issued DC or LC, which does not appear in the figure. Associated with this user interface may be utilities to upload PDF files, download data in facsimile or electronic version, print, preview, fax or allow for approval of the document by someone other than the person who prepared it. Different views may be supported for buyer and seller, which allow one party to control entry of data in a field over which that the party has exclusive control, such as their selection of a consignee or freight forwarder. For buyer or seller, a workflow can be supported in which a different person approves a LC or other document than enters the data. For instance, a manager may have approval authority while clerical staff may only have create/modify authority. Most of the fields in FIG. 6 also appear in FIG. 5 and have been numbered accordingly. In FIGS. 7-9, all of the fields that appear are numbered consistent with FIG. 5. To reduce visual clutter, the top most frame and the left list frame have been omitted from FIGS. 6-9. To present a consistent visual appearance, the interfaces of FIGS. 6-9 may be framed as is FIG. 5. It is anticipated that all of the interfaces illustrated in this application will be internationalized, including support for English, Spanish and Japanese speakers. In cooperation with banking institutions, this system may be adapted to comply with standards established by Indentrus LLC, a global e-commerce trust organization, or it successors or similar organizations. Access to Thomson Directories, including ThomWeb, and other services of The Thomson Corporation also may be supported.

Figure 10A:
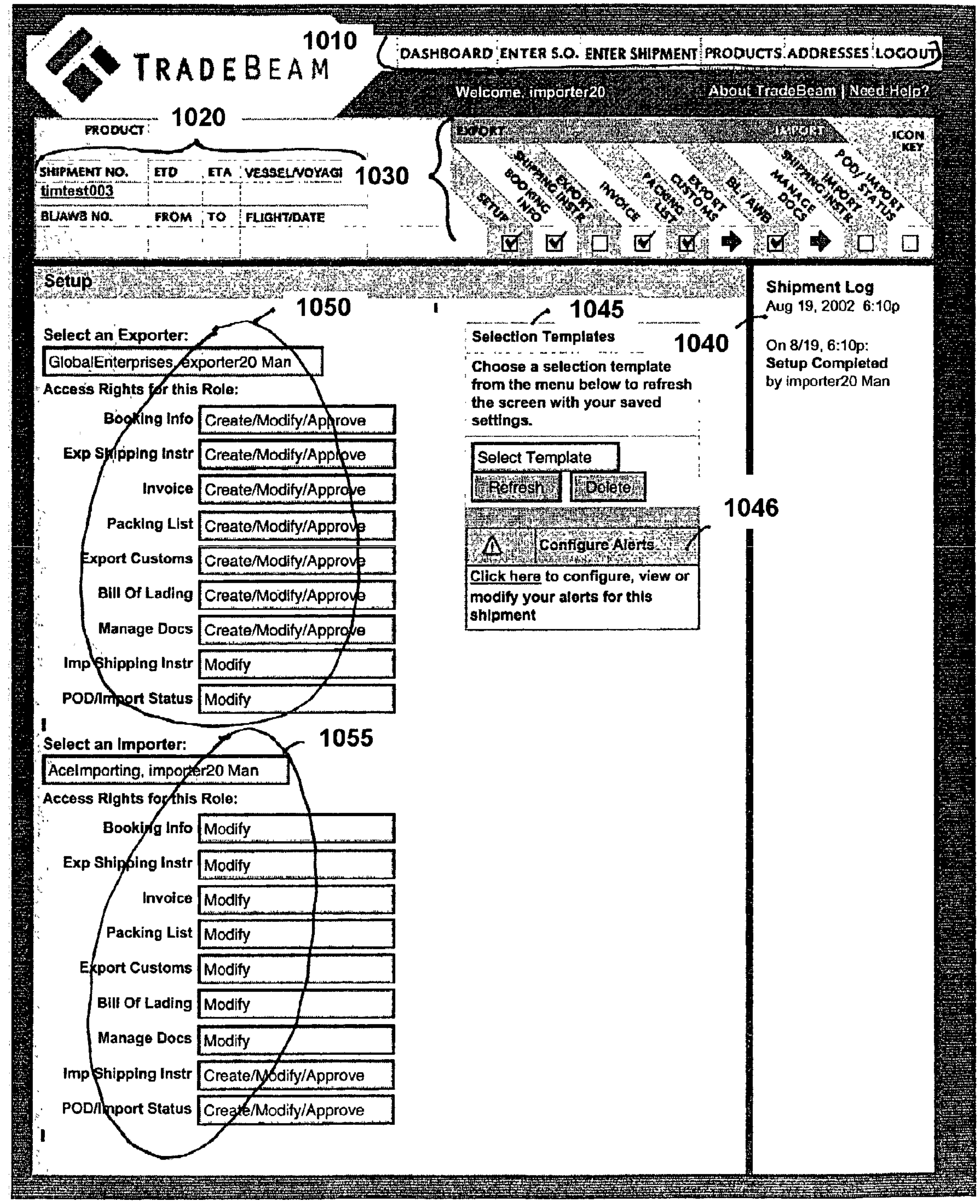

One aspect of the present invention includes automatically populating fields of bank-required and shipping-related documents from the data used in the DC/LC instructions, application, amendment(s) or instrument. Documents that can benefit from synchronization with the DC/LC include the bill of lading, regulatory compliance documents, export shipping instructions, invoice, and packing list. To illustrate some of these documents, one embodiment of user interfaces for set-up of a shipment and completion of bank-required and shipping-related documents are illustrated. FIGS. 10A-C depict the set up for shipment "timtest003". Principal components of this display are navigation bar 1010, shipment description information 1020, summary status information by shipment stage 1030, an audit trail log 1040, access to templates 1045 and alerts 1046, set up for various actors, including the exporter 1050, the importer 1055, the export freight forwarder 1060, the import freight forwarder 1065 and the customs house broker 1070, and identification of shipping documents requiring preparation 1075. The shipment description information 1020 includes shipment number, expected departure, expected arrival, vessel/voyage, if applicable, bill of lading or airway bill number, origin, destination and flight/date, if applicable. The shipment stage categories and status icons used are as described above. The viewer can navigate from this screen to the screen for a different stage by clicking on the corresponding icon. The shipment log 1040 displays at least a portion of an audit trail. The audit trail records dates, times and actors for significant events. Significant events may include creation, edits, approval of documents, or data tracking the status of the shipment or explicit status changes made by an actor, as described in detail below. On the set up display, audit trail events may be filtered and only those related to set up, such as "set up completed," are displayed. Compare, for example, the events displayed on the trade index shipment log 1640 of FIG. 16A or on the booking information page log 1740 of FIG. 17A.

Returning to the set up display, blocks 1045, 1046 allow selection of templates and configuration of alerts. Templates may be established to assign identities and access rights or authority to shipment participant roles. A template is a shortcut that saves on the decision-making as to the access rights associated with pre-established routes. Alerts 1046 may be configured, viewed or modified through the configure alert box. An alert is a tickler keyed to an event. It may be keyed to the expected date of the event, to a prudent time prior to the event, or to a time after the event. The event may correspond to the name of the tickler or it may be a different, related event. For instance, shipping documents may be required one week before the final drop-off date for an oceangoing container. If shipping documents are not completed by the one week milestone, an alert appears on various overviews and detailed displays.

These FIGS. 10A-C also depict set up of various potential actors. Not all actors may need to be set up for a particular shipment. Not all actors may need to be included on this detailed display, for instance where it is customary for the import freight forwarder to act as a customs house broker. The set up for an exporter 1050 includes selection of an exporter. Exporters may be selected from a pick list, after they are set up administratively. In this example, the exporter is assigned rights to create, modify and approve actions taken in the export-related stages and has rights to modify actions in the import-related stages, subject to approval by the importer 1055. Similarly, set up of the importer 1055 includes selection of the importer and assignment of rights for each of the shipment stage categories. This importer has create, modify and approve rights over import shipping instructions and proof of delivery/import status information. The set up of an export forwarder 1060, import freight forwarder 1065 and customs house broker 1070 generally follows the set up of an exporter or importer, with an important exception. When the exporter, for instance, sets up the shipment, the exporter will set up both the exporter and the importer, but may differ set up of the import forwarder 1065 or the customs house broker 1070 to the importer 1055. The importer may have rights to create this part of the set up or to enter data subject to approval by the exporter. More generally, the exporter or importer may defer set up of agents of their counterpart to their counterpart. Another section in this detailed display supports setting up shipping documents 1075. Shipping documents may serve various functions, such as satisfying customs requirements, government requirements, bank requirements, satisfying health, safety or environmental regulations, or satisfying contractual terms. Shipping documents serving these functions and others may include an invoice, packing list and a further set including a 9802 Worksheet, Air Waybill, Assembler's declaration, Broker's Invoice, Canadian Special Customs Invoice, Certificate of Analysis, Certificate of Inspection, Certificate of Insurance, Certificate of Origin, Certificate of Weight, CF 3461, CF 7501 Compliance Certification, Declaration of Dangerous Goods, Delivery Order, Domestic Trucking Invoice, Forwarder Invoice, Fumigation Certificate, MSDS, Mill Certificate, NAFTA Certificate, Ocean Bill of Lading, Physical Inspection Certificate, Proof Bill of Lading, Proof of Delivery, and Textile Declaration. Other, custom documents also may be required to be uploaded and distributed. When documents are required by set up, synchronized fields in the overviews status display and other detailed displays track progress toward completion of the required documents. The summary document management status 1043 reflects whether all of the requested shipping documents are complete, or not. This detailed display further allows settings to be saved as a template 1081, modification (committal) of data entered in fields of the display 1082 or cancellation of updates entered in the fields 1083.

Figure 10D:
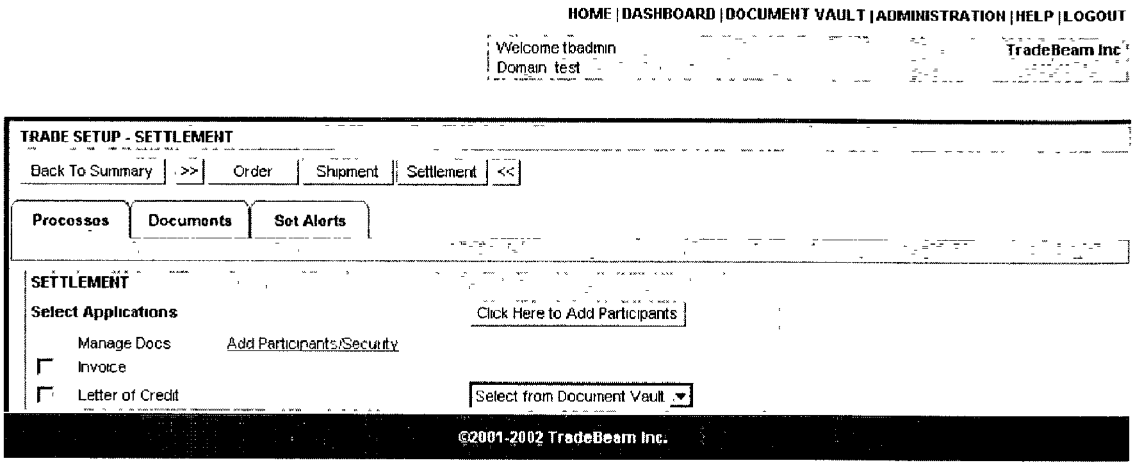
FIGS. 10D-G are a second embodiment.
Figure 10E:
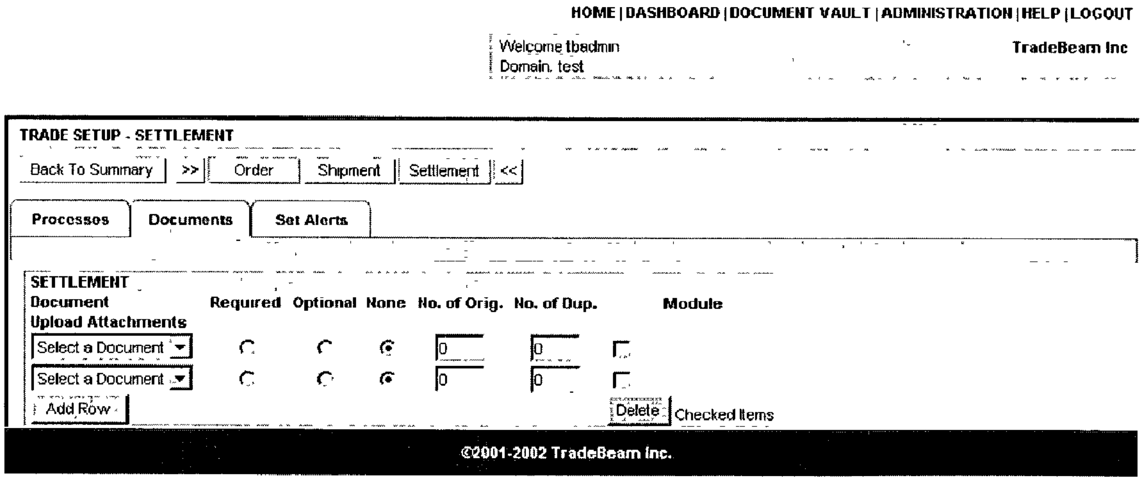
Figure 10F:
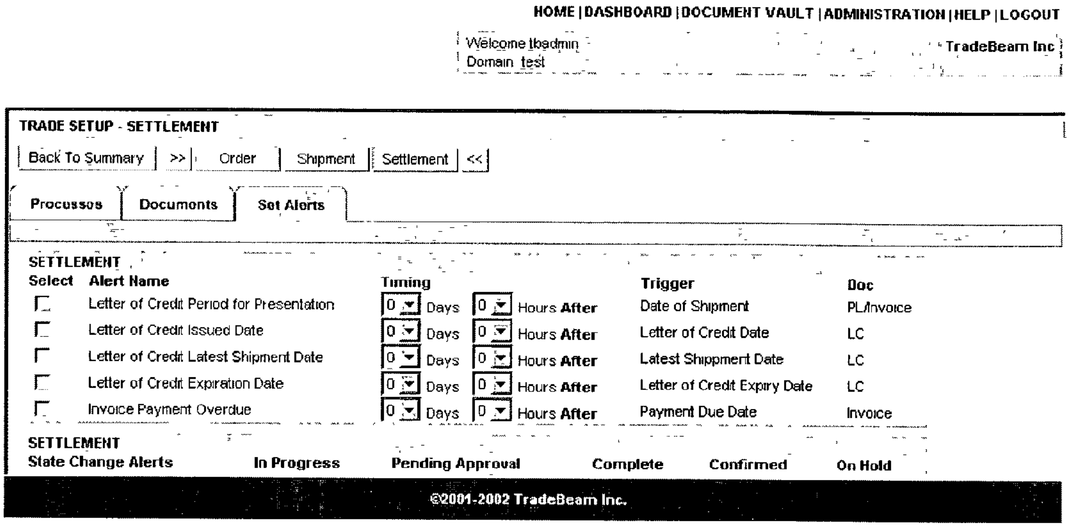
Figure 10G:
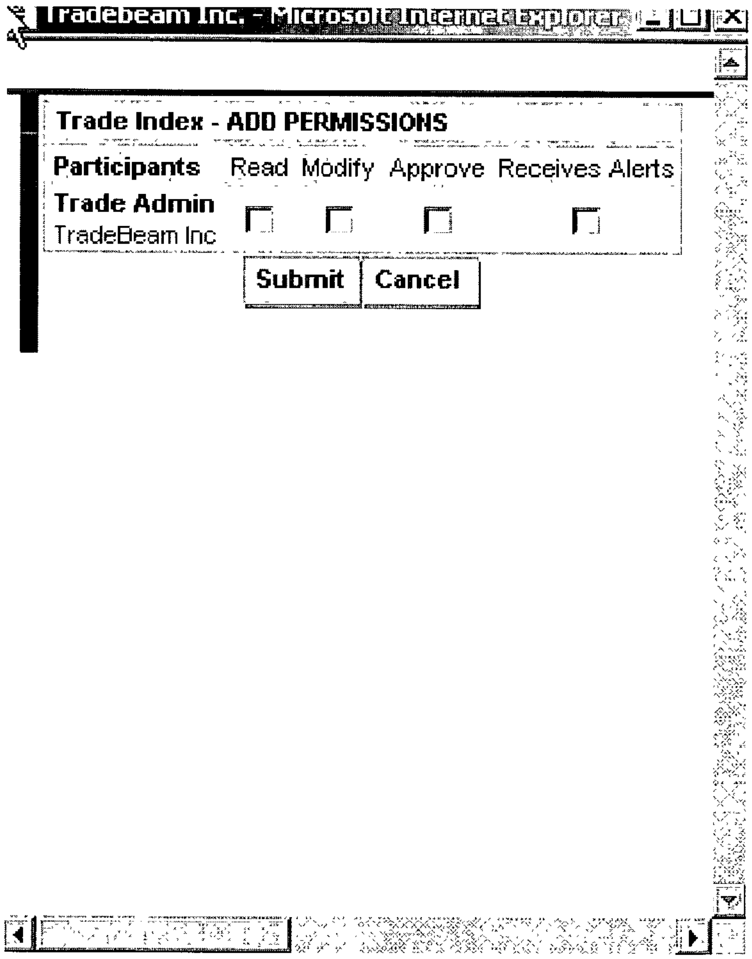

FIGS. 10D-G depict a second embodiment of set-up for settlement that reorganizes features that appear in FIGS. 10A-C. In this embodiment, the settlement module can be delivered as a standalone product, without the order module, for instance. FIG. 10D is an initial set-up screen from which participants can be added and specific documents can be included in a trade. FIG. 10E depicts the documents tab of settlement set-up. In this screen, requirements for documents can be specified and attachments uploaded. FIG. 10F depicts the set alerts tab of settlement set-up. A plurality of alert conditions are declared in a system table and made available in this set-up screen. An alert can be selected and timing specified, relative to a trigger associated with a particular document. To set up alerts, a template can be used. A particular configuration of alerts can be saved as a template. FIG. 10G depicts setting up participants and permissions for participants. This screen is reached from the add participants button of FIG. 10D.

FIGS. 11A-B provide for entry of an invoice. The principal components of this display include navigation bar 1110, shipment description information 1120, summary status information 1130, and an audit trail log 1140, as appeared in FIG. 10A. Principal components further include typical invoice information 1151-55, container or packaging information 1156, payment terms information 1157-59, and information related to further processing in this shipment stage 1160. Typical invoice information includes buyer and seller reference numbers 1151. The typical information further includes 1152 invoice number and date, bill of lading or airway bill number and date, and shipping, payment due and delivery dates. Names and addresses of customer, sold to, payer and ship to parties 1153 may be entered. Payment and shipping information 1154 includes payment method and remit to, place of loading and discharge, vessel name and voyage number, if applicable, and flight number and date, if applicable. Product information 1155 may be viewed and, in some embodiments, edited. Equipment information is displayed 1156. Payment-related information may include payment terms 1157, delivery terms 1158, and LC number and remarks 1159. Customer notes and special instructions may be entered. Information related to further processing in this shipment stage includes an indication of the shipment participant responsible for the next action toward completion of the stage 1160. In this instance, the arrow points to the exporter. If the current task was the responsibility of this actor, a notify button would appear next to the cancel button. Selecting the notify button would alert the next shipment participant responsible via an email or fax notification and a change in the Dashboard icon from the brown 'in progress' arrow to a green 'to do' box. Selecting the notify button would alert the next shipment participant responsible and would create an entry in the page log. If the viewer had authority to approve the invoice, a complete button would appear next to the cancel button. In some embodiments, a modify button may appear after a complete button is selected, to permit an actor with authority to un-complete the invoice.

Figure 11C:
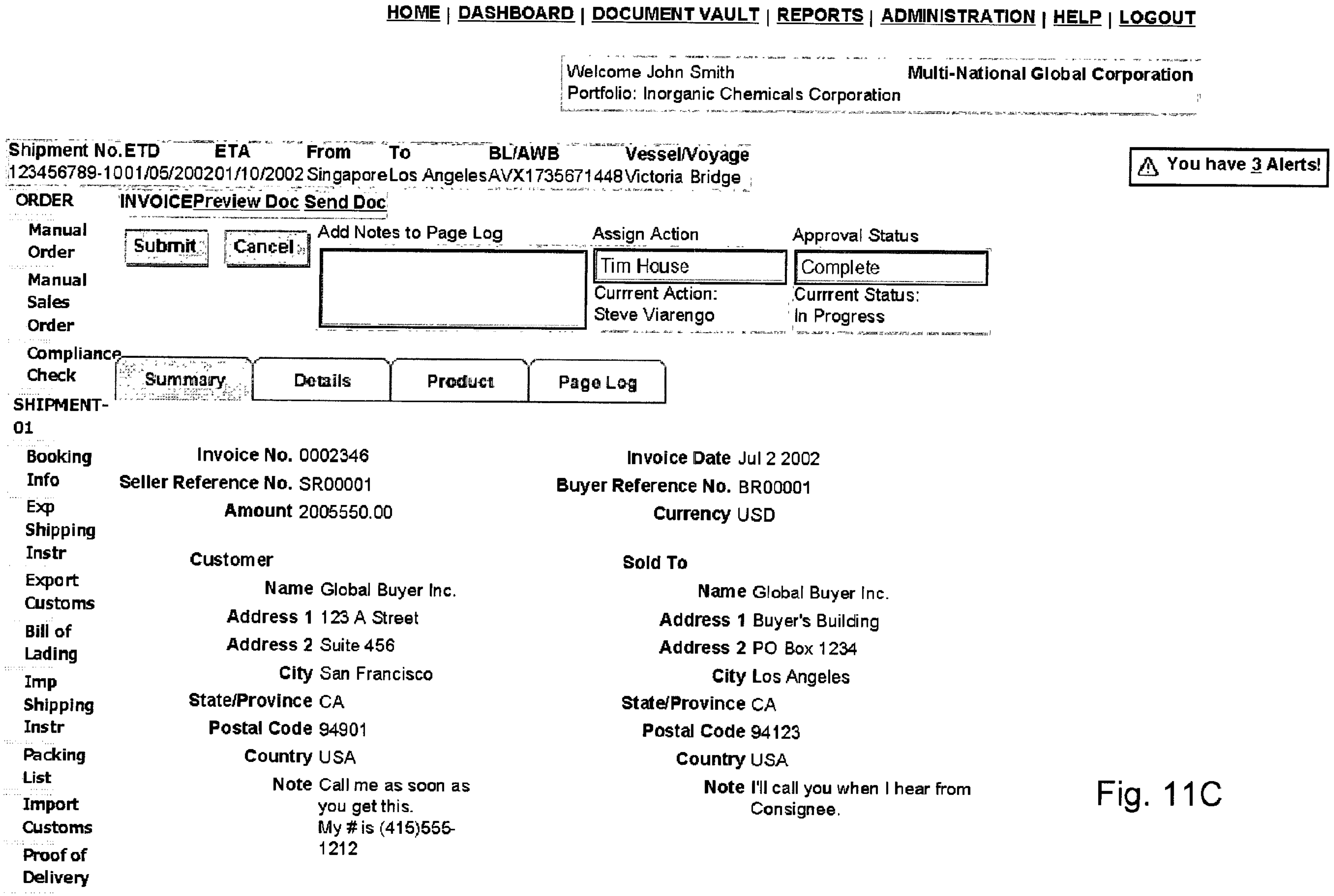
FIG. 11 depicts two embodiments of a user interface for entry of an invoice.
Figure 11G:
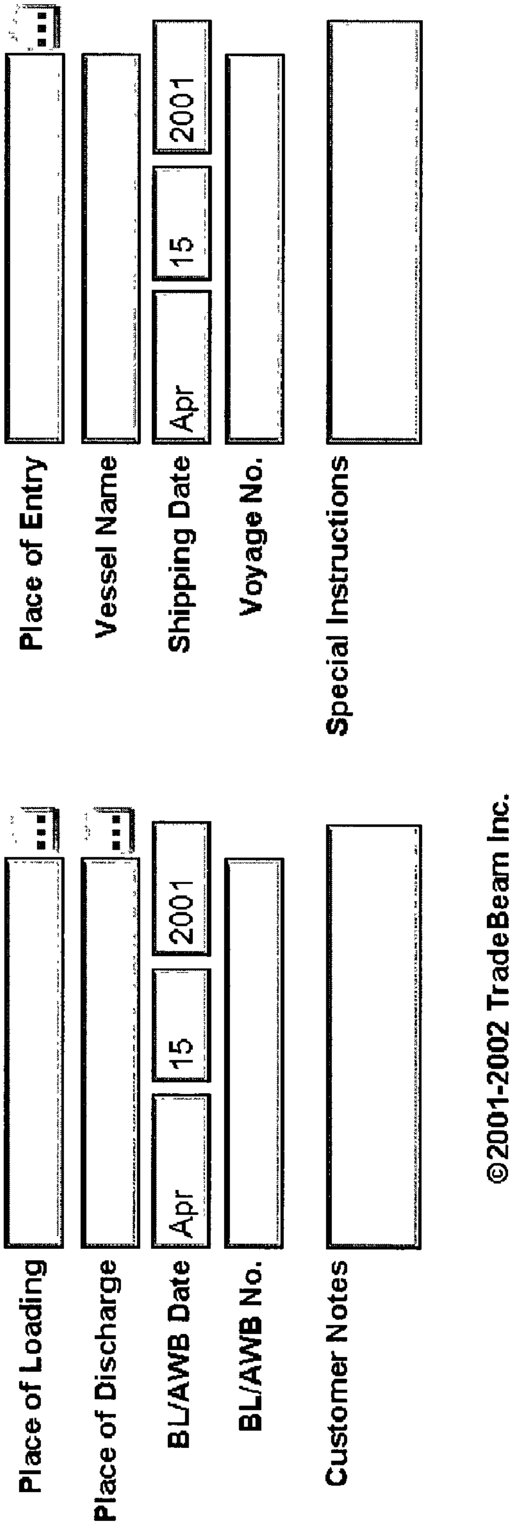
Figure 11I:
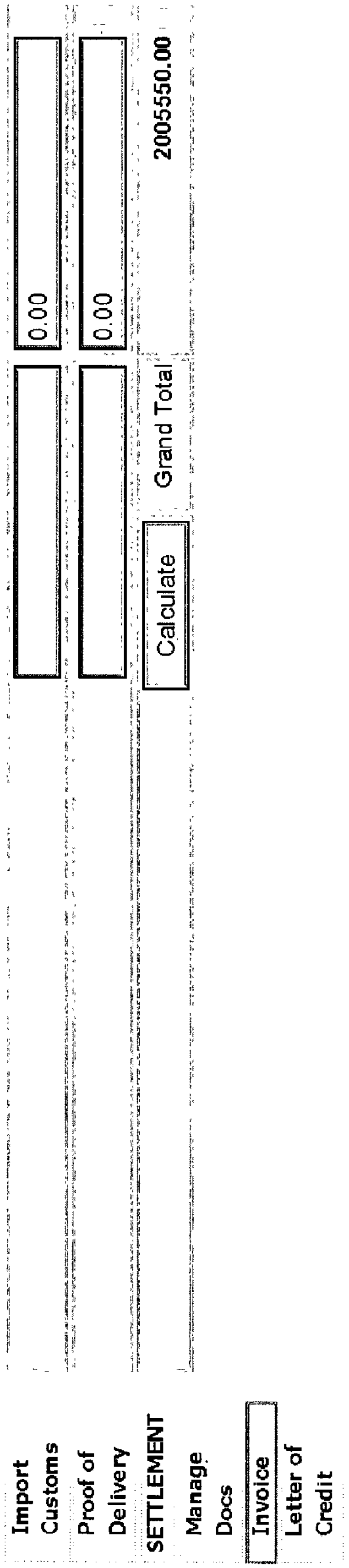

FIGS. 11C-K depict an alternative embodiment of an invoice entry user interface. FIGS. 11C-E depict the summary tab of the invoice GUI for this alternative embodiment. FIGS. 11F-G depict the details tab of the invoice GUI. FIGS. 11H-I depict the product tab of the invoice GUI. FIGS. 11J-K depict the page log tab of the invoice GUI.

FIG. 12A provides for entry of a packing list. The principal components of this display include navigation bar 1210, shipment description information 1220, summary status information 1230, and an audit trail log 1240, as appeared in FIG. 10A. Principal components further include information synchronized with other screens 1251-54, packing list information 1255, equipment information 1256, and information related to further processing in this shipment stage 1960. The information synchronized with other screens includes seller reference, invoice and bill of lading or airway numbers 1251, customer 1252, bill of lading or airway bill, invoice and shipment dates 1253, and transport and LC information 1254. The packing slip information 1255 in this example includes line item sequence no., product ID and product description, container and container seal identification, lot no., pickup location, package ID, quantity, packaging, unit weight, net weight, gross weight, and distinguishing marks and numbers. Equipment information is displayed 1256. There also may be a series of open fields into which optional or additional information is entered by the user for each product information row. Not displayed on this screen shot, but present when the information is in modifiable format, are three function buttons: Add Rows, Download Template, Upload Template. Add Rows allows the user to create another row in the packing list. Download Template allows the user to download a template to their local system in an Excel or other format that allows the user to manually enter or 'cut and paste' packing list information into a standard format that can be converted into a data format that can be uploaded into the system. The Upload Template allows the user to upload the template into the packing list whereby new rows would be created. Information related to further processing in this shipment stage includes an indication of the shipment participant responsible for the next action toward completion of the stage 1260. In this instance, the arrow points to the exporter. Missing from this figure is the cancel button that applies before an actor enters any information in the display. If information had been entered into this figure, a notify button would appear next to a cancel button. Selecting the notify button would alert the next shipment participant responsible. If the viewer had authority to approve the packing list, a complete button would appear next to the cancel button. In some embodiments, a modify button may appear after a complete button is selected, to permit an actor with authority to un-complete the invoice.

Figure 12E:
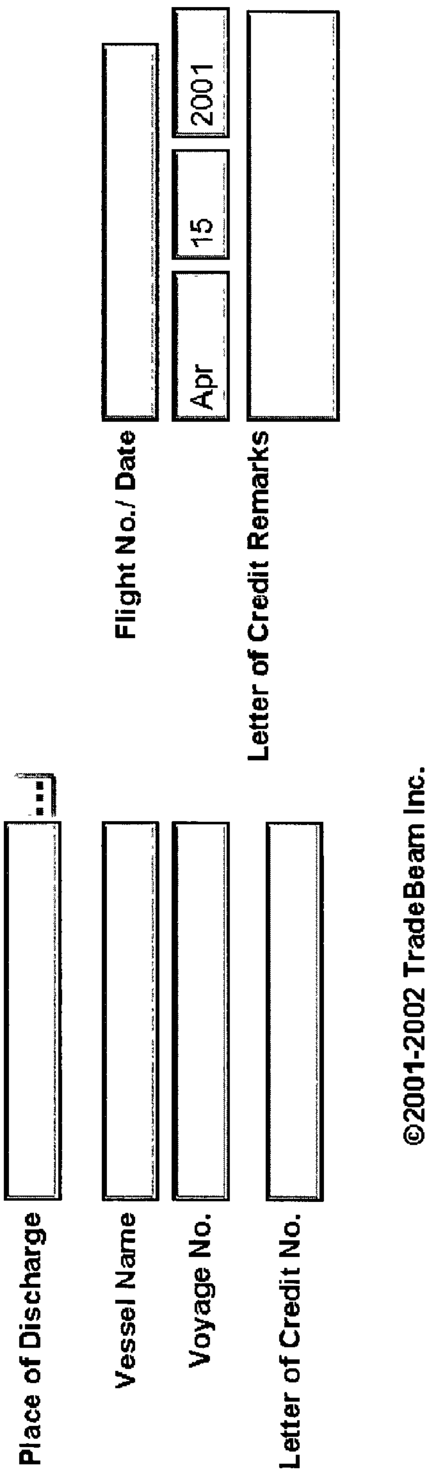
FIG. 12 depicts two embodiments of a user interface for entry of a packing list.
Figure 12F:
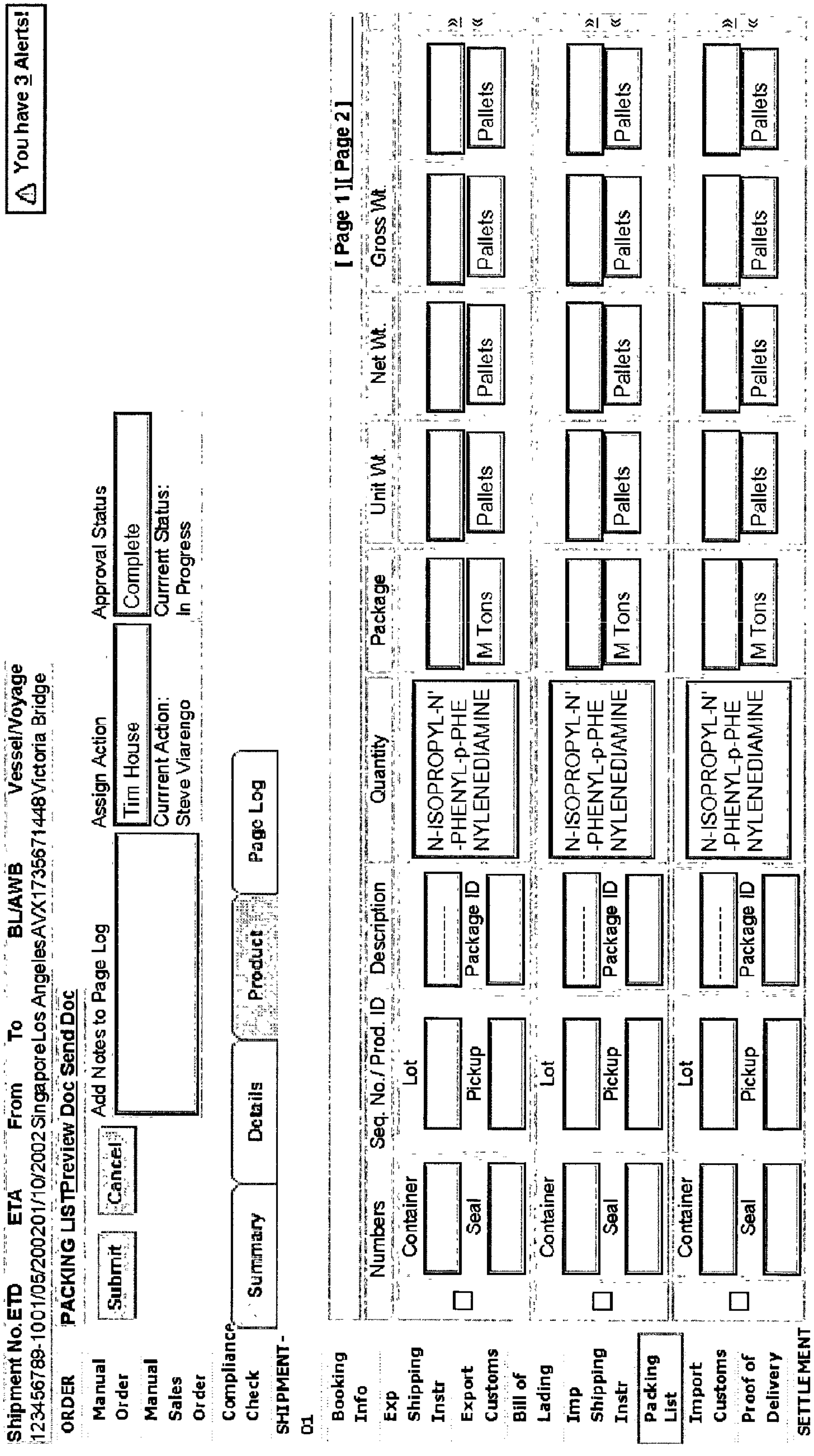
Figure 12G:
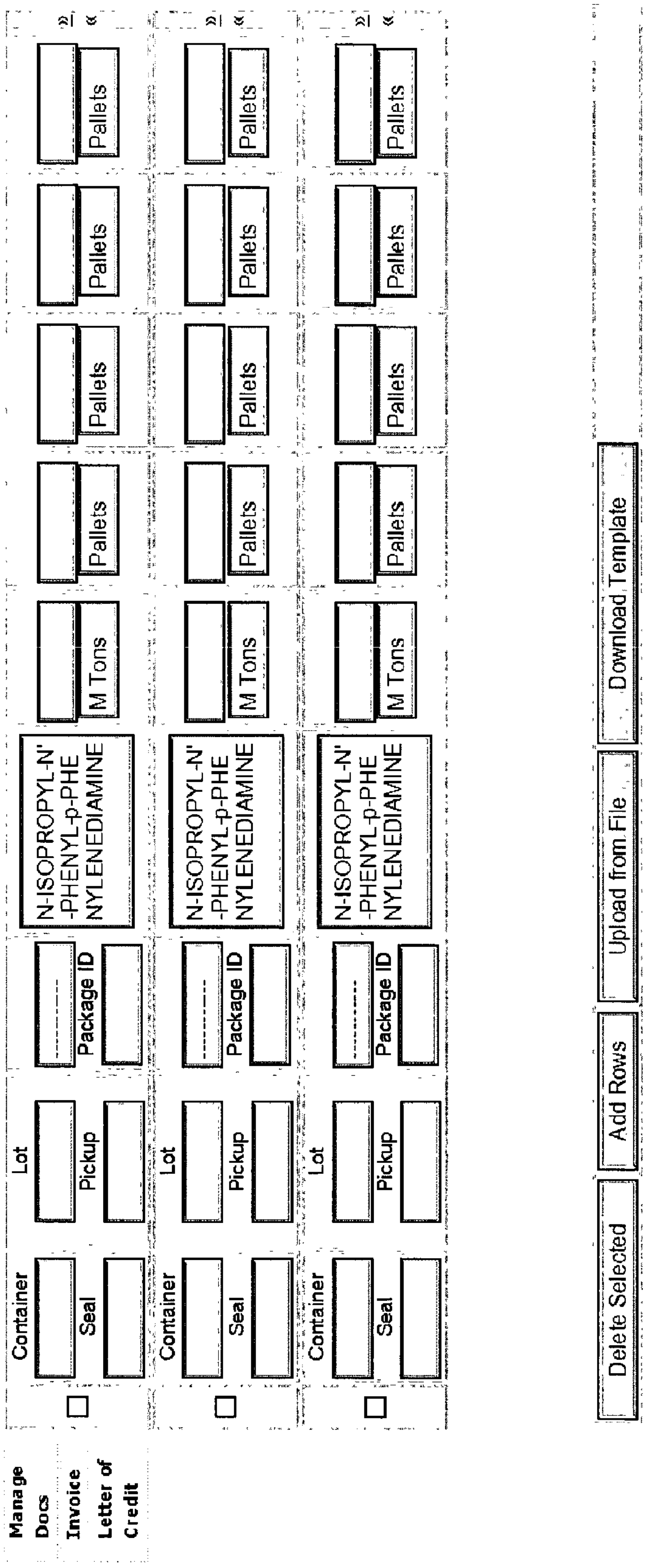
Figure 12I:
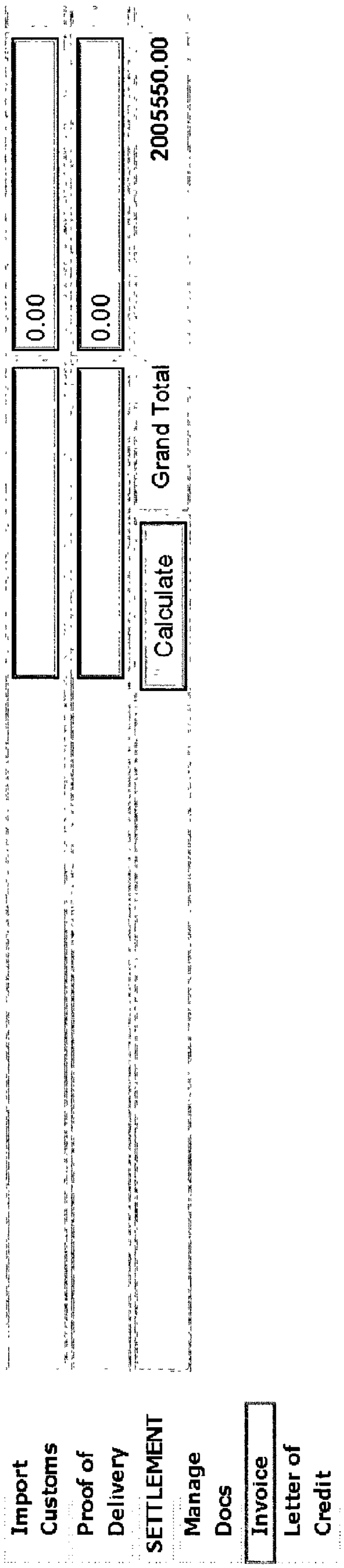

FIGS. 12B-I depict an alternative embodiment of a packing list user interface. FIGS. 12B-I depict the summary tab of the packing list GUI for this alternative embodiment. FIGS. 12B-C depict the summary tab. FIGS. 12D-E depict the details tab of the packing list GUI. FIGS. 12F-G depict the product tab. FIGS. 12H-I depict the page log tab of the packing list GUI.

FIGS. 13A-B provide for entry of information regarding a bill of lading or airway bill. The principal components of this display include navigation bar 1310, shipment description information 1320, summary status information 1330, and an audit trail log 1340. Principal components further include status information 1351, carrier name and bill of lading or airway bill number 1352, shipper name, booking number and export references 1353, consignee and forwarding agent names and addresses 1354, point or country of origin 1355, Notification party and instructions 1356, ALS XTN No. from a third-party export system 1357, loading pier terminal and type of move 1358, freight terms 1359, additional shipping information 1361-62 and information related to further processing in this shipment stage 1360. The status information in this example indicates whether proof and final versions of the bill of lading or airway bill have been received and uploaded 1351. Once uploaded, a copy of a proof or final bill of lading can be downloaded. The bill of lading, for instance, cannot be prepared or at least cannot be approved by the exporter, because it acknowledges that the transport company has received goods, and serves as title for the purpose of transportation. The additional shipping information may include pre-carriage, place or port of receipt, loading and discharge and vessel/voyage or flight/no, information 1360, place of delivery 1361 and equipment information 1362. Information related to further processing in this shipment stage includes an indication of the shipment participant responsible for the next action toward completion of the stage 1370. In this instance, the arrow points to the exporter. If information had been entered into this figure, a notify button would appear next to the cancel button. Selecting the notify button would alert the next shipment participant responsible. If the viewer had authority to approve the invoice, a complete button would appear next to the cancel button. In some embodiments, a modify button may appear after a complete button is selected, to permit an actor with authority to un-complete the invoice.

Figure 13E:
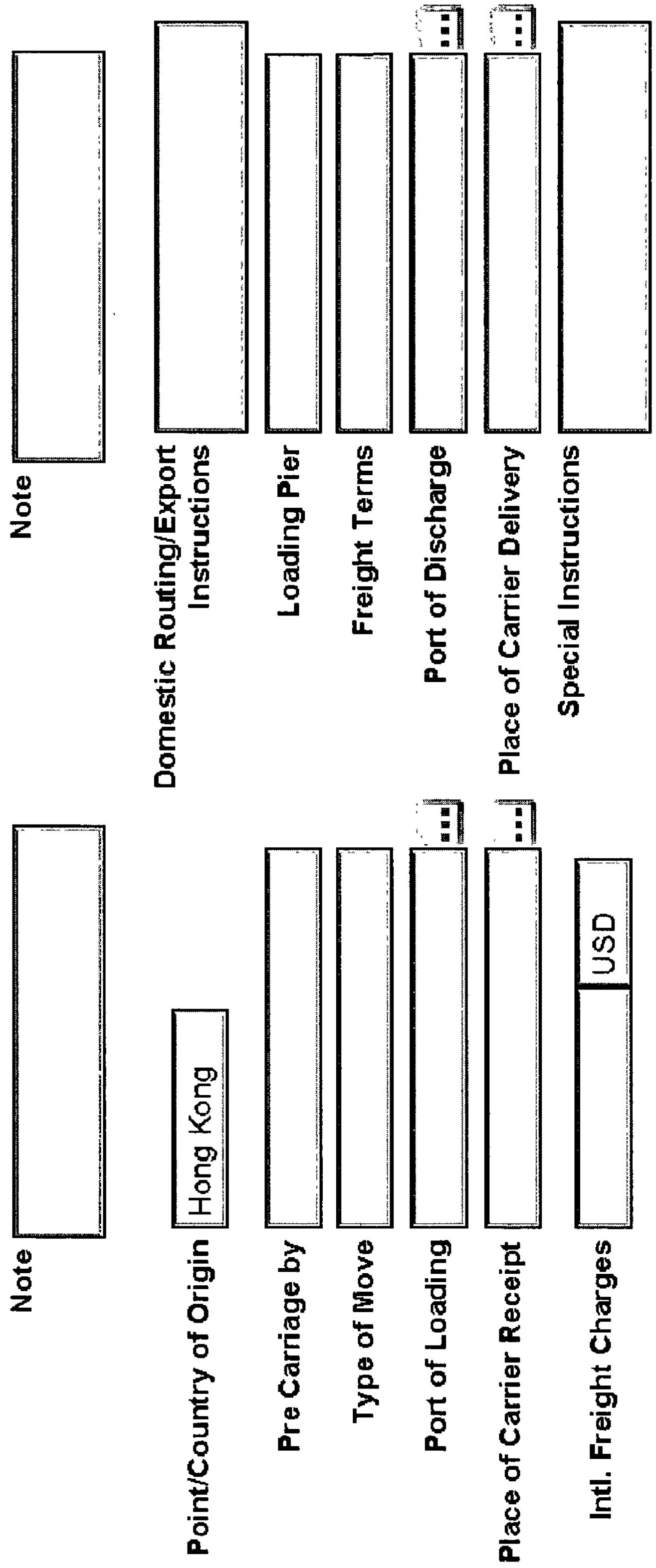
FIG. 13 depicts two embodiments of a user interface for entry of information regarding a bill of lading or airway bill.

FIGS. 13C-L depict an alternative embodiment of a bill of lading user interface. FIGS. 13C-E depict the summary tab. FIGS. 13F-H depict the details tab of the bill of lading GUI. FIGS. 13I-J depict the product tab. FIGS. 13K-L depict the page log tab of the bill of lading GUI.

Reporting preferably is supported by a DC / LC system. Standard reports may include an LC status report. Such a report may include all or some of LC Number, LC Date, Seller Party Name, Buyer Party Name, LC Expiry Date, Invoice Number, Bill of lading Number, Bill of Lading Number, and other fields selected by a system administrator. Ad-hoc reports also may be supported. Parameter based search should be allowed for standard reports which will include other than the fields listed above as parameters. A from/to date as a parameter will allow filtering of the information. Basic features of reporting may include sorting by different columns, printing, drilling down to the actual document/transaction by selecting a particular transaction/hyperlink like invoice number etc., and allowing access to edit the respective documents from this screen depending on access control rights.

Administrative support for a DC system should follow from the environment in which the DC system operates. It is anticipated that support will be provided to set up the roles for domain, company, trade, manager and user. It also should attach users to roles. The permissions that users may have for a DC / LC system include: create LCI, modify LCI, view LCI, and delete LCI; create LCApp, modify LCApp, view LCApp, and delete LCApp; confirm LC; upload and manage documents and send managed documents; create LCAmend, modify LCAmend, view LCAmend, and delete LCAmend; view Reports, create Party Master, modify Party Master, and view Party Master.

The stages of DC / LC preparation and the status of preparation in the stages may be defined as follows: 1st stage-Instruction; 2nd stage-Application; and 3rd stage-Amendment. Given the nature of an LC, a user should not be able to go back to the previous stage. If an earlier stage is pending, it should be completed or cancelled before a subsequent stage is begun. Security settings should define the rights and privileges of the user for each of the stages and the states within a stage. The user should be able to send a note to the assigned person, supervisor or trading partner contact on the next course of action, especially with respect to the required documents for an LC. The user should be allowed to apply or save a template. The states in each of the stages identified above would be: instruction-in progress or complete; Application-in progress, complete or confirmed; and amendment-in progress or complete.

The system may distinguish among users based on their roles, such as different persons who create draft DC / LC applications and persons who approve applications to be sent to the bank. Distinct workflows, alerts and notifications may be appropriate to various documents. For a LC instruction, someone representing the seller prepares it and sends it to buyer. An intermediate approval by a second person managing the seller's activities may be supported. The buyer is alerted by the system of the LCI. For an LC application, someone representing the buyer prepares it and sends it to seller. The seller collaborates in preparation of the application that is send to the bank, in the sense that the seller comments on or edits the application and sends it to buyer with changes. There may be iterations of application preparation, as the seller and buyer seek agreement on terms. The person representing the buyer sends a negotiated application to a manager representing the buyer for approval. The buyer manager sends the completed and approved application to the buyer's issuing bank. The seller and buyer can be alerted that the LCApp has been transmitted to the bank and that it has been approved by the issuing bank. More generally, notices of action on the application to the seller and buyer will be event-based. For an LC amendment, the buyer (or seller) prepares a draft amendment. The seller and buyer collaborate on terms of the amendment. The negotiated amendment is sent to a buyer manager for approval and transmittal to the issuing bank. The seller and buyer can be alerted of LCAmend processing on an event-driven basis. FIG. 10F, referenced above, depicts set-up of alerts.

Security also should be a concern for any system that involves bank-related information. Security may be established at any of the following levels, or other levels as appropriate. Initiation level security may establish who has the rights to setup an LC and should be controlled at the user/company level. Association level security may indicate who can view LC information and associate it with a particular trade. Downstream trade level security can be controlled at the user/trade level and this access will be granted at the time the trade setup takes place.

A DC / LC system or an export-import system including a DC / LC system may be integrated with an ERP or legacy application by an EAI vendor using conventional integration technologies or any newly invented technologies. Integration may include permitting uploading and downloading in XML, EDI, .txt, ASCII, tab delimited, csv or similar formats.

Synchronization rules define how data from the LC is propagated to other documents, including bank-required documents and shipping related documents. More generally, synchronization rules define how data is propagated from one document to other documents. FIG. 14 is a part of a set of synchronization rules for one embodiment of the present invention. Subsets of these rules also practice the present invention and may be very useful. Some of the rules in FIG. 14 relate to the environment in which a DC / LC system operates and apply the present invention beyond just DC or LCs. The rules depicted in FIG. 14 can be applied to any domain or to a selected domain, by associating them domain Tds (not shown.) The source and destination document types are types of document in which fields appear. These document types may include the types of documents described above or in the incorporated application. The field names are names of fields, for instance fields in the summary of FIG. 5 or the input forms of FIGS. 6-9. The source and destination document states indicate the condition of document preparation in which the rule applies. In one embodiment, the states are encoded as: New 1; In-Progress 2; On-Hold 3; Complete 4; Cancelled 5; Locked 6; Pending-Approval 7; Approved 8; Confirmed 9; Not Existing 0; and Any 1. The rules sometimes can be simplified by being applicable to multiple states or by generalization of the state transitions that will trigger a search through or application of a rule. The update scope column indicates the scope in which an update to a field will be applied. In this example, scopes are 1, 2 or 3, corresponding to one trade, one services module or across trades and across modules. Different scopes can be applied to updates, depending on the precise software embodiment chosen for the present invention. In an environment in which a DC or LC is one form of payment, there may be transactions in which there is no associated DC or LC. Accordingly, there is redundancy among rules so that an alternate rule may be specified if no LC is associated with a transaction. The pre-condition "LOCTradeExists" corresponds to a rule that overrides other rules, in case a LC is associated with a transaction.

To look at a specific example of a synchronization rule, consider the first LC to bill of lading rule. It is applied when the LC is complete and the bill of lading is in the progress towards completion. The beneficiary-address 1 field is copied from the LC to the shipper-address 1 field of the bill of lading. This mapping assures that the most current LC information will be used for preparation of a pro forma bill of lading that the shipper may confirm or adopt. Similarly, the second rule maps the same files, when the LC is received or approved and the bill of lading is in progress. The gray shading of the destination document field indicates that the system guards against the user who is preparing the bill of lading from overriding the wording of the LC. This guarding may be implemented as a prohibition on changing the field, a role based prohibition, or a warning that requires an express override and records the override in the audit trail. The update scope of this rule is cross trade.

One motivation for synchronization is that a LC typically requires a number of documents to be completed as proof that the buyer and seller have effectively completed the transaction to the satisfaction of all parties (themselves, customs, carriers, etc.). The completion and attachment of these documents is required to release funds. It is useful to support the following documents, which are sometimes used as proof that the transaction has been completed: Certificate of Inspection, Insurance Certificate, Ocean Bill of Lading, Air Waybill, Invoice, Bill of lading, Draft in duplicate and Certificate of Origin. The LC will specify which of these are required for documentary proof When an LC is created, the required documents that must be completed should be specified. As a result of these documents being "linked" to the LC, business logic regarding downstream document creation and business rules will apply.

It is useful to support a handful of documents, without supporting all of the documents or supporting custom documents required by a LC. For example, it is useful to support an Invoice, Bill of Lading/Airway Bill and a Bill of lading. While these fields for these documents should be synchronized with the LC, there can also be discrepancies due to business process errors that take place during the course of a trade. An example might be the invoice indicating different spelling of a buyer's name, different from the LC. It is useful to allow these discrepancies to be overridden deliberately, as they might represent what actually is transpiring in the real world or other systems of record. Especially if LC data is uploaded from another third party source, instead of being entered as the basis for an LC application, care should be taken as to whether system values for buyer's name, etc. should be overwritten for a particular LC.

Certain fields that should be shared across these documents. For preparation of an invoice, analysis of import-export situations indicates that the buyer's and seller's names and addresses should be synchronized from the LC, whether the LC is right or wrong, unless expressly overridden or the LC data is suspect. Terms of sale including place of terms of sale (FOB Charleston) should be synchronized. Goods description should match the LC exactly, but may contain added detail. LC number and issuance date optionally may be listed on the invoice. For preparation of a bill of lading, the buyer's and seller's names and addresses should be synchronized from the LC. Ship from, ship to names and address if any should match other documents and the LC. Pieces, weight, dimensions and cube [??? Cube] should match other documents and the LC. The goods description needs to only generally match LC in the bill of lading and may contain added detail. Alternatively, it may match the LC or match the LC with a field for additional detail. LC number and issuance date optionally may be listed on the bill of lading. For preparation of a BL/AWB, the shipper should default to seller (beneficiary) with an option to change to match a field in the LC. Consignee and Notify Party may be listed and should be consistent with any information provided to the bank (such information may be option, and not part of the LC even if included on an application form.) Pieces, weight, and cube on the BL/AWB should match the Bill of lading and LC. The goods description should generally match L/C and may contain added detail as required by Steamship Line/Airline. Alternatively, it may match the LC or match the LC with a field for additional detail. LC number and issuance date optionally may be listed on the BL/AWB. Freight Charges, including whether the charges are prepaid, collect or payable at destination, on the BL/AWB should not be inconsistent with the LC and Invoice. Place of Receipt, Port of Loading, Port of Unloading, Transship To, and Country or Place of Origin should not be inconsistent with the LC. Other carrier comments should appear as directed by LC.

On occasion, the LC may use different headers or titles for documents such as the bill of lading. Document titles of generated documents should match the LC, including for documents referred to above as a Commercial Invoice, Bill of lading, Weight List, Certificate of Inspection etc. Original documents should be labeled with the word "Original" or an equivalent expression somewhere in or near the title, as originals and copies are often subsequent printed copies from the same printer, instead of being carbons from a multi-part form. All generated documents will be dated and the dates that appear on them should not be inconsistent with other documents or with LC. The system should assure handling consistent with dates required in the LC.

FIG. 15 depicts a merge format that may be used to declare and generate a document that the system is capable of generating. The fields that are merged into this document from system data are indicated by brackets <. . . > and a field name between the brackets. The text of the letter depends on relationships established between the system operator and recipients of the letters. Similar merge formats may be useful for drafts, ocean and air certificates of origin, inspection certificates, ocean and air insurance advices, letters conveying remarks entered into the system, air way bills, invoices, bill of ladings, bills of lading, beneficiary's certificates, weight lists, and similar documents. Use of a declaratory or merge format allows a non-programmer to add document types to a system, without requiring hard coding of the documents.

Validation rules, applied when data is entered into the system, may be useful.

From the preceding description, it will be apparent to those of skill in the art that a wide variety of systems and methods can be constructed from aspects and components of the present invention. One embodiment of the present invention includes a method of generating DC and related documents. This method alternatively may be practiced as a system or system carrying out steps of the method. The system or device may include several embodiments, combining steps, aspects, options and alternative embodiments of the method. The method also may be practiced as a magnetic medium impressed with a program carrying out steps of the method. This program may include several embodiments combining steps, aspects, options and alternative embodiments of the method. This computer-aided method of generating DC and related documents may include providing at least one template for DC issuance and one or more templates for DC -related documents. The DC issuance document may be any combination of one, two or all of a DC instruction, a DC application or a DC instrument. The DC -related documents are among the plurality of bank-required documents to draw on a corresponding DC instrument. The method further may include mapping fields from the DC issuance template to the DC -related document templates and accepting data for at least some of the fields of the DC issuance template. According to one embodiment of this invention, the method then includes populating fields in the plurality of DC -related documents using the mapping.

In an additional embodiment of the present invention, the previous embodiment focuses upon preparation of a draft DC instruction or DC application. At least some terms of the draft are conveyed from a first party to a second party, wherein the first and second parties represent trading partners. The system conveys approval or edits to the draft by the second party. The system records agreement by first and second parties on the terms of the draft, prior to issuance of a corresponding DC instrument and preferably prior to submitting a DC application to an issuing bank.

A further embodiment, which may be practiced by itself or in addition to steps of the preceding embodiments, includes providing at least one template for amendment of terms to the DC instrument. The credit amendment template is mapped to the DC -related templates and to the DC issuance template. Data is accepted for at least some fields of the DC issuance template. Fields in the plurality of DC -related documents are populated using the mapping. A further aspect that may be combined with this embodiment involves collaboration on amendment terms. This collaboration aspect includes conveying from one to the other of the first and second parties at least some terms of a draft DC amendment. The system accepts from the other party approvals or edits of the draft amendment. The system records agreement of the first and second parties on the terms of the draft amendment, prior to issuance of a corresponding amended DC instrument, and preferably prior to submission of a request for amendment.

In combination with any the embodiments above, a further aspect of the present invention includes electronic submission of an application for a DC instrument or amendment of a DC instrument. This electronic submission aspect includes generating a machine readable DC application or amendment application, and populating fields in the application using the mapping. It further includes electronically submitting the application to an issuing bank. This aspect may further include receiving a confirmation of issuance of a DC instrument and updating the data supplied for the DC issuance template to conform to the issued or amended DC instrument.

Again, a wide variety of systems and methods can be constructed from aspects and components of the present invention. One embodiment of the present invention includes a computer-aided system to generate DC and related documents. The elements of the system include at least one template for DC issuance and one or more templates for DC -related documents.

The DC issuance document may be any combination of one, two or all of a DC instruction, a DC application or a DC instrument. The DC -related documents are among the plurality of bank-required documents to draw on a corresponding DC instrument. The system further includes a map that relates fields from the DC issuance template to the DC -related document templates. It includes logic to process input data for at least some of the fields of the DC issuance template and to populate fields in the plurality of DC -related documents using the map.

In an additional embodiment of the system, the previous embodiment focuses on the conveying from a first party to a second party at least some terms of a draft DC instruction or a DC application, wherein the first and second parties represent trading partners. The logic to process input data is adapted to approving or editing the draft by the second party and recording agreement by the first and second parties on the terms of the draft, prior to issuance of a corresponding DC instrument and preferably prior to submission of an application for the DC instrument.

A further embodiment, which may be practiced by itself or in addition to the systems described above, includes a at least one template for amendment of terms to the DC instrument and an additional map of fields from the DC amendment template to the DC -related document templates. This embodiment further includes additional logic to accept input to at least some of the fields in the DC amendment template and to populate fields in the DC -related documents using the additional map. A further aspect of this embodiment supports collaboration on amendment terms. In this collaboration aspect, the additional logic to process input data is adapted to convey from one to the other of the first and second parties at least some terms of the draft DC amendment. The system processes approving or editing the draft amendment by the other party and records agreement by the first and second parties on the terms of the draft amendment, prior to issuance of a corresponding amended DC instrument and preferably prior to submission of a proposed amendment.

In combination with any of the system embodiments above, a further aspect of the present invention includes logic to electronically submit a DC application or amendment application. This embodiment includes further logic to populate fields in the DC application using the map and to generate a machine readable DC application. The system then electronically submits the application to an issuing bank. This aspect may further include logic to receive a confirmation of issuance of the original or amended DC instrument and to update the data supplied for the DC issuance template to conform thereto.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to carry out synchronization of fields in multiple documents related to a DC or LC, media impressed with logic to carry out synchronization of fields in multiple documents related to a DC or LC, data streams impressed with logic to carry out synchronization of fields in multiple documents related to a DC or LC, or computer-accessible services that carry out synchronization of fields in multiple documents related to a DC or LC. It is contemplated that modifications and combinations will readily occur to those skilled in the art, which modifications and combinations will be within the spirit of the invention and the scope of the following claims.

We claim as follows:

1. A computer-aided method of generating documentary credit and related documents, including:

providing at least one template for documentary credit issuance, including at least one of a documentary credit instruction, a documentary credit application or a documentary credit instrument;

providing one or more templates for documentary credit-related documents, wherein the documentary credit-related documents are among a plurality of bank-required documents to draw on a corresponding documentary credit instrument;

mapping fields from the documentary credit issuance template to the documentary credit-related document templates and establishing synchronization rules for electronic propagation of data among and editing of the mapped fields;

electronically accepting data for at least some of the fields of the documentary credit issuance template; and applying, by a programmed computer, the synchronization rules and propagating, by programmed computer, the data to the documents needed to evidence fulfillment using the mapping, wherein the synchronization rules restrict users' ability to override the propagated data fields once a document preparation state for the agreed conditions and instructions reaches a predetermined level.

2. The method of claim 1, wherein the template for documentary credit issuance corresponds to the documentary credit instruction by a seller.

3. The method of claim 1, wherein the template for documentary credit issuance corresponds to the documentary credit application by a buyer.

4. The method of claim 1, wherein the template for documentary credit issuance corresponds to the documentary credit instrument issued by a bank.

5. The method of claim 1, wherein accepting data further includes:

conveying at least some terms of a draft of a documentary credit instruction or a documentary credit application from a first party to a second party, wherein the first and second parties represent trading partners;

approving or editing the draft by the second party; and recording agreement by the first and second parties the terms of the draft, prior to issuance of a corresponding documentary credit instrument.

6. The method of claim 1, further including:

providing at least one template for amendment of terms of a documentary credit instrument;

mapping fields from the documentary credit amendment template to the documentary credit-related document templates;

accepting data for at least some of the fields of the documentary credit amendment template; and populating fields in the plurality of documentary credit-related documents using the mapping.

7. The method of claim 6, wherein accepting data for the documentary credit amendment template further includes:

conveying at least some terms of a draft of a documentary credit amendment from one to an other of the first or second party;

approving or editing the draft amendment by the other party; and recording agreement by the first and second parties the terms of the draft amendment, prior to issuance of a corresponding amended documentary credit instrument.

8. The method of claim 1, wherein the supplying data step is directed to a pre-issuance document, further including:

generating a machine readable documentary credit application, populating fields in the application using the mapping; and electronically submitting the documentary credit application to an issuing bank.

9. The method of claim 8, further including:

receiving a confirmation of issuance of a documentary credit instrument; and updating the data supplied for the documentary credit issuance template to conform to the issued documentary credit instrument.

10. A computer-aided system to generate documentary credit and related documents, including:

at least one template for documentary credit issuance stored in computer readable memory, including at least one of a documentary credit instruction, a documentary credit application or a documentary credit instrument;

one or more templates for documentary credit-related documents stored in computer readable memory, wherein the documentary credit-related documents are among a plurality of bank-required documents to draw on a corresponding documentary credit instrument;

a map stored in computer readable memory that relates fields from the documentary credit issuance template to the documentary credit-related document templates;

synchronization rules for propagation of data among and editing of the mapped fields;

logic running on a computer to process input data for at least some of the fields of the documentary credit issuance template; and logic running on a computer to populate fields in the plurality of documentary credit-related documents using the map and the synchronization rules.

11. The computer-aided system of claim 10, wherein the template for documentary credit issuance corresponds to the documentary credit instruction by a seller.

12. The computer-aided system of claim 10, wherein the template for documentary credit issuance corresponds to the documentary credit application by a buyer.

13. The computer-aided system of claim 10, wherein the template for documentary credit issuance corresponds to the documentary credit instrument issued by a bank.

14. The computer-aided system of claim 10, wherein the logic to process input data is adapted to:

convey from a first party to a second party at least some terms of draft of a documentary credit instruction or a documentary credit application, wherein the first and second parties represent trading partners;

approving or editing the draft by the second party; and recording agreement by the first and second parties on the terms of the draft, prior to issuance of a corresponding documentary credit instrument.

15. The computer-aided system of claim 10, further including:

at least one template for amendment of terms of a documentary credit instrument;

an additional map of fields from the documentary credit amendment template to the documentary credit-related document templates;

additional logic to accept input to at least some of the fields of the documentary credit amendment template; and additional logic to populate fields in the plurality of documentary credit-related documents using the additional map.

16. The computer-aided system of claim 15, wherein the additional logic to process input data is adapted to:

convey from one to the other of the first and second parties at least some terms of a draft of a documentary credit amendment;

approving or editing the draft amendment by the other party; and recording agreement by the first and second parties on the terms of the draft amendment, prior to issuance of a corresponding amended documentary credit instrument.

17. The computer-aided system of claim 10, wherein logic to process input data is directed to a pre-issuance document, further including:

further logic to populate fields in the documentary credit application using the map and to generate a machine readable documentary credit application; and logic to electronically submitting the documentary credit application to an issuing bank.

18. The computer-aided system of claim 17, further including:

logic to receive a confirmation of issuance of a documentary credit instrument; and logic to update the data supplied for the documentary credit issuance template to conform to the issued documentary credit instrument.

* * * * *